United States Patent
Tanabe et al.

(10) Patent No.: US 10,948,908 B2
(45) Date of Patent: Mar. 16, 2021

(54) UNMANNED AERIAL VEHICLE AND MOBILE ELECTRONIC DEVICE

(71) Applicant: KYOCERA Corporation, Kyoto (JP)

(72) Inventors: Shigeki Tanabe, Yokohama (JP); Yasuhiro Ueno, Yokohama (JP); Hideki Morita, Yokohama (JP); Isao Masuike, Machida (JP); Koutaro Yamauchi, Yokohama (JP); Manabu Sakuma, Yokohama (JP); Kenji Shimada, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/750,706

(22) Filed: Jan. 23, 2020

(65) Prior Publication Data
US 2020/0142399 A1   May 7, 2020

Related U.S. Application Data

(63) Continuation of application No. PCT/JP2018/026986, filed on Jul. 18, 2018.

(30) Foreign Application Priority Data

| Jul. 27, 2017 | (JP) | ................. JP2017-145685 |
| Jul. 27, 2017 | (JP) | ................. JP2017-145913 |
| Jul. 27, 2017 | (JP) | ................. JP2017-145921 |

(51) Int. Cl.
*G05D 1/00* (2006.01)
*B64C 39/02* (2006.01)

(52) U.S. Cl.
CPC ......... *G05D 1/0016* (2013.01); *B64C 39/024* (2013.01); *G05D 1/0022* (2013.01); *B64C 2201/12* (2013.01); *B64C 2201/146* (2013.01)

(58) Field of Classification Search
None
See application file for complete search history.

(56) References Cited

U.S. PATENT DOCUMENTS

| 8,588,972 | B2 * | 11/2013 | Fung ..................... | B25J 11/003 |
| | | | | 446/454 |
| 9,501,056 | B2 * | 11/2016 | Hutson .................... | B25J 5/00 |
| 9,518,821 | B2 * | 12/2016 | Malay .................... | G08C 17/02 |
| 9,636,599 | B2 * | 5/2017 | Cannon .................. | A63H 30/04 |

(Continued)

FOREIGN PATENT DOCUMENTS

| JP | 2006197282 A | * | 7/2006 | ............. H04M 1/00 |
| JP | 2014-227166 A | | 12/2014 | |
| JP | 6143311 B1 | | 6/2017 | |

OTHER PUBLICATIONS

P. Wong, D. Nguyen, A. Abukmail, R. Brown, R. Ryan and M. Pagnutti, "Low Cost Unmanned Aerial Vehicle Monitoring Using Smart Phone Technology," 12th International Conference on Information Technology, pp. 286-291, 2015 (Year: 2015).*

*Primary Examiner* — Tan Q Nguyen
(74) *Attorney, Agent, or Firm* — Studebaker & Brackett PC

(57) ABSTRACT

A mobile electronic device according to an aspect is connected to a flight device. The mobile electronic device includes a communication unit that communicates with the flight device, and a controller that executes a predetermined function. When connected to the flight device, the controller changes the predetermined function when a predetermined condition is satisfied.

18 Claims, 29 Drawing Sheets

(56) References Cited

U.S. PATENT DOCUMENTS

| | | | | |
|---|---|---|---|---|
| 9,738,380 B2 * | 8/2017 | Claridge | ................ | G05D 1/101 |
| D799,374 S * | 10/2017 | Zhou | ........................... | D12/16.1 |
| 10,479,500 B2 * | 11/2019 | Claridge | ................ | B64C 19/00 |
| 10,571,931 B2 * | 2/2020 | Malay | ................... | G01C 9/005 |
| 2012/0290111 A1 * | 11/2012 | Badavne | ................. | A63H 3/28 |
| | | | | 700/94 |
| 2014/0297067 A1 * | 10/2014 | Malay | ................... | B64C 39/024 |
| | | | | 701/4 |
| 2016/0376004 A1 * | 12/2016 | Claridge | ................ | B64C 19/00 |
| | | | | 701/3 |
| 2017/0201614 A1 * | 7/2017 | Deng | ................ | H04B 1/3833 |
| 2017/0248968 A1 * | 8/2017 | Malay | ................... | G05D 1/101 |
| 2017/0369164 A1 * | 12/2017 | Klein | ................... | B64C 39/024 |
| 2018/0170539 A1 * | 6/2018 | Claridge | ................ | G08G 5/045 |

* cited by examiner

FIG.1
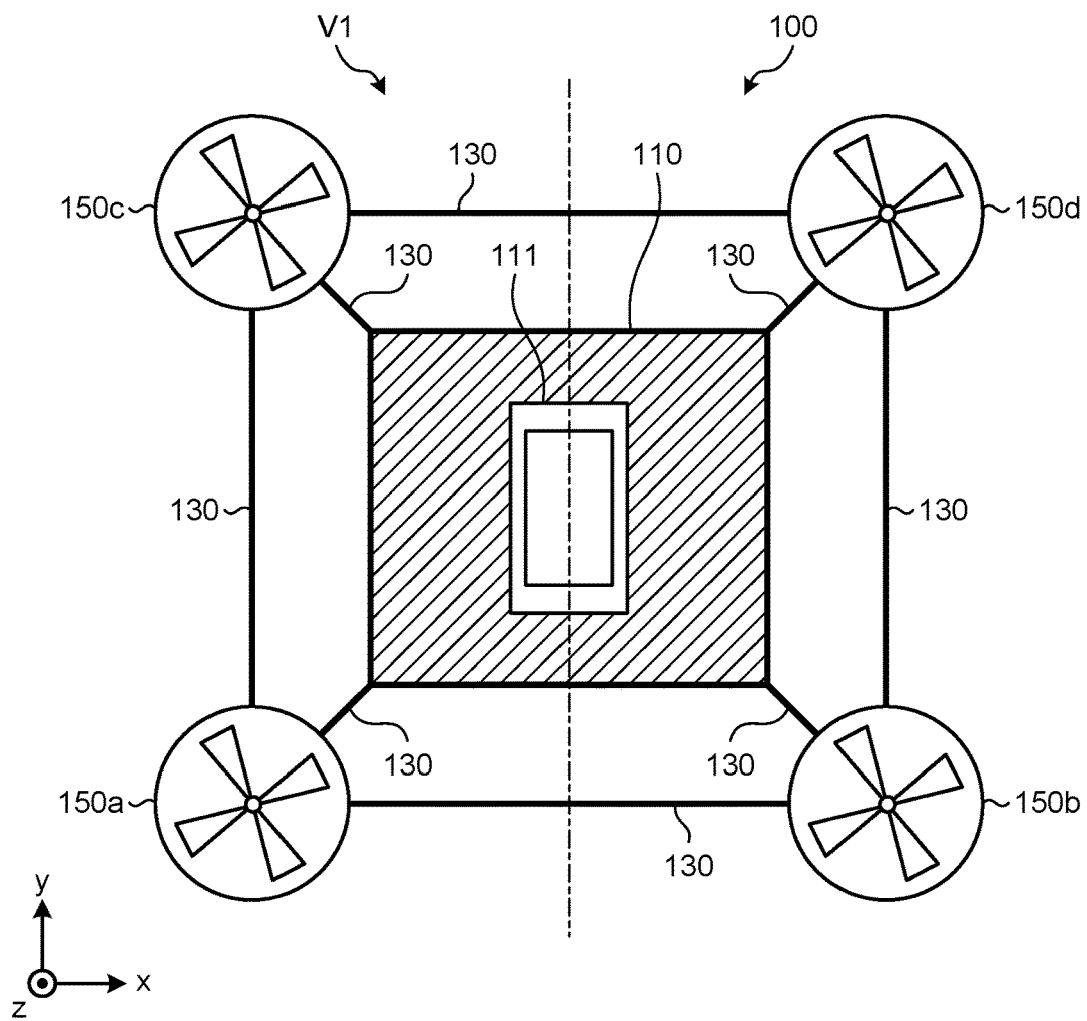
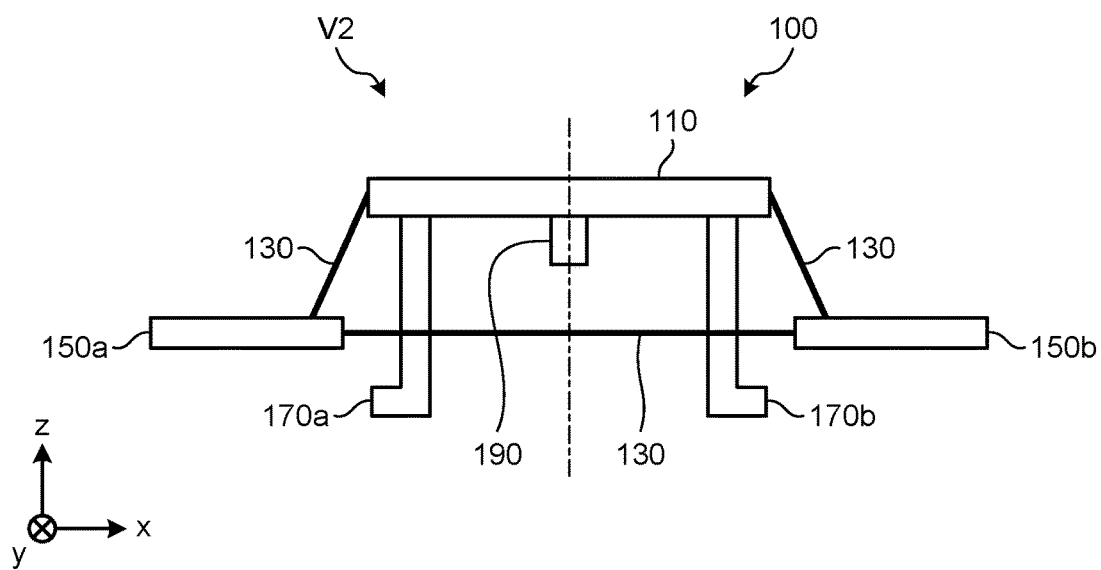

FIG.2
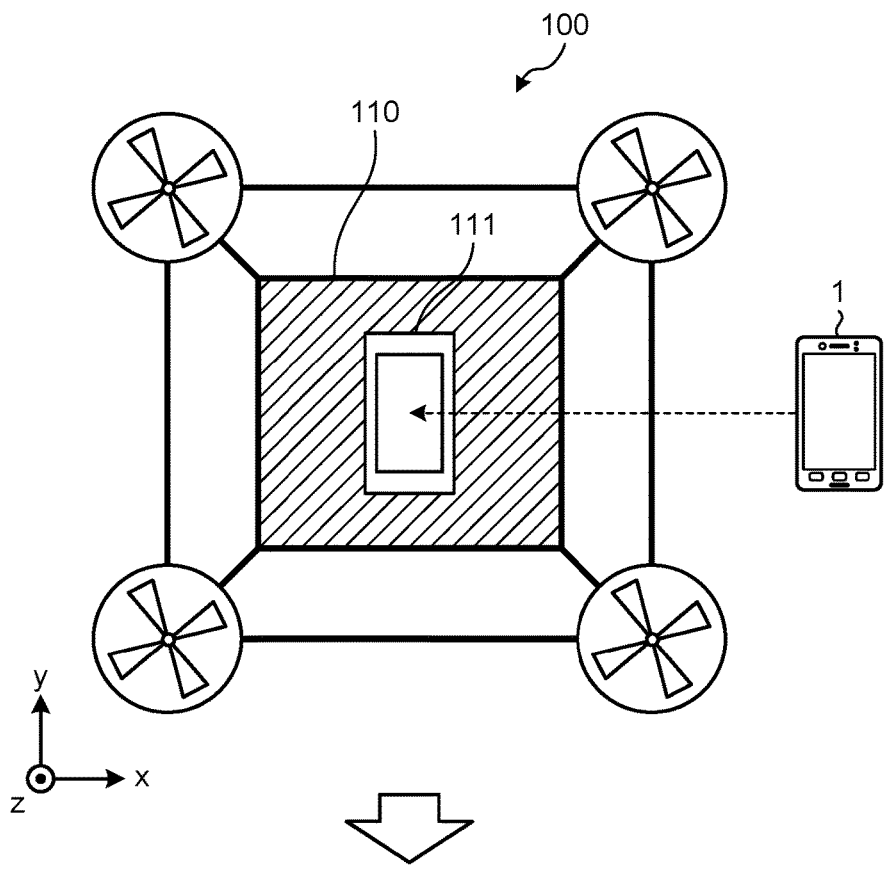
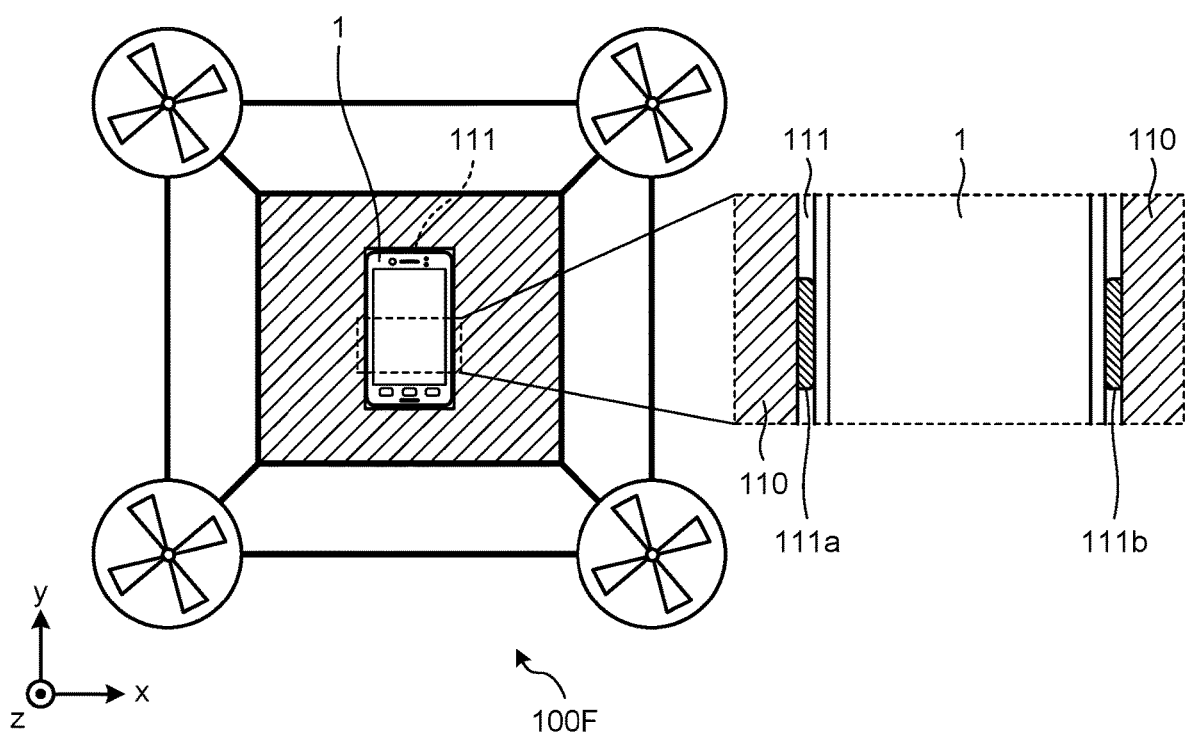

| POSTURE | AUTHENTICATION EXECUTION ALTITUDE |
|---|---|
| UPRIGHT POSITION | CENTER OF FACE T-(F/2) |
| SEATED POSITION | CENTER OF FACE S-(F/2) |
| SUPINE POSITION | 30cm FROM GROUND |

FIG.26

|  |  |
|---|---|
| HEIGHT(T) | 180cm |
| SITTING HEIGHT(S) | 100cm |
| FACE LENGTH(F) | 28cm |

UNMANNED AERIAL VEHICLE AND MOBILE ELECTRONIC DEVICE

CROSS-REFERENCE TO RELATED APPLICATION(S)

This application is a continuation of PCT international application Ser. No. PCT/JP2018/026986 filed on Jul. 18, 2018 which designates the United States, incorporated herein by reference, and which claims the benefit of priority from Japanese Patent Application No. 2017-145685 filed on Jul. 27, 2017, Japanese Patent Application No. 2017-145921 filed on Jul. 27, 2017, and Japanese Patent Application No. 2017-145913 filed on Jul. 27, 2017, incorporated herein by reference.

BACKGROUND

1. Technical Field

The application concerned is related to an unmanned aerial vehicle and a mobile electronic device.

2. Description of the Related Art

Conventionally, unmanned aerial vehicles are known that are capable of taking an unmanned flight when subjected to remote control or automated control.

A conventional unmanned aerial vehicle is not able to coordinate with the functions of a mobile electronic device.

SUMMARY

It is an object of this application to at least partially solve the problems in the conventional technology.

An unmanned aerial vehicle according to one embodiment includes a mobile electronic device, and a flight device to which the mobile electronic device is connected in a detachably-attachable manner. When the mobile electronic device that is connected to the flight device satisfies predetermined condition, predetermined function of the mobile electronic device is changed.

An unmanned aerial vehicle according to one embodiment includes a mobile electronic device, and a flight device to which the mobile electronic device is connected in a detachably-attachable manner. When the mobile electronic device detects that the flight device is in flight, predetermined function of the mobile electronic device is changed.

A mobile electronic device according to one embodiment that is connected to a flight device is disclosed, includes a communication unit that communicates with the flight device, and a controller that executes predetermined function. When connected to the flight device, the controller changes the predetermined function when predetermined condition is satisfied.

BRIEF DESCRIPTION OF THE DRAWINGS

FIG. 1 is a diagram illustrating an exemplary exterior configuration of a flight device according to embodiments.

FIG. 2 is a diagram illustrating an exemplary mounting method for mounting a mobile device on the flight device according to embodiments.

FIG. 26 is a diagram illustrating an example of user information according to embodiments.

DETAILED DESCRIPTION

Figure 3:
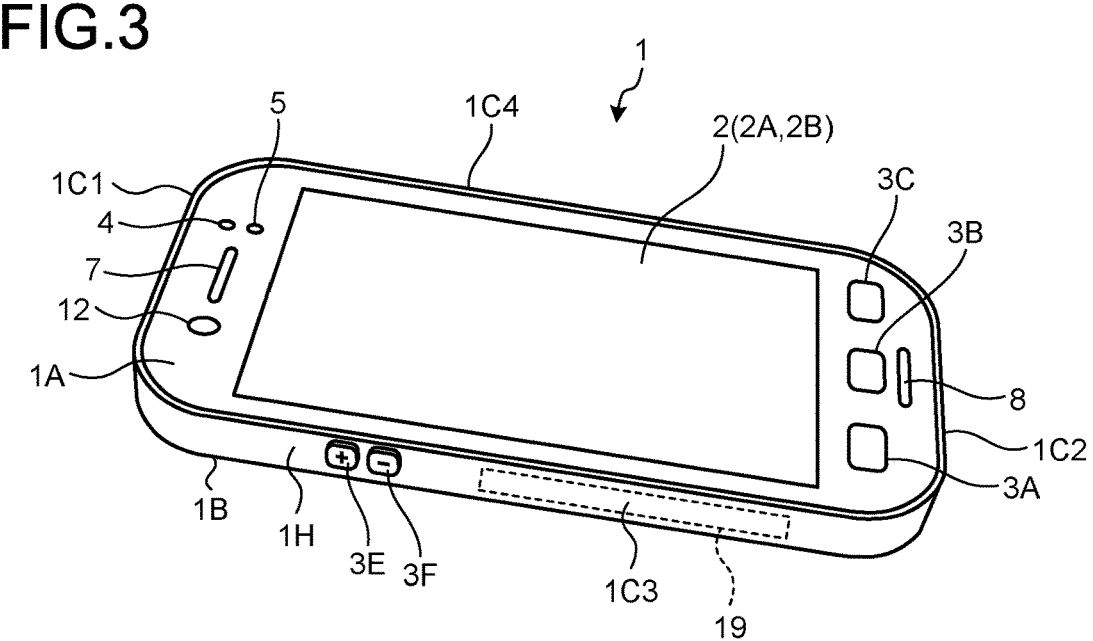
FIG. 3 is a diagram of an exemplary exterior configuration of the mobile device according to embodiments.

A plurality of embodiments of the application concerned is described below in detail with reference to the accompanying drawings. In the following explanation, identical constituent elements are referred to by the same reference numbers. Moreover, the same explanation is not given repeatedly. Furthermore, the factors that are not closely related from the perspective of describing embodiments of the application concerned are neither explained nor illustrated in the drawings.

FIG. 1 is a diagram illustrating an exemplary exterior configuration of a flight device according to embodiments. In FIG. 1 are illustrated a planar view V1 and a front view V2 of a flight device 100 according to embodiments. In the following explanation, the flight device 100 takes a flight as a result of the aerodynamic lift and the thrust generated by rotary wings that are driven by a motor or some other drive mechanism.

As illustrated in FIG. 1, the flight device 100 includes a main body 110, coupling frames 130, rotary wings 150a to 150d, leg portions 170a and 170b, and a camera 190. The flight device 100 is configured as a result of coupling the main body with the rotary wings 150a to 150d using a plurality of coupling frames 130. The main body 110 includes a device mounting unit 111. When not in a flight, the flight device 100 is in a standby state in which the leg portions 170a and 170b are grounded.

The exterior configuration of the flight device 100 as illustrated in FIG. 1 is only exemplary. That is, the external appearance that is formed by the main body 110, the coupling frames 130, the rotary wings 150a to 150d, and the leg portions 170a and 170b need not be limited to the example illustrated in FIG. 1; as well as the number of components, such as the number of coupling frames and the number of rotary wings, need not be limited to the example illustrated in FIG. 1.

FIG. 2 is a diagram illustrating an exemplary mounting method for mounting a mobile device on the flight device according to embodiments. As illustrated in FIG. 2, a mobile device 1 is mounted in a detachably-attachable manner on the device mounting unit 111 in such a way that, for example, the front face of the mobile device 1 faces the planar face side (the positive z-axis direction) of the flight device 100. When the mobile device 1 is mounted on the device mounting unit 111; of the housing of the mobile device 1 (hereinafter, called the "housing"), some part (i.e., some part of a side face 1C explained later) makes tight contact with protruding portions 111a and 111b of the device mounting unit 111. The protruding portions 111a and 111b can be made of an elastic material having moderate elasticity.

As illustrated in FIG. 2, when the mobile device 1 is mounted on the flight device 100, it results in the formation of an unmanned aerial vehicle 100F. Thus, the unmanned aerial vehicle 100F includes the mobile device 1 and the flight device 100, to which the mobile device 1 is connected in a detachably-attachable manner. The case in which the mobile device 1 is connected to the flight device 100 in a detachably-attachable manner includes, for example, the case in which the mobile device 1 is mounted on the flight device 100 in a detachably-attachable manner. For example, the case in which the mobile device 1 is connected to the flight device 100 in a detachably-attachable manner includes, for example, the case in which the mobile device 1 becomes able to take a flight along with the flight device 100. Furthermore, the case in which the mobile device 1 is connected to the flight device 100 in a detachably-attachable manner includes, for example, the case in which the mobile device 1 is mounted on the flight device 100 and becomes able to control the flight power of the flight device 100. In the following explanation, the flight device 100 on which the mobile device 1 is not mounted is sometimes also called the unmanned aerial vehicle 100F.

The front face of the mobile device 1 faces the user of the mobile device 1 or comes in contact with the user. In the following explanation, the front face is sometimes referred to as "front face" or "display surface". Moreover, in the following explanation, the face on the opposite side of the "front face" is sometimes referred to as "back face". Meanwhile, the mobile device 1 represents an example of a "mobile electronic device".

Figure 4:
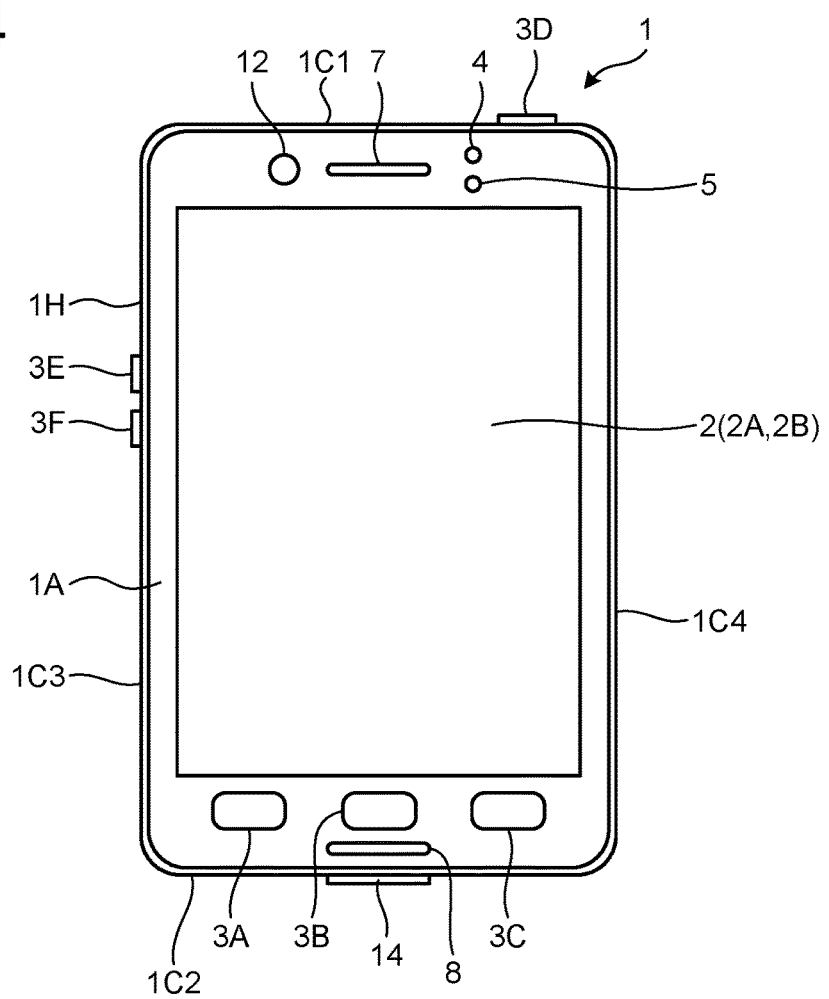
FIG. 4 is a diagram of an exemplary exterior configuration of the mobile device according to embodiments.
Figure 5:
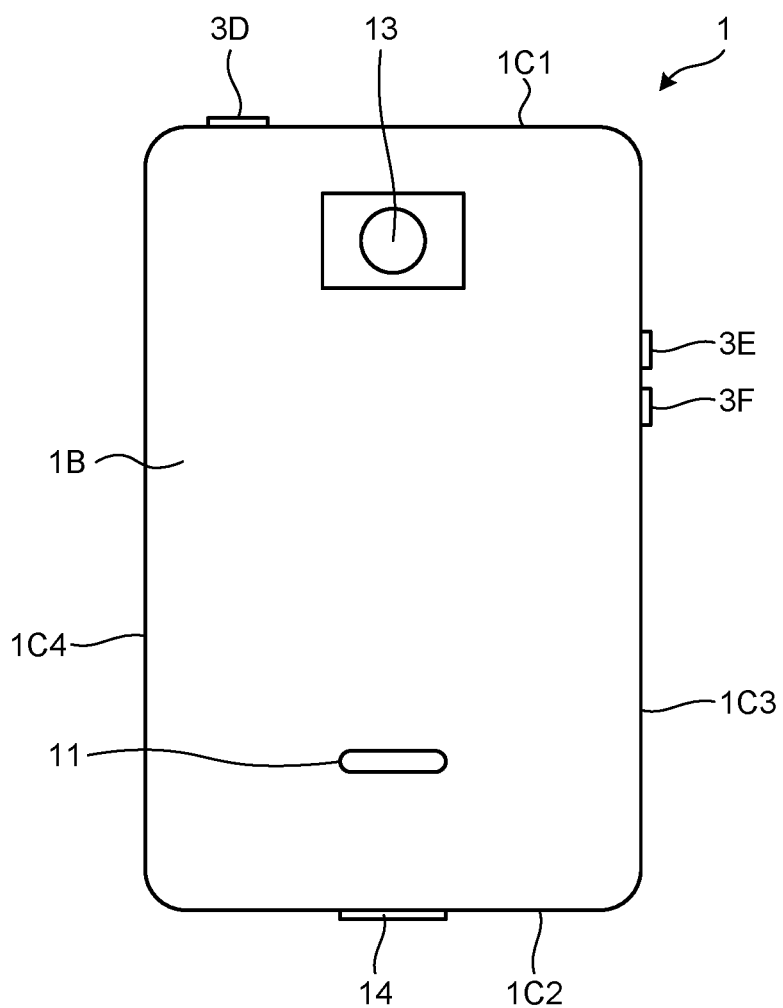
FIG. 5 is a diagram of an exemplary exterior configuration of the mobile device according to embodiments.

FIGS. 3 to 5 are diagrams of an exemplary exterior configuration of the mobile device according to embodiments. As illustrated in FIGS. 3 to 5, the mobile device 1 includes a housing 1H. The faces representing the outer surface of the housing 1H include a front face 1A; a back face 1B representing the back face of the front face 1A; and side faces 1C1 to 1C4 that link the front face 1A to the back face 1B. In the following explanation, sometimes the side faces 1C1 to 1C4 are collectively referred to as side faces 1C without distinguishing among them.

The mobile device 1 includes the following components on the front face 1A: a touchscreen 2B, buttons 3A to 3C, an illumination sensor 4, a proximity sensor 5, a receiver 7, a microphone 8, and a camera 12. Moreover, the mobile device 1 includes a speaker 11 and a camera 13 on the back face 1B. Furthermore, the mobile device 1 includes buttons 3D to 3F and a connector 14 on the side faces 1C. In the following explanation, the buttons 3A to 3F are sometimes collectively referred to as buttons 3 without distinguishing among them.

The mobile device 1 includes a pressure sensor 19 that runs along the side faces 1C3 and 1C4. The pressure sensor 19 is capable of detecting the pressure that gets applied on the side faces 1C3 and 1C4. For example, when the mobile device 1 is mounted on the device mounting unit 111, the pressure sensor 19 can detect the pressure that gets applied on the side faces 1C3 and 1C4 by the protruding portions 111a and 111b.

Figure 6:
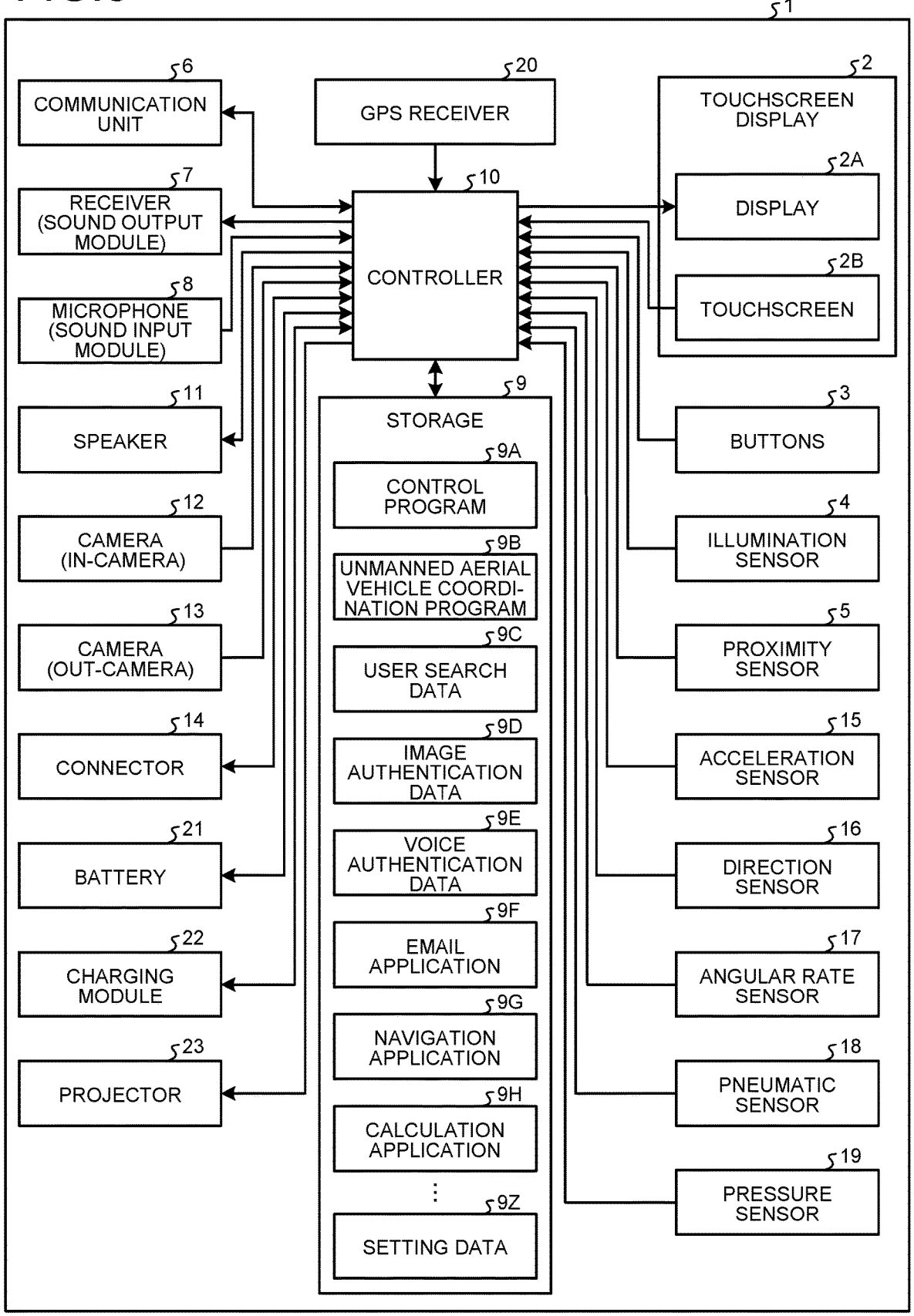
FIG. 6 is a diagram illustrating an exemplary functional configuration of the mobile device according to embodiments.

FIG. 6 is a diagram illustrating an exemplary functional configuration of the mobile device according to embodiments. As illustrated in FIG. 6, the mobile device 1 includes a touchscreen display 2, the buttons 3, the illumination sensor 4, the proximity sensor 5, a communication unit 6, the receiver 7, the microphone 8, a storage 9, a controller 10, a speaker 11, the camera (in-camera) 12, a camera (out-camera) 13, the connector 14, an acceleration sensor 15, a direction sensor 16, an angular rate sensor 17, a pneumatic sensor 18, the pressure sensor 19, a GPS receiver 20, a battery 21, a charging module 22, and a projector 23.

The touchscreen display 2 includes a display 2A and the touchscreen 2B. For example, the display 2A and the touchscreen 2B can be positioned in an overlapping manner, or can be positioned side-by-side, or can be positioned separated from each other. If the display 2A and the touchscreen 2B are positioned in an overlapping manner, for example, one or more sides of the display 2A may not be running along any of the sides of the touchscreen 2B.

The display 2A includes a display device such as a liquid crystal display (LCD: Liquid Crystal Display), an organic EL display (OELD: Organic Electro-Luminescence Display), or an inorganic EL display (IELD: Inorganic Electro-Luminescence Display). The display 2A displays objects such as characters, images, symbols, and diagrams on screens. The screens on which the objects are displayed by the display 2A include a screen called a lock screen, a screen called a home screen, and an application screen that is displayed during the execution of an application. The home screen is also called a desktop, a standby screen, an idle screen, a standard screen, an application list screen, or a launcher screen.

The touchscreen 2B detects a contact or proximity by fingers, a pen, or a stylus pen with respect to the touchscreen 2B. When a plurality of fingers, a pen, or a stylus pen make a contact or come close thereto, the touchscreen 2B is capable of detecting the position of contact of the fingers, or the pen, or the stylus pen. In the following explanation, the position of contact or proximity by a plurality of fingers, a pen, or a stylus pen with respect to the touchscreen 2B as detected by the touchscreen 2B is referred to as the "detected position". The touchscreen 2B notifies the controller 10 about the contact or proximity by fingers with respect to the touchscreen 2B as well as about the detected position. The touchscreen 2B can notify the controller 10 about the detected position as a notification of the contact or proximity. The operations that can be performed by the touchscreen 2B are executable by the touchscreen display 2 that includes the touchscreen 2B. In other words, it serves the purpose even if the touchscreen display 2 performs the operations of the touchscreen 2B.

The controller 10 determines the type of a gesture based on at least one of the following factors: the contact or proximity detected by the touchscreen 2B; the detected position; a change in the detected position; the period of time of continuous contact or proximity; the interval of detection of the contact or proximity; and the number of times of detection of the contact. The operations that can be performed by the controller 10 are executable by the mobile device 1. In other words, it serves the purpose even if the mobile device 1 performs the operations of the controller 10. A gesture implies an operation performed with respect to the touchscreen 2B using the fingers. An operation performed with respect to the touchscreen 2B can be performed using the touchscreen display 2 that includes the touchscreen 2B. Examples of the gestures distinguished by the controller 10 via the touchscreen 2B include, but are not limited to touching, long touching, releasing, swiping, tapping, double tapping, long tapping, dragging, flicking, pinching in, and pinching out.

The "touching" represents a gesture of touching the touchscreen 2B with fingers. The mobile device 1 determines that the gesture of touching the touchscreen 2B with a finger is "touching". The "long touching" represents a gesture of touching the touchscreen 2B with a finger for a period of time longer than a certain period of time. The mobile device 1 determines that the gesture of touching the touchscreen 2B with a finger for a period of time longer than a certain period of time is "long touching".

The "releasing" represents a gesture of moving the finger away from the touchscreen 2B. The mobile device 1 determines that the gesture of moving the finger away from the touchscreen 2B is "releasing". The "swiping" represents a gesture of moving the finger while keeping it in contact with the touchscreen 2B. The mobile device 1 determines that the gesture of moving the finger while keeping it in contact with the touchscreen 2B is "swiping".

The "tapping" represents a gesture of touching followed by releasing. The mobile device 1 determines that the gesture of touching followed by releasing is "tapping". The "double tapping" represents a gesture of successively performing the gesture of touching followed by releasing. The mobile device 1 determines that the gesture of successively performing the gesture of touching followed by releasing is "double tapping".

The "long tapping" represents a gesture of long touching followed by releasing. The mobile device 1 determines that the gesture of long touching followed by releasing is "long tapping". The "dragging" represents a gesture of swiping in which the area displaying a movable object serves as the start point. The mobile device 1 determines that the gesture of swiping in which the area displaying a movable object serves as the start point is "dragging".

The "flicking" represents a gesture of touching the touchscreen 2B and then taking the finger away from the touchscreen 2B while moving it. That is, the "flicking" is a gesture in which touching is followed by releasing while moving the finger. The mobile device 1 determines that the gesture of touching the touchscreen 2B and then taking the finger away from the touchscreen 2B while moving it is "flicking". The flicking is often performed while moving the finger in one direction. The flicking includes "upward flicking" in which the finger is moved in the upward direction of the screen, "downward flicking" in which the finger is moved in the downward direction of the screen, "rightward flicking" in which the finger is moved in the rightward direction of the screen, and "leftward flicking" in which the finger is moved in the leftward direction of the screen. The movement of the finger in flicking is often more rapid than the movement of the finger in swiping.

The "pinching in" represents a gesture of swiping a plurality of fingers closer to each other. The mobile device 1 determines that the gesture in which the distance between the position of a particular finger as detected by the touchscreen 2B and the position of some other finger as detected by the touchscreen 2B becomes shorter is pinching in. The "pinching out" represents a gesture of swiping a plurality of fingers away from each other. The mobile device 1 determines that the gesture in which the distance between the position of a particular finger as detected by the touchscreen 2B and the position of some other finger as detected by the touchscreen 2B becomes longer is pinching out.

In the following explanation, a gesture performed using a single finger is called a "single-touch gesture", and a gesture performed using two or more fingers is called a "multi-touch gesture". Examples of the multi-touch gestures include, but are not limited to pinching in and pinching out. Regarding the tapping, the flicking, and the swiping; those gestures are single-touch gestures if performed using a single finger, and are multi-touch gestures if performed using two or more fingers.

The controller 10 performs operations according to such gestures that are determined via the touchscreen 2B. As a result, intuitively easy-to-use operability can be achieved for the user. The operations that are performed by the controller 10 according to a determined gesture can be different depending on the screen being displayed on the display 2A.

The detection method implemented in the touchscreen 2B can be an arbitrary method such as the capacitive method, the resistive method, the surface acoustic wave method, the infrared method, or the load sensing method.

The buttons 3 receive input of operations from the user. For example, the buttons 3 include the buttons 3A to 3F. There can be an arbitrary number of buttons 3. The controller 10 cooperates with the buttons 3 and detects the operations performed with respect to the buttons 3. Examples of the operations performed with respect to the buttons 3 include, but are not limited to clicking, double clicking, triple clicking, pushing, and multi-pushing.

The buttons 3A to 3C are, for example, a home button, a back button, and a menu button. The button 3D is, for example, the power ON/OFF button (the power button) of the mobile device 1. The button 3D can also double as the sleep/sleep release button. The buttons 3E and 3F are, for example, volume buttons.

The illumination sensor 4 detects illumination. The illumination represents the value of the luminous flux incident on the unit area of the measurement face of the illumination sensor 4. For example, the illumination sensor 4 is used in adjusting the brightness of the display 2A.

The proximity sensor 5 detects, in a non-contact manner, the presence of nearby objects. The proximity sensor 5 includes a light emitting device that emits infrared light, and a light receiving device that receives the reflected light of the infrared light emitted from the light emitting device. The illumination sensor 4 and the proximity sensor 5 can alternatively be configured as a single sensor.

The communication unit 6 performs wireless communication. Examples of the wireless communication standards supported by the communication unit 6 include, but are not limited to the cellular phone communication standards such as 2G, 3G, 4G, and 5G, and the communication standards for near-field communication. Examples of the cellular phone communication standards include, but are not limited to LTE (Long Term Evolution), W-CDMA (registered trademark) (Wideband Code Division Multiple Access), CDMA2000, PDC (Personal Digital Cellular), GSM (registered trademark) (Global System for Mobile Communications), and PHS (Personal Handy-phone System). Examples of the communication standards for near-field communication include, but are not limited to WiMAX (registered trademark) (Worldwide interoperability for Microwave Access), IEEE802.11, Bluetooth (registered trademark), IrDA (Infrared Data Association), NFC (registered trademark) (Near Field Communication), and WPAN (Wireless Personal Area Network). The communication unit 6 can be configured to support one or more of the communication standards mentioned above.

The receiver 7 outputs sound signals, which are sent from the controller 10, as sound. The microphone 8 converts the input voice of the user into sound signals and sends them to the controller 10.

The storage 9 is used to store programs and data. The storage 9 can also be used as the work area for temporarily storing the processing result of the controller 10. The storage 9 can include a semiconductor memory medium and an arbitrary non-transitory memory medium such as a magnetic memory medium. Alternatively, the storage 9 can include a plurality of types of memory medium. Still alternatively, the storage 9 can include a combination of a memory medium such as a memory card, an optical disk, or a magneto optical disk; and a reading device for the memory medium. Still alternatively, the storage 9 can include a memory device such as a RAM (Random Access Memory) that is used as a temporary memory area.

The programs stored in the storage 9 include applications that are executed in the foreground or in the background, and include support programs (not illustrated) that support the operations of the applications. For example, when an application is executed in the foreground, the screens related to that application are displayed on the display 2A. The support programs include, for example, the OS (Operating System). Meanwhile, the programs can be installed in the storage 9 via the wireless communication performed by the communication unit 6 or via a non-transitory memory medium.

The storage 9 can be used to store a control program 9A, an unmanned aerial vehicle coordination program 9B, user search data 9C, image authentication data 9D, voice authentication data 9E, an email application 9F, a navigation application 9G, a calculation application 9H, and setting data 9Z.

The control program 9A can provide functions enabling implementation of the processing related to various operations of the mobile device 1. The functions provided by the control program 9A include a function for adjusting the brightness of the display 2A based on the detection result obtained by the illumination sensor 4. Moreover, the functions provided by the control program 9A include a function for disabling the operations with respect to the touchscreen 2B based on the detection result obtained by the proximity sensor 5. Furthermore, the functions provided by the control program 9A include a function for enabling communication by controlling the communication unit 6, the receiver 7, and the microphone 8. Moreover, the functions provided by the control program 9A include a function for controlling the imaging operation of the cameras 12 and 13. Furthermore, the functions provided by the control program 9A include a function for controlling the communication with external devices connected via the connector 14. Moreover, the functions provided by the control program 9A include a function for performing a variety of control such as changing the information being displayed on the display 2A according to the gesture determined based on the detection result obtained by the touchscreen 2B. Furthermore, the functions provided by the control program 9A include a function for detecting the movement and the stopping of the user, who is carrying the mobile device 1, based on the detection result obtained by the acceleration sensor 15. Moreover, the functions provided by the control program 9A include a function for performing current-location-based processing based on the signals obtained by the GPS receiver 20.

The control program 9A can also provide a function for determining whether or not the mobile device 1 (hereinafter, sometimes appropriately referred to as the "concerned device") is mounted on the flight device 100. For example, based on the detection result obtained by the pressure sensor 19, the control program 9A can determine whether or not the mobile device 1 is mounted on the flight device 100. For example, if the range (distribution) of the pressure acting on the side face 1C is substantially identical to the contact area between the protruding portion 111a of the device mounting unit 111 and the side face 1C3 and is substantially identical to the contact area between the protruding portion 111b and the side face 1C3; then the control program 9A can derive the determination result indicating that the mobile device 1 is mounted on the flight device 100.

Moreover, the control program 9A can provide a function for pairing with the flight device 100 in a communicable state. When the mounting of the mobile device 1 on the flight device 100 can be confirmed, the control program 9A issues a pairing instruction to the unmanned aerial vehicle coordination program 9B for pairing the mobile device 1 with the flight device 100.

Furthermore, the control program 9A can provide a function for determining, based on the detection result obtained by the pneumatic sensor 18, whether or not the flight device 100 having the mobile device 1 mounted thereon is in flight. Furthermore, the control program 9A can provide the function for performing zero point adjustment of the pneumatic sensor 18 when the mobile device 1 is mounted on the flight device 100.

Moreover, the control program 9A can provide a function in which, with respect to an incoming call, a normal conversation is started on condition that a notification about detection of a predetermined operation with respect to the flight device 100 is received from the flight device 100. The normal conversation implies the conversation in which the voice to be transmitted is input to the microphone 8 and the received voice is output from the receiver 7.

Furthermore, the control program 9A can provide a function for performing image recognition by referring to the image authentication data 9D. For example, the control program 9A performs image recognition with respect to the image data received from the flight device 100 or the image data obtained by the mobile device 1; and, based on the result of image recognition, can recognize whether or not the gesture performed by the user of the mobile device 1 is a predetermined gesture. The predetermined gesture implies a hand signal that the user of the mobile device 1 performs toward the flight device 100 as a declaration of intent to respond to the incoming call. Thus, the predetermined gesture is different than any of the abovementioned gestures performed with respect to the touchscreen display 2.

Moreover, the control program 9A can provide a function for performing voice recognition by referring to the voice authentication data 9E. For example, the control program 9A can perform voice recognition with respect to the voice data received from the flight device 100 or the voice data of the mobile device 1; and, based on the result of voice recognition, can recognize whether the voice input by the user of the mobile device 1 is a predetermined voice. The predetermined voice implies a sentence uttered by the user of the mobile device 1 toward the flight device 100 as a declaration of intent to respond to the incoming call.

Furthermore, the control program 9A can provide a function for starting a speaker conversion when the predetermined gesture or the predetermined voice is recognized with respect to the incoming call. The speaker conversation implies the conversation in which the voice to be transmitted is input to the microphone 8 and the received voice is output from the speaker 11.

The unmanned aerial vehicle coordination program 9B can coordinate with the control program 9A and accordingly provide functions for implementing various operations in tandem with the flight device 100. For example, the unmanned aerial vehicle coordination program 9B can convert various instructions meant for the flight device 100 into codes interpretable and executable by the flight device 100, and then can send the codes to the flight device 100.

For example, upon receiving an instruction from the control program 9A, the unmanned aerial vehicle coordination program 9B can establish near-field wireless connection with the flight device 100 using, for example, Bluetooth (registered trademark), and can pair the mobile device 1 with the flight device 100. For example, using the near-field wireless communication established with the flight device 100, the unmanned aerial vehicle coordination program 9B can send a variety of data to and receive a variety of data from the flight device 100. For example, when an incoming call is detected, the unmanned aerial vehicle coordination program 9B can send, to the flight device 100, an instruction for moving closer to the user within a predetermined distance range and the data of the identifier included in the user search data 9C. Meanwhile, for example, when the end of the conversation is detected, the unmanned aerial vehicle coordination program 9B can send a return instruction to the flight device 100.

The user search data 9C is referred to at the time of authenticating the user of the mobile device 1. For example, the user search data 9C contains an identifier that is uniquely assigned to the wearable device that the user of the mobile device 1 is wearing.

The image authentication data 9D represents reference data for recognizing the predetermined gesture made by the user of the mobile device 1 as a declaration of intent to respond to an incoming call. For example, the image authentication data 9D contains templates for recognizing predetermined hand signals by performing pattern matching; or contains a database built in advance as a result of performing machine learning using a multilayer neural network with the aim of recognizing predetermined hand signals.

The voice authentication data 9E represents reference data meant for recognizing a predetermined voice input by the user of the mobile device 1 as a declaration of intent to respond to an incoming call. For example, the voice authentication data 9E represents voice information of the user of the mobile device 1. The voice information may indicate the utterance of any type of sentence, or may indicate the utterance of a specific sentence.

The email application 9F provides email functions such as composition of emails, transmission of emails, reception of emails, and display of emails. The navigation application 9G provides a navigation function for road guidance. The calculation application 9H can provide the function for calculating the number of steps and the energy consumption of the user.

The setting data 9Z contains information about various settings related to the operations of the mobile device 1. For example, the setting data 9Z contains commands (for example, respond to a call) executed when a predetermined gesture is recognized or a predetermined voice is recognized.

Meanwhile, the mobile device 1 can coordinate with a cloud storage via the communication unit 6, and access the files and the data stored in the cloud storage. The cloud storage can be used to store some or all of the programs and the data stored in the storage 9.

The controller 10 includes an arithmetic processing device. Examples of the arithmetic processing device include, but are not limited to a CPU (Central Processing Unit), a SoC (System-on-a-Chip), an MCU (Micro Control Unit), an FPGA (Field-Programmable Gate Array), and a core processor. The controller 10 comprehensively controls the operations of the mobile device 1 and implements various functions.

More particularly, the controller 10 executes the instructions specified in the programs, which are stored in the storage 9, while referring to the data, which is stored in the storage 9, as may be necessary. Then, the controller 10 controls functional components according to the data and the instructions, and accordingly implements various functions. Examples of the functional components include, but are not limited to the communication unit 6, the microphone 8, the speaker 11, and the GPS receiver 20. Moreover, according to the detection results obtained by detecting modules, the controller 10 sometimes varies the control. Examples of the detecting modules include, but are not limited to the touchscreen 2B, the buttons 3, the illumination sensor 4, the proximity sensor 5, the microphone 8, the cameras 12 and 13, the acceleration sensor 15, the direction sensor 16, the angular rate sensor 17, the pneumatic sensor 18, and the pressure sensor 19.

The controller 10 can execute the control program 9A and implement a variety of control related to the operations of the mobile device 1. For example, based on the detection result obtained by the illumination sensor 4, the controller 10 can implement an operation of adjusting the brightness of the display 2A. Moreover, for example, based on the detection result obtained by the proximity sensor 5, the controller 10 can implement an operation of disabling the operations with respect to the touchscreen 2B. Furthermore, for example, the controller 10 can implement an operation of enabling conversation by controlling the communication unit 6, the receiver 7, and the microphone 8. Moreover, for example, the controller 10 can implement an operation of controlling the imaging operation of the cameras 12 and 13. Furthermore, for example, the controller 10 can implement an operation of controlling the communication with external devices connected via the connector 14. Moreover, for example, according to the gesture determined based on the detection result obtained by the touchscreen 2B, the controller 10 can implement an operation of performing a variety of control such as changing the information being displayed on the display 2A. Furthermore, for example, based on the detection result obtained by the acceleration sensor 15, the controller 10 can implement an operation of detecting the movement and the stopping of the user who is carrying the concerned device. Moreover, for example, based on the signals obtained by the GPS receiver 20, the controller 10 can implement current-location-based operations.

As a result of executing the control program 9A, based on the detection result obtained by the pressure sensor 19, the controller 10 can implement an operation of determining whether or not the mobile device 1 is mounted on the flight device 100.

Moreover, as a result of executing the control program 9A and the unmanned aerial vehicle coordination program 9B, the controller 10 can implement an operation of pairing with the flight device 100 in a communicable state.

Furthermore, as a result of executing the control program 9A and the unmanned aerial vehicle coordination program 9B, when an incoming call is received, the controller 10 can implement the operation in which an instruction for moving closer to the user up to a predetermined distance is sent to the flight device 100 along with the identifier included in the user search data 9C.

Moreover, as a result of executing the control program 9A, the controller 10 can implement an image recognition operation of determining whether a predetermined gesture is performed by the user as a declaration of intent to respond to the incoming call.

Furthermore, as a result of executing the control program 9A, the controller 10 can implement a voice recognition operation of determining whether a voice input is performed by the user as a declaration of intent to respond to the incoming call.

The speaker 11 outputs the sound signals, which are sent from the controller 10, as sound. For example, the speaker is used to output the ringtone and music. Herein, either the receiver 7 or the speaker 11 can be equipped with the function of the other component.

The cameras 12 and 13 convert the captured images into electrical signals. The camera 12 is an in-camera for capturing images of the objects facing the display 2A. The camera 13 is an out-camera for taking images of the objects facing the opposite face of the display 2A. Alternatively, the cameras 12 and 13 can be mounted in a functionally and physically integrated manner as a camera unit in which the in-camera and the out-camera can be used in a switchable manner.

The connector 14 is a terminal to which other devices are connected. The connector 14 can be a general-purpose terminal such as a USB (Universal Serial Bus), an HDMI (registered trademark) (High-Definition Multimedia Interface), an MHL (Mobile High-difinition Link), a light peak, Thunderbolt (registered trademark), a LAN connector (Local Area Network connector), or an earphone-microphone connector. Alternatively, the connector 14 can be a dedicatedly-designed connector such as a Dock connector. Examples of the devices connectible to the connector 14 include, but are not limited to a battery charger, an external storage, a speaker, a communication device, and an information processing device.

The acceleration sensor 15 is capable of detecting the direction and the magnitude of the acceleration acting on the mobile device 1. As an example of embodiments, the acceleration sensor 15 of the triaxial type can be used for detecting the acceleration in the X-axis direction, the Y-axis direction, and the Z-axis direction. The acceleration sensor 15 can be configured from the following types: a piezoresistive type, a capacitive type, a piezo element type (a piezoelectric type), a heat-detection-based MEMS (Micro Electro Mechanical Systems) type, a servo type in which an operated movable coil is restored using the feedback current, and a strain gauge type. The acceleration sensor 15 sends the detection result to the controller 10. Thus, the controller 10 can perform a variety of control based on the detection result obtained by the acceleration sensor 15. For example, when the gravitation force acting on the mobile device 1 is output as acceleration by the acceleration sensor 15, the controller 10 becomes able to perform control in which the direction of gravitational force acting on the mobile device 1 is reflected.

The direction sensor 16 is capable of detecting the geomagnetic direction. Then, the direction sensor 16 sends the detection result to the controller 10. Thus, the controller 10 can perform a variety of control based on the detection result obtained by the direction sensor 16. For example, the controller 10 can identify the orientation (direction) of the mobile device 1 from the geomagnetic direction, and can perform control in which the identified direction of the mobile device 1 is reflected.

The angular rate sensor 17 is capable of detecting the angular rate of the mobile device 1. Then, the angular rate sensor 17 sends the detection result to the controller 10. Thus, the controller 10 can perform a variety of control based on the detection result obtained by the angular rate sensor 17. For example, based on whether or not the angular rate is output from the angular rate sensor 17, the controller 10 can perform control in which the rotation of the mobile device 1 is reflected.

The controller 10 is not limited to individually use the detection result obtained by each of the acceleration sensor 15, the direction sensor 16, and the angular rate sensor 17; but can also use the detection results in combination.

The pneumatic sensor 18 is capable of detecting the atmospheric pressure acting on the mobile device 1. The detection result obtained by the pneumatic sensor 18 can also include the variation in the atmospheric pressure in the unit time. The variation in the atmospheric pressure can be a cumulative value of absolute values or scalar values. The unit time can be set to an arbitrary period of time. Then, the pneumatic sensor 18 sends the detection result to the controller 10. Herein, the pneumatic sensor 18 is an example of an "atmospheric pressure detecting module".

The pressure sensor 19 is capable of detecting the pressure acting on the mobile device 1. The pressure sensor 19 can include a plurality of pressure-sensing elements. Based on the detection result obtained by the pressure sensor 19, the controller 10 can also obtain information enabling identification of the range of the pressure (for example, the distribution of the pressure) acting on the mobile device 1.

The GPS receiver 20 is capable of receiving radio signals of a predetermined frequency band from GPS satellites. Then, the GPS receiver 20 demodulates the received radio signals and sends the processed signals to the controller 10.

The battery 21 includes rechargeable battery cells. For example, the battery 21 includes battery cells compatible to the Qi (a global standard of wireless charging system). The battery 21 supplies the charged electrical power to the controller 10 and to the components of the mobile device 1 that require electrical power. Thus, the controller 10 and the components perform operations as a result of receiving the supply of electrical power from the battery 21.

The charging module 22 controls the operation of charging the battery 21. The charging module 22 can receive electrical power from a Qi-compatible battery charger in a non-contact manner using a charging coil, and can charge the battery 21 with that electrical power. Alternatively, the charging module 22 can charge the battery 21 from an external power source via the connector 14.

The projector 23 includes an image projecting mechanism for projecting images. The projector 23 has a light emitting module that projects images. The mobile device 1 projects images from the light emitting module of the projector, that is, emits light that constitutes images, and thus becomes able to project the images on a wall surface, a screen, or a road. The projector 23 performs operations under the control of the controller 10, and projects and displays various images and videos that are sent from the controller 10.

The projector 23 is configured with a light source and an optical system that, according to the image data, switches between projecting and not projecting the light emitted from the light source. For example, as the projector 23, it is possible to use a projector configured with a light source such as a halogen light, an LED light source, or an LD light source; and with an optical system such as an LCD or a DMD (Digital Micro-mirror Device). In that case, the optical system can be disposed over the entire surface of the projection area in a corresponding manner to each pixel, and the images can be projected on the entire surface of the projection area by switching the optical system ON and OFF while matching the light emitted from the light source with the images. Alternatively, as the projector 23, it is possible to use a projector that is configured with an optical system in which a laser light is used as the light source, a switching element is used to switch between transmitting and not transmitting the light emitted from the light source, and a mirror is used to perform raster scanning of the light transmitted through the switching element. In that case, the images can be projected on the projection area by varying, using the mirror, the angle of the light emitted from the laser light, and by scanning the light emitted from the light source over the entire surface of the projection area.

Meanwhile, the mobile device 1 can also include a vibrator. The vibrator makes the mobile device 1 vibrate partially or entirely. In order to cause vibrations, the vibrator includes, for example, a piezoelectric element or an eccentric motor. Moreover, the mobile device 1 can also include other sensors such as a temperature sensor and a humidity sensor. Furthermore, the mobile device 1 is equipped with functional components that are obviously used to maintain the functions of the mobile device 1, and a detecting module that is obviously used in implementing the control of the mobile device 1.

The mobile device 1 can obtain various programs and data by accessing a memory server in the cloud via the communication unit 6.

With reference to FIG. 6, some or all of the programs and data that are stored in the storage 9 can be downloaded from other devices using the communication unit 6. Alternatively, with reference to FIG. 6, some or all of the programs and data that are stored in the storage 9 can be stored in a non-transitory memory medium that is readable by the reading device included in the storage 9. Still alternatively, with reference to FIG. 6, some or all of the programs and data that are stored in the storage 9 can be stored in a non-transitory memory medium that is readable by a reading device connected to the connector 14. Examples of a non-transitory memory medium include, but are not limited to a CD (registered trademark), a DVD (registered trademark), an optical disk such as Blu-ray (registered trademark), a magneto optical disk, a magnetic memory medium, a memory card, and a solid state memory medium.

The configuration of the mobile device 1 as illustrated in FIG. 6 is only exemplary, and can be appropriately modified within the scope of the present invention. In the example illustrated in FIG. 6, although the mobile device 1 includes two cameras, it is possible to include only one camera or no camera in the mobile device 1. Moreover, in the example illustrated in FIG. 6, although the mobile device 1 includes a plurality of sensors for detecting the position and the attitude, it is possible to not include some of the sensors in the mobile device 1. Alternatively, the mobile device 1 can include sensors of some other types for detecting at least either the position or the attitude. Furthermore, the mobile device 1 illustrated in FIG. 6 includes the projector 23. However, the projector 23 can be omitted. If the flight device 100 includes a projector, then the mobile device 1 can project the images from the projector of the flight device 100.

Figure 7:
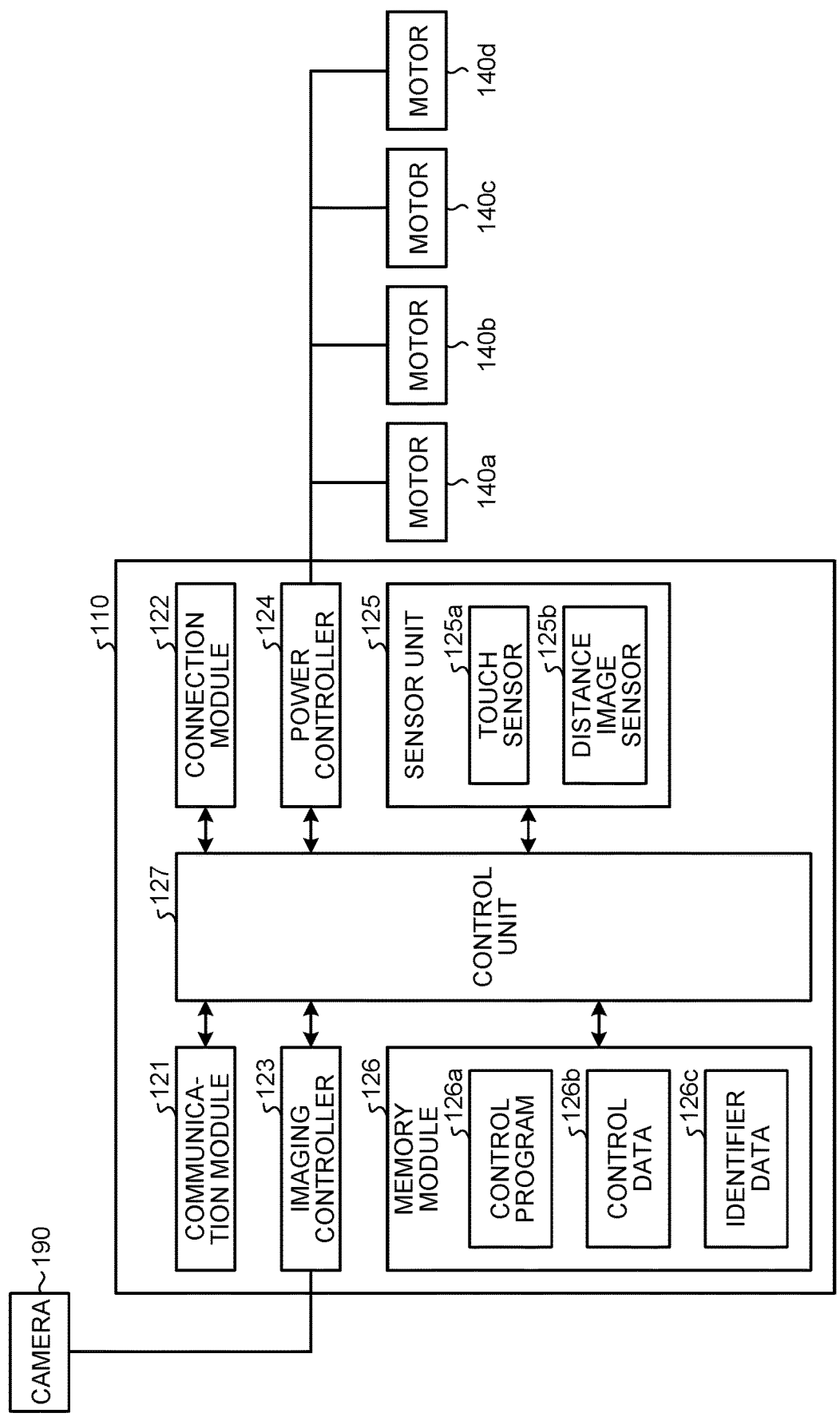
FIG. 7 is a diagram illustrating an exemplary functional configuration of the flight device according to embodiments.

FIG. 7 is a diagram illustrating an exemplary functional configuration of the flight device according to embodiments. As illustrated in FIG. 7, the main body 110 of the flight device 100 includes a communication module 121, a connection module 122, an imaging controller 123, a power controller 124, a sensor unit 125, a memory module 126, and a control unit 127.

The communication module 121 performs communication with the mobile device 1 in regard to the transmission and reception of a variety of data. For example, the communication module 121 performs communication using the near-field wireless connection established with the mobile device 1.

The connection module 122 is a terminal that gets connected to other devices. The connection module 122 can be a general-purpose terminal such as a USB.

The imaging controller 123 controls the capturing of images performed by the camera 190. The control performed by the imaging controller 123 includes controlling the imaging direction of the camera 190.

The power controller 124 controls the driving force of motors 140a to 140d. The motor 140a controls the number of rotations of the rotary wing 150a; the motor 140b controls the number of rotations of the rotary wing 150b; the motor 140c controls the number of rotations of the rotary wing 150c; and the motor 140d controls the number of rotations of the rotary wing 150d.

The sensor unit 125 includes a plurality of sensors for detecting the data to be used in a flight of the flight device 100 and in controlling the devices included in the flight device 100. The sensor unit 125 includes a touch sensor 125a and a distance image sensor 125b. The touch sensor 125a includes a sensor of an arbitrary type such as a capacitive type, a resistive type, a surface acoustic wave type, an ultrasonic type, an infrared type, an electromagnetic induction type, or a load sensing type. Using the touch sensor 125a, the flight device 100 can detect that it has been held by the user of the mobile device 1. For example, the touch sensor 125a can be positioned on the periphery of the main body 110 or on the coupling frames 130 of the flight device 100. Alternatively, a knob for enabling the user to hold the flight device 100 can be disposed on the flight device 100, and the touch sensor 125a can be disposed on the knob. Moreover, the touch sensor 125a can be positioned to sandwich the installation portion thereof. In order to position the touch sensor 125a to sandwich the installation portion thereof, a sheet-like touch sensor 125a can be looped around the installation portion, or at least two touch sensors 125a can be positioned to sandwich the installation portion. In the touch sensor 125a, when a touch by the user is detected at the position sandwiching the installation portion, the flight device 100 can detect that it is being held by the user. The distance image sensor 125b is capable of measuring the distance to an object based on the period of time taken by the light, such as laser light, to reach the object and return therefrom upon reflection. The distance image sensor 125b can emit the laser light in a radial fashion, and can measure the directions of the objects and the distances to the objects present around the flight device 100.

The memory module 126 can be used to store programs and data. The memory module 126 can include a semiconductor memory medium and an arbitrary non-transitory memory medium such as a magnetic memory medium. Alternatively, the memory module 126 can include a combination of a memory medium such as a memory card, an optical disk, or a magneto optical disk; and a reading device for the memory medium. Still alternatively, the memory module 126 can include a memory device such as a RAM that is used as a temporary memory area.

The memory module 126 can be used to store a control program 126a, control data 126b, and identifier data 126c. The control program 126a can provide the functions for implementing the processing related to various operations of the flight device 100. The functions provided by the control program 126a include the functions related to the control of the devices included in the flight device 100. The functions related to the control of the devices include the following functions: the function for establishing near-field wireless connection between the communication module 121 and the mobile device 1, and achieving pairing between them; the function for communicating with the mobile device 1 via the communication module 121; and the function for controlling the image capturing of the camera 190 via the imaging controller 123. The function for communicating with the mobile device 1 includes notifying the mobile device 1 about the detection of a predetermined contact made with the flight device 100.

The functions provided by the control program 126a include various functions related to the flight control of the flight device 100. The functions related to the flight control include a function for controlling the drive force of the motors 140a to 140d based on the detection result obtained by the touch sensor 125a. For example, based on the detection result obtained by the touch sensor 125a, when a predetermined operation with respect to the flight device 100 is detected, the function for controlling the drive force of the motors 140a to 140d includes stopping the motors 140a to 140d. The predetermined operation includes, for example, holding the coupling frames 130 at a minimum of one place. Moreover, the functions related to the flight control include a function for adjusting the flight attitude of the flight device 100 based on the detection result obtained by the sensor unit 125. Furthermore, the functions related to the flight control include a function in which, according to an instruction from the mobile device 1, a search is performed for the user of the mobile device 1 based on the identifier data 126c, and the flight device 100 is moved closer within a predetermined distance range from the user of the mobile device 1 based on the measurement result obtained by the distance image sensor 125b. Moreover, the functions related to the flight control include a function in which, according to an instruction from the mobile device 1, the flight device 100 is returned to a standby station. Furthermore, the functions related to the flight control include a function in which, according to an instruction from the mobile device 1, the flight device 100 is moved to a battery charger.

Moreover, the functions related to the flight control can also include the following functions: a function in which, based on the measurement result obtained by the distance image sensor 125b, information indicating the positional relationship with a particular object present around the flight device 100 is obtained; and a function in which direction information related to the angle (direction) made by the nose of the flight device 100 is detected based on the detection result obtained by the sensor unit 125, and in which rotation angle information is detected that is related to the angle of rotation centered around vertical lines passing through the center positions of the rotary wings 150a to 150d.

The control data 126b is referred to for performing the processing related to various operations of the flight device 100.

The identifier data 126c represents data of the identifier that is uniquely assigned to the wearable device of the user of the mobile device 1. The identifier data 126c corresponds to the data of the identifier included in the user search data 9C stored in the mobile device 1. The identifier data 126c is received from the mobile device 1 and is stored in the memory module 126.

The control unit 127 includes one or more arithmetic devices. Examples of the arithmetic device include, but are not limited to a CPU (Central Processing Unit), a SoC (System-on-a-Chip), an MCU (Micro Control Unit), an FPGA (Field-Programmable Gate Array), and a core processor. The control unit 127 executes the control program 126a in the arithmetic device and implements the processing related to various operations of the flight device 100. Alternatively, the control unit 127 can implement at least some of the functions, which are provided by the control program 126a, using a dedicated IC (Integrated Circuit).

Figure 8:
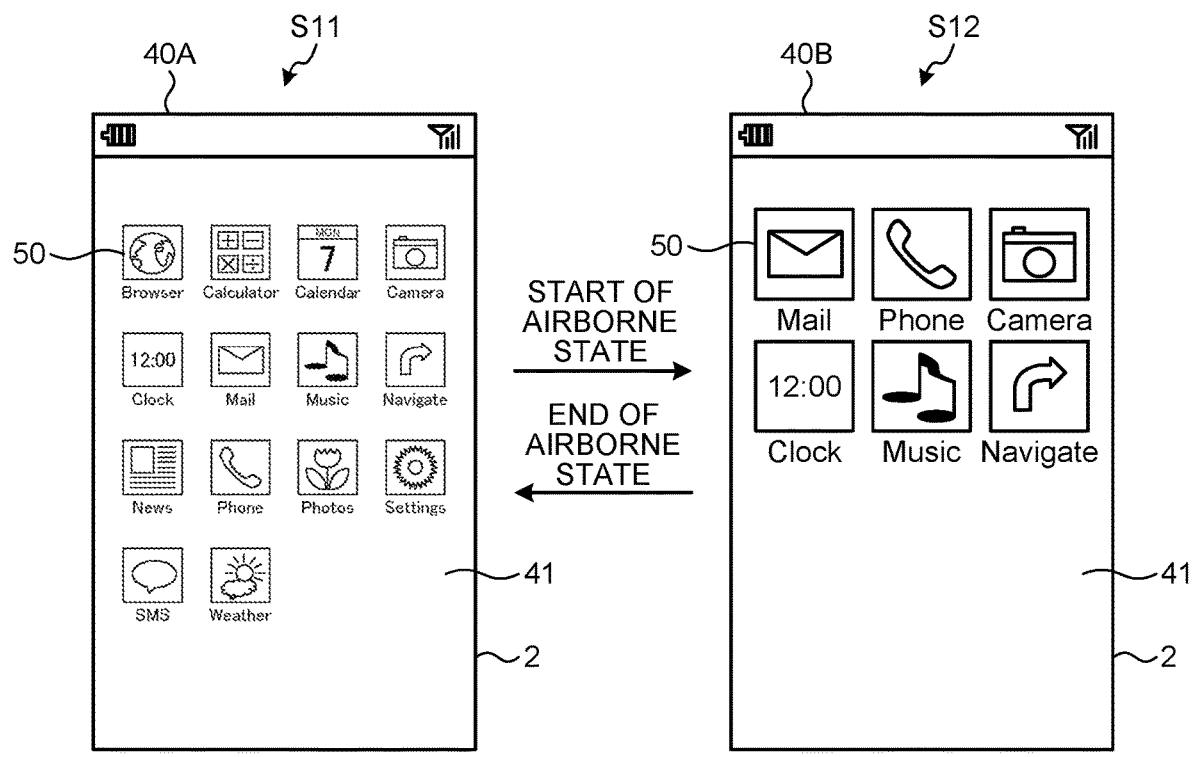
FIG. 8 is a diagram illustrating an example of screens of the mobile device.

Explained below with reference to FIG. 8 is an example of changing the display function using the mobile device 1.

FIG. 8 is a diagram illustrating an example of screens 40A and 40B of the mobile device 1. The screens 40A and 40B include a home screen. The home screen is also called a desktop or an idle screen. The screens 40A and 40B are displayed on the display 2A. The screens 40A and 40B are the screens that enable the user to select the application to be executed from among the applications installed in the mobile device 1. The mobile device 1 executes the application, which is selected in the screen 40A or the screen 40B, in the foreground. An application executed in the foreground results in the display of a different screen than the screens 40A and 40B on the display 2A.

In the mobile device 1, icons can be placed in the screens 40A and 40B. In the screens 40A and 40B illustrated in FIG. 8, a plurality of icons 50 is placed. Each icon 50 is associated in advance with a particular application installed in the mobile device 1. When a particular gesture (such as tapping) is detected with respect to any icon 50 or when a voice request is detected with respect to any icon 50, the mobile device 1 executes the application associated to that icon 50. For example, when tapping is detected with respect to the icon 50 associated to the email application 9F, the mobile device 1 executes the email application 9F.

Each icon 50 includes an image and a character string. Alternatively, each icon 50 can include a symbol or a drawing instead of an image. Still alternatively, an icon 50 may not include either the image or the character string. The icons 50 are placed according to a predetermined rule. On the background of the icons 50, a wallpaper 41 is displayed. The wallpaper 41 is also called a photo screen or a backscreen. In the mobile device 1, an arbitrary image can be used as the wallpaper 41. For example, the image to be used as the wallpaper 41 is decided according to the user settings.

The screen 40A is displayed on the display 2A when the flight device 100 is not airborne. The screen 40B is displayed on the display 2A when the flight device 100 is airborne. The screen 40B has a smaller number of icons 50 than the number of icons 50 displayed in the screen 40A. Moreover, the icons 50 displayed in the screen 40B are bigger in size than the icons 50 displayed in the screen 40A.

For example, from among a plurality of icons 50 displayed in the screen 40A, the icons 50 having a high usage rate can be placed with priority in the screen 40B. For example, from among a plurality of icons 50 displayed in the screen 40A, only those icons 50 which are usable during the flight of the flight device 100 can be placed in the screen 40B. Thus, the icons 50 that are not usable during the flight of the flight device 100 are not placed in the screen 40B. In the example illustrated in FIG. 8, in the screen 40B, the images and the character strings of the icons 50 are bigger in size than the icons displayed in the screen 40A.

Given below is the explanation of an example of changing the display function of the screens 40A and 40B using the mobile device 1 that is mounted on the flight device 100.

At Step S11 illustrated in FIG. 8, the mobile device 1 is mounted on the flight device 100, and the flight device 100 is not airborne. In that state, the mobile device 1 displays the screen 40A on the touchscreen display 2. Then, the mobile device 1 instructs the flight device 100 to start the flight. In response to the instruction from the mobile device 1, the flight device 100 activates the motors 140a to 140d and starts to go airborne. For example, the airborne state of the flight device 100 includes levitation, flight, and hovering.

At Step S12, when the flight device 100 starts to go airborne, the mobile device 1 displays the screen 40B on the touchscreen display 2. Thus, the mobile device 1 changes the screen 40A, which is displayed on the touchscreen display 2, to the screen 40B corresponding to the airborne state of the flight device 100. Thus, in the mobile device 1 that is airborne along with the flight device 100, the screen 40B is displayed on the touchscreen display 2.

For example, when a gesture or a hand signal by the user is detected with respect to any icon 50 via the touchscreen display 2, the mobile device 1 can execute the application associated to that icon 50. For example, based on the voice input via the microphone 8, the mobile device 1 can identify the icon 50 selected by the user, and can execute the application associated to that icon 50. For example, when a predetermined gesture of the user is detected from an image captured using a camera, the mobile device 1 can execute the application associated to the icon 50 for that gesture or the hand signal. For example, when the flight device 100 detects that the user has held the coupling frames 130, the mobile device 1 can execute the application associated to a predetermined icon 50.

Even if the distance between the flight device 100 and the user is large, the size of the icons 50 displayed in the screen 40B is bigger than the icons 50 displayed in the screen 40A. That enables achieving enhancement in the operability while preventing any decline in the visibility of the user when the flight device 100 is airborne.

At Step S12, the mobile device 1 instructs the flight device 100 to end the flight. After ending the airborne state of the flight device 100, the mobile device 1 displays the screen 40A in the touchscreen display 2 as illustrated at Step S11. Thus, based on whether or not the flight device 100 is airborne, the mobile device 1 can switch between displaying the screen 40A and displaying the screen 40B. That eliminates the need for the user to switch between the screens 40A and 40B, thereby enabling achieving enhancement in the operability of the mobile device 1 when mounted on the flight device 100.

Figure 9:
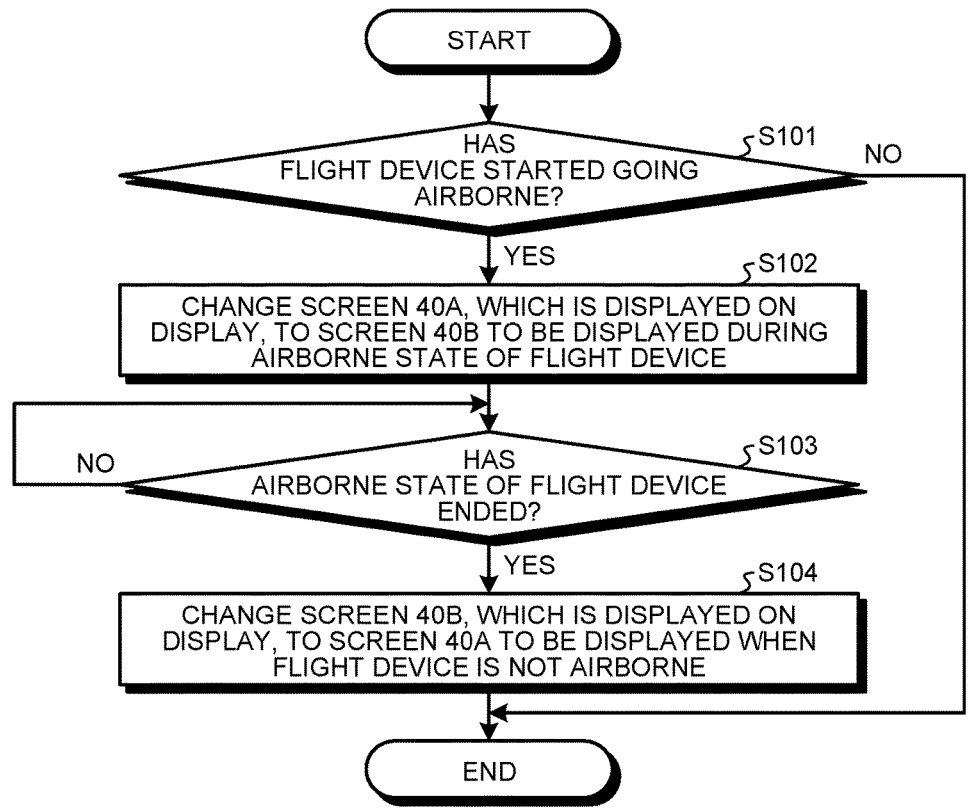
FIG. 9 is a flowchart for explaining an exemplary sequence of operations implemented by the mobile device in controlling the display of the screens.

FIG. 9 is a flowchart for explaining an exemplary sequence of operations implemented by the mobile device 1 in controlling the display of the screens 40A and 40B. The sequence of operations illustrated in FIG. 9 is implemented when the controller 10 executes the control program 9A. Moreover, the sequence of operations illustrated in FIG. 9 is implemented in a repeated manner by the controller 10. The sequence of operations illustrated in FIG. 9 is implemented in the case in which the mobile device 1 is mounted on the flight device 100 and the screen 40A is being displayed on the display 2A.

As illustrated in FIG. 9, the controller 10 of the mobile device 1 determines whether or not the flight device 100 has started to go airborne (Step S101). For example, when the flight device 100 is instructed to start to go airborne, the controller 10 determines that the flight device 100 has started to go airborne. For example, the controller 10 can determine about the start of going airborne by the flight device 100 based on the detection results obtained by the pneumatic sensor 18 and the acceleration sensor 15. If it is determined that the flight device 100 has not started to go airborne (No at Step S101), then it marks the end of the sequence of operations illustrated in FIG. 9. On the other hand, if it is determined that the flight device 100 has started to go airborne (Yes at Step S101), then the system control proceeds to Step S102.

The controller 10 changes the screen 40A, which is displayed on the display 2A, to the screen 40B to be displayed during the airborne state of the flight device 100 (Step S102). When the controller 10 displays the screen 40B on the display 2A, the system control proceeds to Step S103.

The controller 10 determines whether or not the airborne state of the flight device 100 has ended (Step S103). For example, when an instruction to end the airborne state is issued to the flight device 100, the controller 10 determines that the airborne state of the flight device 100 has ended. For example, the controller 10 can determine the end of the airborne state of the flight device 100 based on the detection results obtained by the pneumatic sensor 18 and the acceleration sensor 15. If it is determined that the airborne state of the flight device 100 has not ended (No at Step S103), it implies that the flight device 100 is continuing with the airborne state, and the system control returns to Step S103 explained above. On the other hand, when it is determined that the airborne state of the flight device 100 has ended (Yes at Step S103), the system control proceeds to Step S104.

The controller 10 changes the screen 40B, which is displayed on the display 2A, to the screen 40A to be displayed when the flight device 100 is not airborne (Step S104). When the screen 40B is displayed on the display 2A, it marks the end of the sequence of operations illustrated in FIG. 9.

Given below is the explanation of a charging function of the mobile device 1. When the remaining charge of the battery 21 drops below a predetermined remaining charge, the control program 9A can provide a function for prompting the user to charge the mobile device 1. When the remaining charge of the battery 21 drops below a predetermined remaining charge, the control program 9A can provide a function for automatically charging the mobile device 1 by moving it to a battery charger using the flight device 100. The battery charger can be, for example, a non-contact charging holder or a non-contact battery charger.

The setting data 9Z contains data that, when the mobile device 1 is mounted on the flight device 100, indicates whether to enable or disable the function for automatic charging. The setting data 9Z contains position information indicating the position of installation of the battery charger.

For example, if the remaining charge of the battery 21 drops below the predetermined remaining charge; when not mounted on the flight device 100, the mobile device 1 executes a function for notifying a drop in the remaining charge of the battery 21. On the other hand, if the remaining charge of the battery 21 drops below the predetermined remaining charge; when mounted on the flight device 100, the mobile device 1 changes the function for notifying a drop in the remaining charge of the battery 21. For example, the mobile device 1 changes the function for notifying a drop in the remaining charge of the battery 21 to the function for automatically charging the battery 21. In the function for automatically charging the battery 21, the mobile device 1 controls the flight power of the flight device 100 in such a way that the flight device 100 takes the mobile device 1 to the battery charger.

Figure 10:
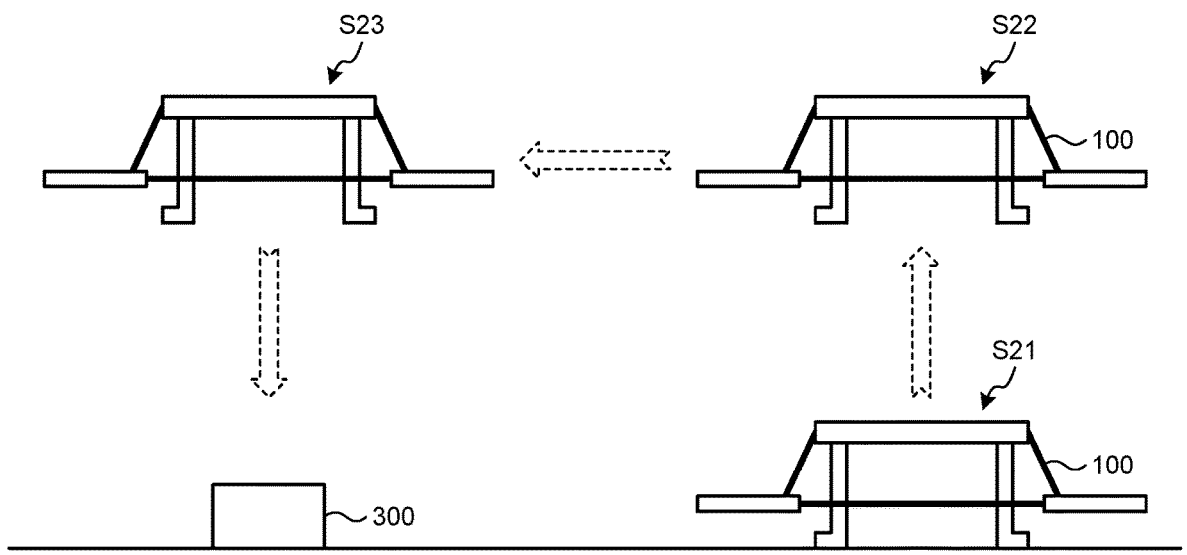
FIG. 10 is a diagram illustrating an example of the operations related to a charging function of the mobile device.

FIG. 10 is a diagram illustrating an example of the operations related to the charging function of the mobile device 1. At Step S21 illustrated in FIG. 10, the mobile device 1 detects, while being mounted on the flight device 100, that the remaining battery charge has dropped below the predetermined remaining charge. Then, the mobile device 1 instructs the flight device 100 to levitate.

At Step S22, in response to the instruction from the mobile device 1, the flight device 100 levitates by activating the motors 140a to 140d. The mobile device 1 searches for a battery charger 300 in the surrounding area using the cameras 12 and 13, or using the camera 190 of the flight device 100, or using the GPS receiver 20. The search for the battery charger 300 can be, for example, a search in which image recognition is performed using an image of the battery charger 300, or a search that is performed using the position information of the battery charger 300 set in advance. In the example illustrated at Step S22, the mobile device 1 has identified the position of the battery charger 300. Then, the mobile device 1 instructs the flight device 100 to take a flight based on the direction of movement and the distance of movement to the identified battery charger 300.

At Step S23, the flight device 100 takes a flight to up above the battery charger 300 and makes a landing toward the battery charger 300. As a result of the landing of the flight device 100, the mobile device 1 gets positioned near the battery charger 300. Then, the battery charger 300 and the charging module 22 charge the battery 21 of the mobile device 1 in a non-contact manner.

When the mobile device 1 is connected to the flight device 100, if the remaining charge of the battery 21 drops below the predetermined remaining charge, the mobile device 1 can make the flight device 100 go airborne and move to the battery charger 300 so that the battery 21 can be charged. The state in which the mobile device 1 is connected to the flight device 100 implies the state in which the mobile device 1 and the flight device 100 are paired or the state in which the mobile device 1 and the flight device 100 are electrically connected using a cable. As a result, it becomes possible to prevent a situation in which the user forgets to charge the mobile device 1 before having to suddenly go out. That enables achieving enhancement in the user-friendliness of the mobile device 1.

Figure 11:
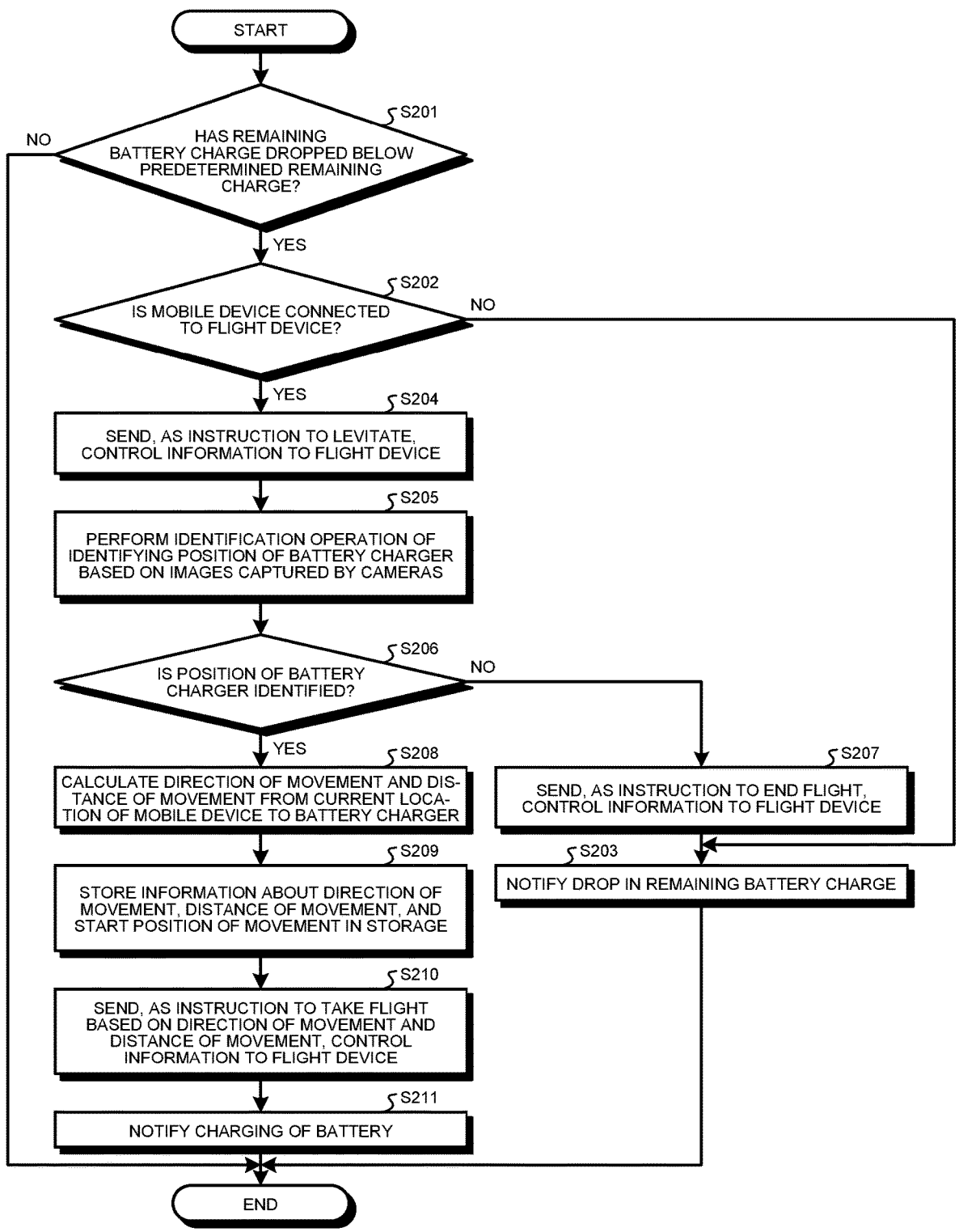
FIG. 11 is a flowchart for explaining an exemplary sequence of operations implemented by the mobile device in controlling the remaining charge of a battery.

FIG. 11 is a flowchart for explaining an exemplary sequence of operations implemented by the mobile device 1 in controlling the remaining charge of the battery 21. The sequence of operations illustrated in FIG. 11 is implemented when the controller 10 executes the control program 9A and the unmanned aerial vehicle coordination program 9B. Moreover, the sequence of operations illustrated in FIG. 11 is implemented in a repeated manner by the controller 10.

As illustrated in FIG. 11, the controller 10 of the mobile device 1 determines whether or not the remaining charge of the battery 21 has dropped below a predetermined remaining charge (Step S201). For example, the predetermined remaining charge can be the remaining charge set in advance for determining whether or not to perform charging, or can be the remaining charge set by the user. If it is determined that the remaining charge of the battery 21 has not dropped below the predetermined remaining charge (No at Step S201), then it marks the end of the sequence of operations illustrated in FIG. 11. On the other hand, if it is determined that the remaining charge of the battery 21 has dropped below the predetermined remaining charge (Yes at Step S201), then the system control proceeds to Step S202.

The controller 10 determines whether or not the mobile device 1 is connected to the flight device 100 (Step S202). The state in which the mobile device 1 is connected to the flight device 100 includes the case in which communication is established with the flight device 100 on which the mobile device 1 is mounted, and the case in which communication is possible with the flight device 100 on which the mobile device 1 is mounted.

If it is determined that the mobile device 1 is not connected to the flight device 100 (No at Step S202), the system control proceeds to Step S203. Then, the controller 10 notifies a drop in the remaining battery charge (Step S203). For example, the controller 10 displays a notification screen on the display 2A for notifying a drop in the remaining battery charge. As a result of displaying the notification screen, the mobile device 1 can notify the user about a drop in the remaining battery charge. When the notification is issued, it marks the end of the sequence of operations illustrated in FIG. 11.

Meanwhile, if it is determined that the concerned device is connected to the flight device 100 (Yes at Step S202), then the system control proceeds to Step S204. The controller 10 sends, as an instruction to levitate, control information to the flight device 100 (Step S204). For example, the controller 10 sends the control information, which contains the levitation height, to the flight device 100 via the communication unit 6. As a result, the flight device 100 levitates to a predetermined height with the mobile device 1 mounted thereon. Then, the system control proceeds to Step S205.

The controller 10 performs an identification operation of identifying the position of the battery charger 300 based on the images captured by the cameras (Step S205). For example, after performing the identification operation, while rotating the flight device 100 at the levitated position, the controller 10 captures images of the surrounding of the mobile device 1 using the cameras of the mobile device 1 or using the camera of the flight device 100. Then, the controller 10 compares the captured images with the image of the battery charger 300 that is provided in advance, and determines whether or not the battery charger 300 is present. If the battery charger 300 is not present, then the controller 10 stores, as the result in the storage 9, the fact that the position of the battery charger 300 could not be found. On the other hand, if the battery charger 300 is present, then the controller 10 calculates the position of the battery charger 300 based on the information such as the current location of the mobile device 1 and the distances to objects as measured by the proximity sensor 5 and a distance sensor. When the identification operation is completed, the system control proceeds to Step S206.

The controller 10 determines whether or not the position of the battery charger 300 could be identified (Step S206). If it is determined that the position of the battery charger 300 could not be identified (No at Step S206), then the system control proceeds to Step S207.

The controller sends, as an instruction to end the flight, controller information to the flight device 100 (Step S207). For example, the controller 10 sends the control information, which represents an instruction to land, to the flight device 100 via the communication unit 6. As a result, the flight device 100 makes a landing with the mobile device 1 mounted thereon. Subsequently, the controller 10 performs the operation at Step S203 explained earlier, and notifies a drop in the remaining battery charge. When the notification is issued, it marks the end of the sequence of operations illustrated in FIG. 11.

On the other hand, if it is determined that the position of the battery charger 300 could be identified (Yes at Step S206), then the system control proceeds to Step S208. The controller 10 calculates the direction of movement and the distance of movement from the current location of the mobile device 1 to the battery charger 300 (Step S208). Moreover, the controller 10 stores the information about the direction of movement, the distance of movement, and the start position of movement in the storage 9 (Step S209). Subsequently, the controller 10 sends, as an instruction to take a flight based on the direction of movement and the distance of movement, control information to the flight device 100 (Step S210). As a result, with the mobile device 1 mounted thereon, the flight device 100 takes a flight in the instructed direction of movement for the instructed distance of movement, and makes a landing toward the battery charger 300 at that position. When the control information is sent to the flight device 100, the system control proceeds to Step S211.

The controller 10 notifies the charging of the battery 21 (Step S211). For example, the controller 10 displays a screen indicating the charging of the battery 21 on the display 2A. Meanwhile, for example, if the battery charger 300 has not been activated, the controller 10 can send information for activating the battery charger 300 via the communication unit 6. When the charging of the battery 21 is notified, it marks the end of the sequence of operations illustrated in FIG. 11.

The mobile device 1 can be additionally equipped with a function that, when the charging of the battery 21 is completed, enables automatic return of the mobile device 1 to the original location (the position at which the flight was started) from the battery charger 300 using the flight device 100. For example, when the completion of charging of the battery 21 is detected, the mobile device 1 can calculate the returning route based on the information about the direction of movement, the distance of movement, and the start position of movement as stored in the storage 9, and can instruct the flight device 100 to take a flight via the returning route.

Meanwhile, when the remaining charge of the battery 21 approaches the predetermined remaining charge, the mobile device 1 can perform automatic charging by taking a flight using the flight device 100 in a time slot in which the user does not use the mobile device 1. For example, regarding the time slot in which the mobile device 1 is not used by the user; the mobile device 1 can be made to learn the behavior pattern of the user, or the user can be asked to set the time slot. The mobile device 1 can perform charging by taking a flight using the flight device 100 in a time slot in which the electrical power rate is cheap, and thus can contribute in the reduction of the expenses on the electrical power rate.

Figure 12:
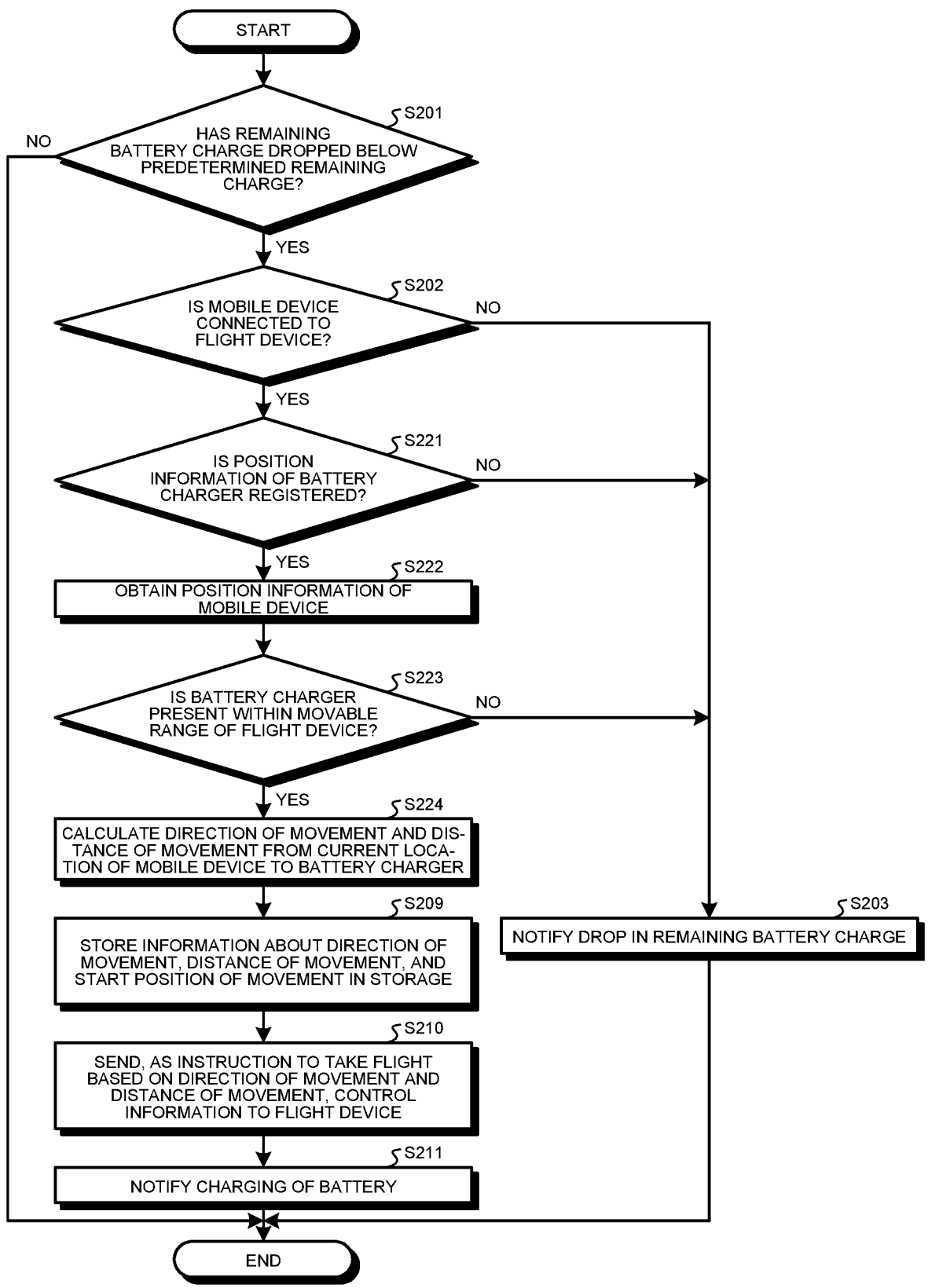
FIG. 12 is a flowchart for explaining another example of the sequence of operations implemented by the mobile device in controlling the remaining charge of the battery.

FIG. 12 is a flowchart for explaining another example of the sequence of operations implemented by the mobile device 1 in controlling the remaining charge of the battery 21. The sequence of operations illustrated in FIG. 12 is implemented when the controller 10 executes the control program 9A and the unmanned aerial vehicle coordination program 9B. Moreover, the sequence of operations illustrated in FIG. 12 is implemented in a repeated manner by the controller 10.

In the example illustrated in FIG. 12, the operations from Step S201 to Step S203 and the operations from Step S209 to Step S211 are identical to the operations from Step S201 to S203 and the operations from Step S209 to Step S211 illustrated in FIG. 11. Hence, the following explanation is given only about the differences, and the identical portion is not explained again.

As illustrated in FIG. 12, the controller 10 of the mobile device 1 performs the operations from Step S201 to Step S203. If it is determined that the mobile device 1 is connected to the flight device 100 (Yes at Step S202), then the system control proceeds to Step S221. Subsequently, the controller 10 determines whether or not the position information of the battery charger 300 has been registered (Step S221). For example, when the position information of the battery charger 300 is set in the setting data 9Z, the controller 10 determines that the position information of the battery charger 300 has been registered.

If it is determined that the position information of the battery charger 300 is not registered (No at Step S221), then the system control returns to Step S203 explained earlier. Thus, the controller 10 performs the operation at Step S203 explained earlier, and notifies a drop in the remaining battery charge. When the notification is issued, it marks the end of the sequence of operations illustrated in FIG. 12.

On the other hand, if it is determined that the position information of the battery charger 300 has been registered (Yes at Step S221), then the system control proceeds to Step S222. The controller 10 obtains the current location of the mobile device 1 using the GPS receiver 20 (Step S222). Then, the controller 10 determines whether or not the battery charger 300 is present within the movable range of the flight device 100 (Step S223). For example, if the distance from the mobile device 1 to the battery charger 300 is shorter than a predetermined distance, then the controller 10 determines that the battery charger 300 is present within the movable range of the flight device 100.

If it is determined that the battery charger 300 is not present in the movable range of the flight device 100 (No at Step S223), then the system control returns to Step S203 explained earlier. The controller 10 performs the operation at Step S203 explained earlier, and notifies a drop in the remaining battery charge. When the notification is issued, the controller 10 ends the sequence of operations illustrated in FIG. 12.

If it is determined that the battery charger 300 is present in the movable range of the flight device 100 (Yes at Step S223), then the system control proceeds to Step S224. The controller 10 calculates the direction of movement and the distance of movement from the current location of the mobile device 1 to the battery charger 300 (Step S224), and the system control returns to Step S209 explained earlier.

The controller 10 stores the information about the direction of movement, the distance of movement, and the start position of movement in the storage 9 (Step S209). Subsequently, the controller 10 sends, as an instruction to take a flight based on the direction of movement and the distance of movement, control information to the flight device 100 (Step S210). As a result, with the mobile device 1 mounted thereon, the flight device 100 takes a flight in the instructed direction of movement for the instructed distance of movement, and makes a landing toward the battery charger 300 at that position. When the control information is sent to the flight device 100, the system control proceeds to Step S211.

The controller 10 notifies the charging of the battery 21 (Step S211). Meanwhile, for example, if the battery charger 300 is not activated, then the controller 10 can send information for activating the battery charger 300 via the communication unit 6. When the charging of the battery 21 is notified, it marks the end of the sequence of operations illustrated in FIG. 12.

In the sequence of operations illustrated in FIG. 12, the explanation is given for the case in which, when it is determined that the position information of the battery charger 300 is not registered (No at Step S221), the system control returns to Step S203 explained earlier. However, that is not the only possible case. Alternatively, when it is determined that the position information of the battery charger 300 is not registered (No at Step S221), the operations from Step S204 onward illustrated in FIG. 11 can be performed and the battery charger 300 can be retrieved.

Given below is the explanation of an exemplary notification function of the mobile device 1. The control program 9A can provide a function for determining the movement state of the mobile device 1 (in other words, the movement state of the user who is carrying the mobile device 1). As a result of execution of the control program 9A by the mobile device 1, the movement state thereof is determined based on the detection results obtained by the acceleration sensor 15, the direction sensor 16, and the angular rate sensor 17 and based on determination data. For example, a plurality of movement states of the mobile device 1 include a stopped state, a stationary state, a walking state, a running state, a movement-in-vehicle state, and a movement-on-bicycle state. The stopped state implies the state in which the user who is carrying the mobile device 1 is at rest. The stationary state implies the state in which the mobile device 1 is put down. The walking state implies the state in which the user who is carrying the mobile device 1 is walking. The running state implies the state in which the user who is carrying the mobile device 1 is running. The movement-in-vehicle state implies the state in which the user who is carrying the mobile device 1 is moving in a vehicle. Examples of the vehicle include, but are not limited to an automobile, a train, a bus, an airplane, or a motorbike. The movement-on-bicycle state implies the state in which the user who is carrying the mobile device 1 is moving on a bicycle.

For example, while being connected to the flight device 100, the mobile device 1 changes the notification function when a predetermined condition is satisfied. The notification function includes, for example, the function for receiving an incoming call, receiving an email, and receiving emergency information. The predetermined condition includes, for example, the condition in which the movement state of the mobile device 1 is the movement-in-vehicle state while being connected to the flight device 100. While being connected to the flight device 100, if the predetermined condition is satisfied, the mobile device 1 does not make the flight device 100 levitate and sends a notification using the notification function while being connected to the flight device 100. On the other hand, while being connected to the flight device 100, if the predetermined condition is not satisfied, the mobile device 1 makes the flight device 100 go airborne near the user and sends a notification using the notification function in the airborne state attributed to the flight device 100.

According to the changes in the movement state thereof, the mobile device 1 can send diversified notifications to the user. When the mobile device 1 connected to the flight device 100 is in the movement-in-vehicle state, since the mobile device 1 does not make the flight device 100 go airborne inside the vehicle, it becomes possible to achieve enhancement in the safety of the notifications sent using the flight device 100.

Figure 13:
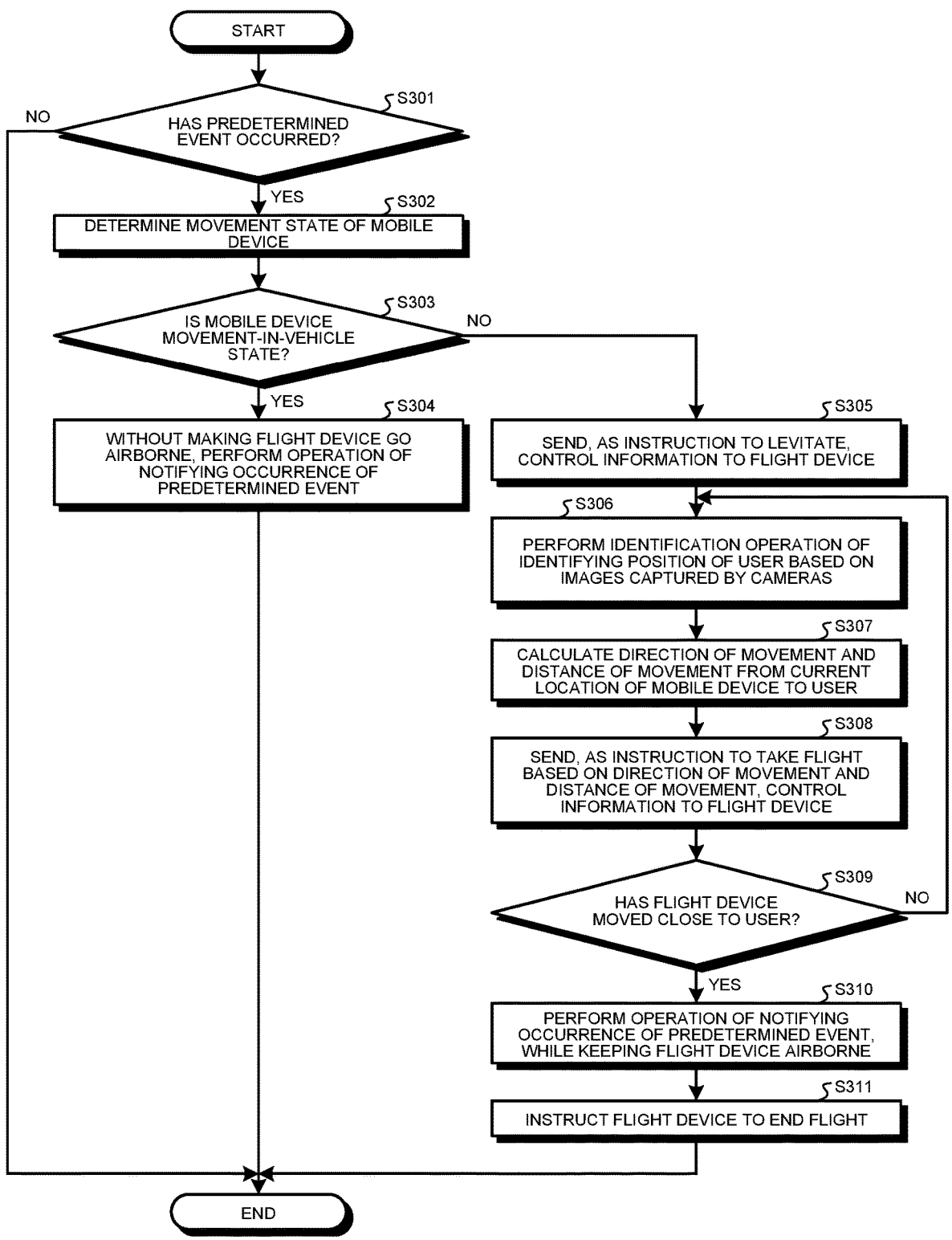
FIG. 13 is a flowchart for explaining an exemplary sequence of operations implemented by the mobile device in controlling a notification function.

FIG. 13 is a flowchart for explaining an exemplary sequence of operations implemented by the mobile device 1 in controlling the notification function. The sequence of operations illustrated in FIG. 13 is implemented when the controller 10 executes the control program 9A and the unmanned aerial vehicle coordination program 9B. Moreover, the sequence of operations illustrated in FIG. 13 is implemented in a repeated manner by the controller 10.

As illustrated in FIG. 13, the controller of the mobile device 1 determines whether or not a predetermined event has occurred (Step S301). Examples of the predetermined event include reception of an email and notification information, and reception of an incoming call. If it is determined that the predetermined event has not occurred (No at Step S301), then it marks the end of the sequence of operations illustrated in FIG. 13. On the other hand, if it is determined that the predetermined event has occurred (Yes at Step S301), then the system control proceeds to Step S302.

The controller 10 determines the movement state of the mobile device 1 (Step S302). For example, the controller 10 compares the acceleration pattern detected by the acceleration sensor 15 with the state-by-state acceleration pattern in the determination data, and determines that the state corresponding to the matching acceleration pattern in the determination data is the state of the mobile device 1. When the movement state of the mobile device 1 is determined, the system control proceeds to Step S303.

Based on the determination result obtained at Step S302, the controller 10 determines whether or not the mobile device 1 is in the movement-in-vehicle state. If it is determined that the mobile device 1 is in the movement-in-vehicle state (Yes at Step S303), then the system control proceeds to Step S304. The controller 10 does not make the flight device 100 go airborne, and performs an operation of notifying the occurrence of a predetermined event (Step S304). For example, the controller 10 displays a notification screen, which indicates the occurrence of a predetermined event, on the display 2A. For example, the controller 10 outputs a notification sound, which indicates the occurrence of a predetermined event, from the speaker 11. As a result, the mobile device 1 notifies the occurrence of the predetermined event without involving the flight device 100. When the occurrence of the predetermined event is notified, it marks the end of the sequence of operations.

Meanwhile, if it is determined that the mobile device 1 is not in the movement-in-vehicle state (No at Step S303), then the system controls proceeds to Step S305. The controller 10 sends, as an instruction to levitate, control information to the flight device 100 (Step S305). For example, the controller 10 sends the control information, which contains the levitation height, to the flight device 100 via the communication unit 6. As a result, the flight device 100 levitates to a predetermined height with the mobile device 1 mounted thereon. Then, the system control proceeds to Step S306.

The controller 10 performs an identification operation of identifying the position of the user based on the images captured by the cameras (Step S306). For example, after performing the identification operation, while rotating the flight device 100 at the levitated position, the controller 10 captures images of the surrounding of the mobile device 1 using the cameras of the mobile device 1 or using the camera of the flight device 100. Then, the controller 10 compares the captured images with the image of the user that is provided in advance, and determines whether or not the user is present. If the user is not present, then the controller 10 stores, as the result in the storage 9, the fact that the position of the user could not be found. On the other hand, if the user is present, then the controller 10 calculates the position of the user based on the information such as the current location of the mobile device 1 and the distance to the user as measured by the proximity sensor 5 and the distance sensor. When the identification operation is completed, the system control proceeds to Step S307.

The controller 10 calculates the direction of movement and the distance of movement from the current location of the mobile device 1 to the user (Step S307). Then, the controller 10 sends, as an instruction to take a flight based on the direction of movement and the distance of movement, control information to the flight device 100 (Step S308). As a result, the flight device 100 takes a flight in the instructed direction of movement for the instructed distance of movement, with the mobile device 1 mounted thereon.

The controller 10 determines whether or not the flight device 100 has moved close to the user (Step S309). For example, if the distance to the user as detected by the proximity sensor 5 is shorter than a predetermined distance, then the controller 10 determines that the flight device 100 has moved close to the user. If it is determined that the flight device 100 has not moved close to the user (No at Step S309), then the system control returns to Step S306 explained earlier. On the other hand, if it is determined that the flight device 100 has moved close to the user (Yes at Step S309), then the system control proceeds to Step S310.

The controller 10 performs an operation of notifying the occurrence of the predetermined event, while keeping the flight device 100 airborne (Step S310). For example, the controller 10 displays a notification screen, which indicates the occurrence of the predetermined event, on the display 2A. As a result, while the flight device 100 is kept airborne close to the user in response to the occurrence of the predetermined event, the mobile device 1 notifies the occurrence of the predetermined event.

After notifying the occurrence of the predetermined event, the controller 10 instructs the flight device 100 to end the airborne state (Step S311). For example, the controller 10 sends, as an instruction to end airborne state (for example, to land), control information to the flight device 100 via the communication unit 6. As a result, the flight device 100 makes a landing with the mobile device 1 mounted thereon. It marks the end of the sequence of operations illustrated in FIG. 13.

Given below is the explanation of an exemplary input function of the mobile device 1. The control program 9A can provide a function in which, when the mobile device 1 is connected to the flight device 100, depending on whether or not a predetermined condition is satisfied, the character input function is changed. The predetermined condition includes, for example, a condition in which the flight device 100 is airborne when the mobile device 1 is connected thereto.

The setting data 9Z contains data that, when the mobile device 1 is mounted on the flight device 100, indicates whether to enable or disable the function for changing the character input depending on the predetermined condition. According to the settings in the setting data 9Z, the mobile device 1 can determine whether or not to enable the function for changing the character input depending on the predetermined condition.

For example, the mobile device 1 can provide an input function in which, when the mobile device 1 is connected to the flight device 100, while the flight device 100 is not airborne, a key-based input screen is displayed on the display 2A and input data is received as a result of to an operation of keys on the input screen. Moreover, the mobile device 1 can provide an input function in which, when the mobile device 1 is connected to the flight device 100, while the flight device 100 is airborne, a voice-input-based input screen is displayed on the display 2A and voice data input from the microphone 8 is received as input data.

Figure 14:
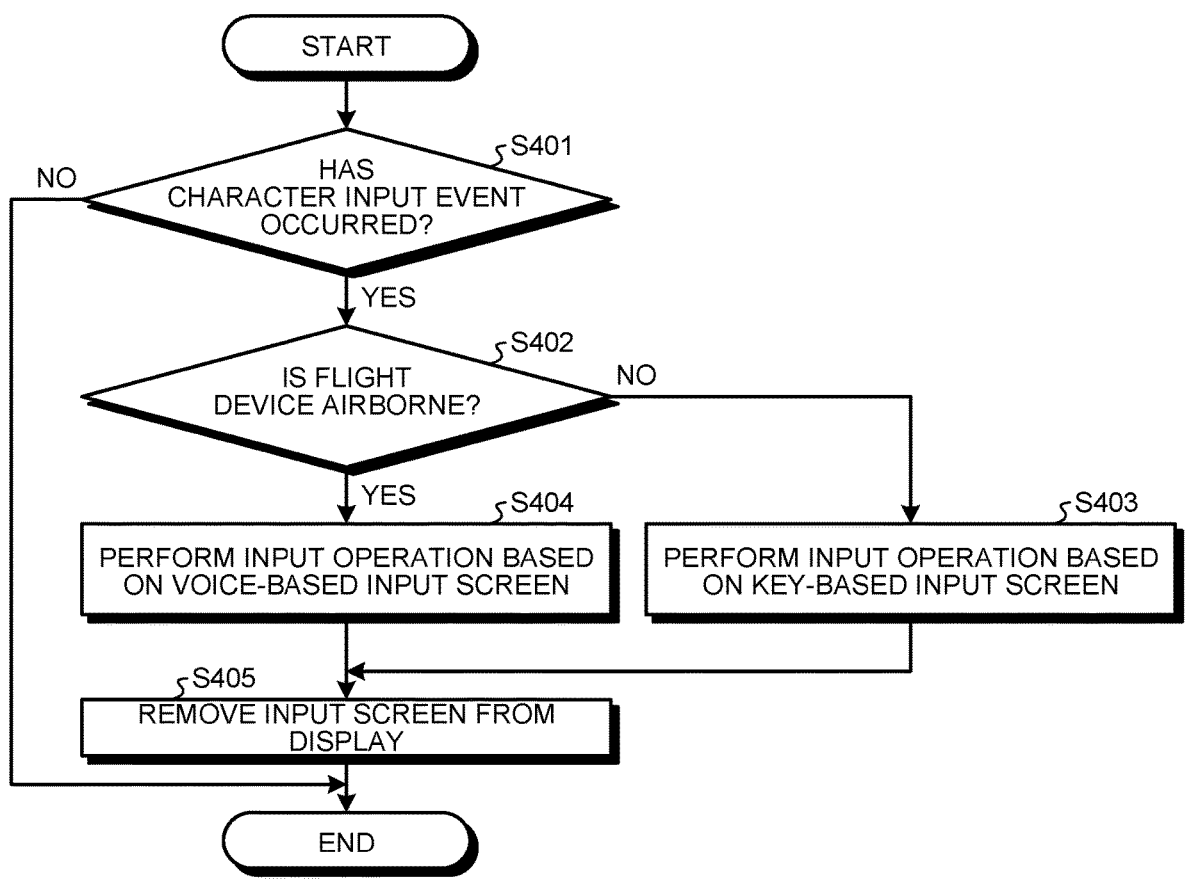
FIG. 14 is a flowchart for explaining an exemplary sequence of operations implemented by the mobile device in controlling an input function.

FIG. 14 is a flowchart for explaining an exemplary sequence of operations implemented by the mobile device 1 in controlling the input function. The sequence of operations illustrated in FIG. 14 is implemented when the controller 10 executes the control program 9A. Moreover, the sequence of operations illustrated in FIG. 14 is implemented in a repeated manner by the controller 10.

As illustrated in FIG. 14, the controller 10 of the mobile device 1 determines whether or not a character input event has occurred (Step S401). For example, a character input event occurs at the time of execution of an application such as a text application, an email application, a telephone application, or a browser application. If it is determined that a character input event has not occurred (No at Step S401), then it marks the end of the sequence of operations illustrated in FIG. 14. On the other hand, if it is determined that a character input event has occurred (Yes at Step S401), then the system control proceeds to Step S402.

The controller 10 determines whether or not the flight device 100 is airborne (Step S402). For example, when an instruction to go airborne is issued to the flight device 100, the controller 10 determines that the flight device 100 is airborne. For example, based on the detection results obtained by the pneumatic sensor 18 and the acceleration sensor 15, the controller 10 can determine whether or not the flight device 100 is airborne.

If it is determined that the flight device 100 is not airborne (No at Step S402), then the system control proceeds to Step S403. The controller 10 performs an input operation based on a key-based input screen (Step S403). In the input operation based on a key-based input screen, an input screen having keys is displayed on the display 2A and, when an input operation with respect to the keys is detected, the characters corresponding to the operated keys are received as input data. For example, the input operation based on a key-based input screen is performed until an end operation is detected. When the input is completed, the controller 10 removes the input screen from the display 2A (Step S405). Once the input screen is removed by the controller 10, it marks the end of the sequence of operations illustrated in FIG. 14.

Meanwhile, if it is determined that the flight device 100 is airborne (Yes at Step S402), then the system control proceeds to Step S404. The controller 10 performs an input operation based on a voice-based input screen (Step S404). In the input operation based on a voice-based input screen, an input screen prompting for a voice input is displayed on the display 2A, and the characters or the character string corresponding to the voice input via the microphone 8 is received as input data. For example, the input operation based on the voice-based input screen is performed until a voice indicating the end is detected. When the voice input is completed, the controller 10 removes the input screen from the display 2A (Step S405). Once the input screen is removed by the controller 10, it marks the end of the sequence of operations illustrated in FIG. 14. Alternatively, if it is determined that the flight device 100 is airborne, the controller 10 can implement the voice-based input operation without displaying any input screen. In that case, the controller 10 can output the input details of the non-displayed input screen from the speaker 11, and assist the user to perform a predetermined voice input.

For example, when the mobile device 1 that is connected to the flight device 100 is airborne, sometimes it is difficult for the user to perform gestures such as touching and flicking with respect to the mobile device 1. When the mobile device 1 is connected to the flight device 100, if the flight device 100 is airborne, the mobile device 1 can change the key-based input to the voice input so that an input can be performed in a non-contact manner, thereby enabling prevention of a decline in the operability. Thus, the mobile device 1 can receive an input even in the airborne state that is attributed to the flight device 100. As a result, the user can be provided with an innovative presentation.

Given below is the explanation of an exemplary email display function of the mobile device 1. The email application 9F can provide a function in which, when the mobile device 1 is connected to the flight device 100, the email display function is changed depending on whether or not a predetermined condition is satisfied. The predetermined condition includes, for example, a condition in which the flight device 100 is airborne when the mobile device 1 is connected thereto.

The setting data 9Z contains data that, when the mobile device 1 is mounted on the flight device 100, indicates whether to enable or disable the email display function depending on the predetermined condition. According to the settings in the setting data 9Z, the mobile device 1 can determine whether or not to change the email display function depending on the predetermined condition.

Figure 15:
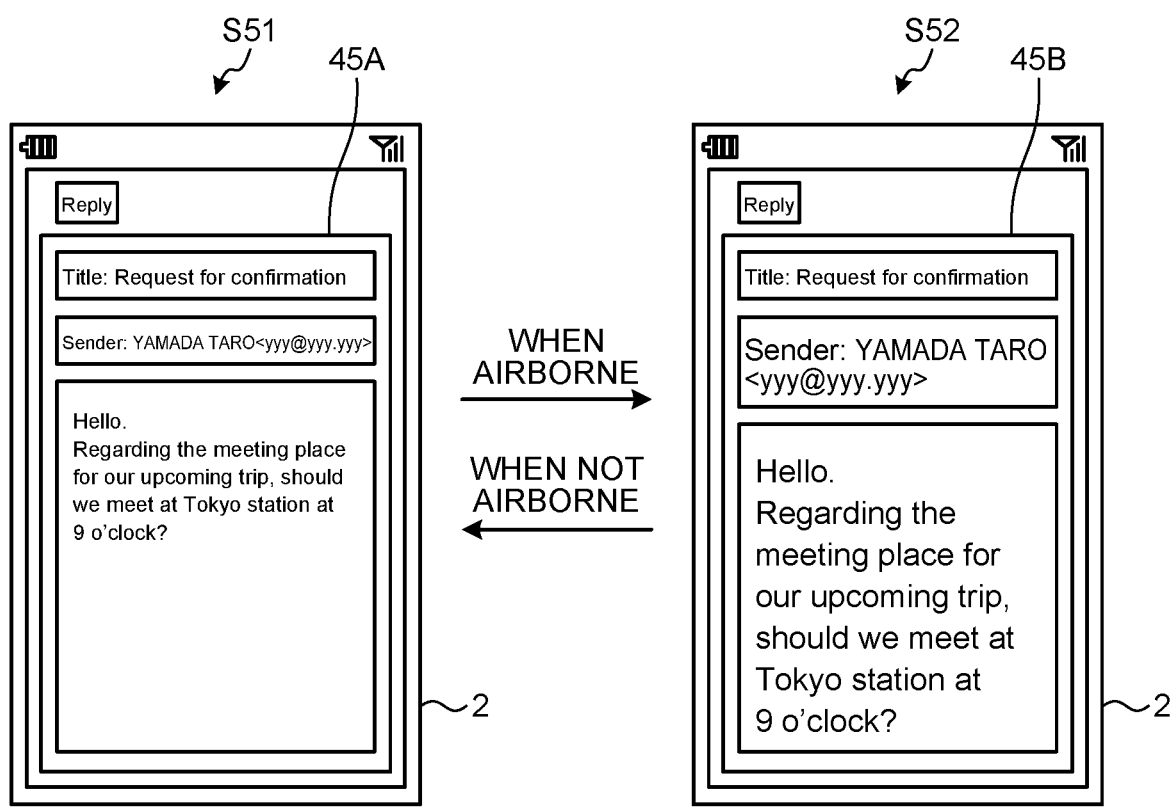
FIG. 15 is a diagram illustrating an example in which the mobile device changes an email display function.

FIG. 15 is a diagram illustrating an example in which the mobile device 1 changes the email display function. As illustrated in FIG. 15, at Step S51, when the mobile device 1 is connected to the flight device 100, if the flight device 100 is not airborne, the mobile device 1 displays an email screen 45A on the touchscreen display 2. In the email screen 45A, the title of the email, the sender of the email, and the body text of the email are displayed in a predetermined font size. The predetermined font size is, for example, set in advance in the mobile device 1, and represents the font size in the case in which the flight device 100 is not airborne. As illustrated in FIG. 15, at Step S52, when the mobile device 1 is connected to the flight device 100, if the flight device 100 is airborne, the mobile device 1 displays an email screen 45B on the touchscreen display 2. In the email screen 45B, the title of the email, the sender of the email, and the body text of the email are displayed in a bigger font size than the font size in the email screen 45A.

With reference to the example illustrated in FIG. 15, the explanation is given about the case in which the title, the sender, and the body text in the email screen 45B are displayed in a bigger font size than the email screen 45A. However, that is not the only possible case. For example, at least either the title, or the sender, or the body text in the email screen 45B can be displayed in a bigger font size than the email screen 45A.

For example, when the flight device 100 is airborne, there is a possibility that the distance between the mobile device 1, which is connected to the flight device 100, and the user goes on increasing; or there is a possibility that the flight device 100 is shaky and unstable. When the flight device 100 having the mobile device 1 connected thereto is airborne, by increasing the font size of the email displayed on the touchscreen display 2, the mobile device 1 becomes able to prevent a decline in the visibility when the flight device 100 is airborne.

Figure 16:
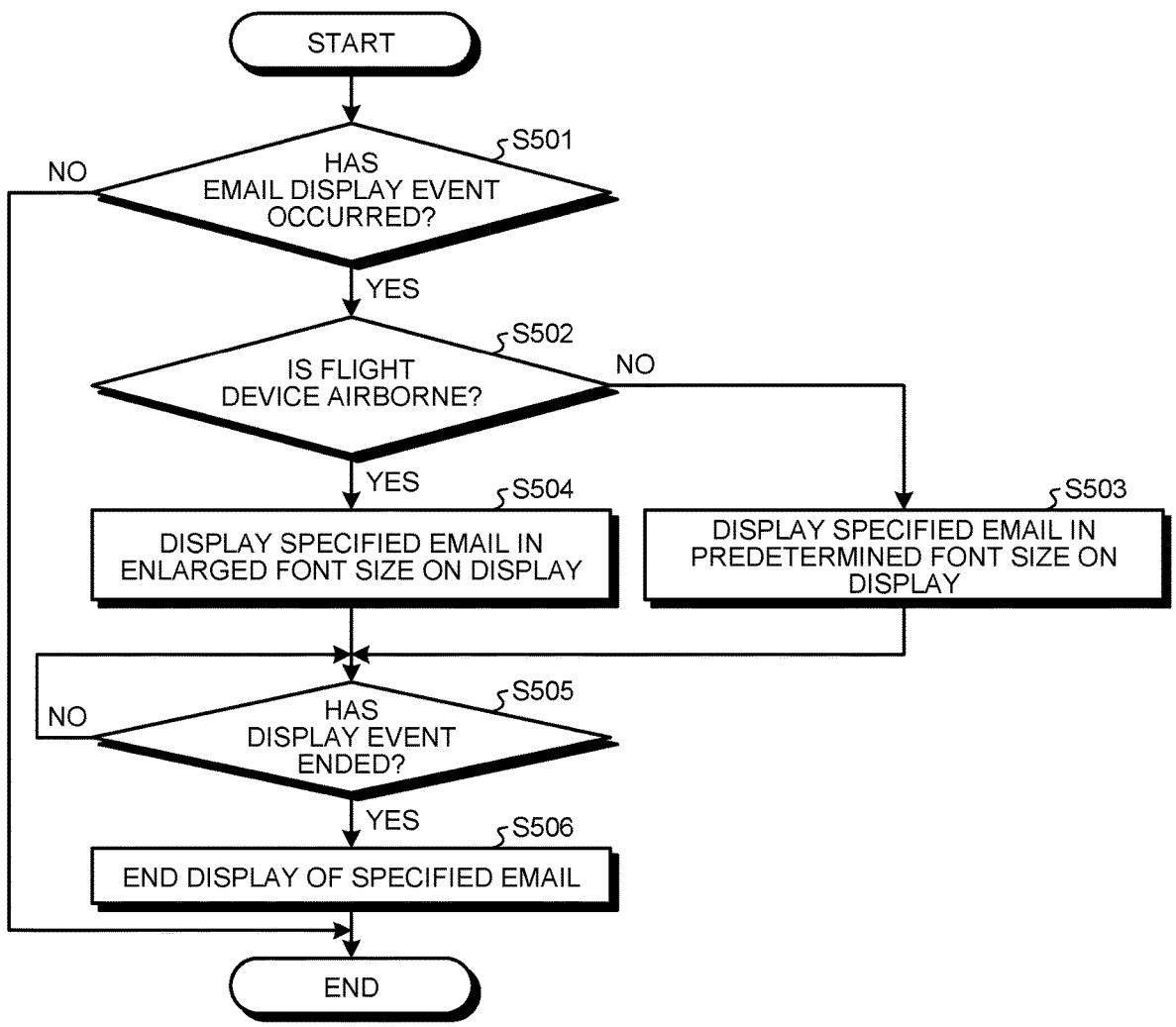
FIG. 16 is a flowchart for explaining an exemplary sequence of operations implemented by the mobile device in controlling the email display function.

FIG. 16 is a flowchart for explaining an exemplary sequence of operations implemented by the mobile device 1 in controlling the email display function. The sequence of operations illustrated in FIG. 16 is implemented when the controller 10 executes the control program 9A. Moreover, the sequence of operations illustrated in FIG. 16 is implemented in a repeated manner by the controller 10.

As illustrated in FIG. 16, the controller 10 of the mobile device 1 determines whether or not an email display event has occurred (Step S501). For example, an email display event occurs when an email is selected from the received email list. If it is determined that an email display event has not occurred (No at Step S501), then it marks the end of the sequence of operations illustrated in FIG. 16. On the other hand, when it is determined that an email display event has occurred (Yes at Step S501), the system control proceeds to Step S502.

The controller 10 determines whether or not the flight device 100 is airborne (Step S502). For example, when an instruction to go airborne is issued to the flight device 100, the controller 10 determines that the flight device 100 is airborne. For example, based on the detection results obtained by the pneumatic sensor 18 and the acceleration sensor 15, the controller 10 can determine whether or not the flight device 100 is airborne.

If it is determined that the flight device 100 is not airborne (No at Step S502), then the system control proceeds to Step S503. The controller 10 displays the specified email in the predetermined font size on the display 2A (Step S503). When the email is displayed, the system control proceeds to Step S505.

On the other hand, if it is determined that the flight device 100 is airborne (Yes at Step S502), the system control proceeds to Step S504. The controller 10 displays the specified email in an enlarged font size on the display 2A (Step S504). For example, the controller 10 increases the font size of the email to be larger than a predetermined font size. When the email is displayed, the system control proceeds to Step S505.

The controller 10 determines whether or not to end the display event (Step S505). If it is determined not to end the display event (No at Step S505), then the system control returns to Step S505. On the other hand, if it is determined to end the display event (Yes at Step S505), then the system control proceeds to Step S506. The controller 10 ends the display of the specified email (Step S506). Once the control removes the email from the display 2A, it marks the end of the sequence of operations illustrated in FIG. 16.

Given below is the explanation of an exemplary map display function of the mobile device 1. The navigation application 9G provides the navigation function for road guidance. Moreover, the navigation application 9G can provide a function in which, when the mobile device 1 is connected to the flight device 100, the map display function is changed depending on whether or not a predetermined condition is satisfied. The predetermined condition includes, for example, a condition in which the flight device 100 is airborne when the mobile device 1 is connected to the flight device 100. The navigation application 9G can provide a navigation function in which, when the mobile device 1 is connected to the flight device 100, navigation is performed while the flight device 100 is kept airborne in front of the user.

The setting data 9Z contains data that, when the mobile device 1 is mounted on the flight device 100, indicates whether to enable or disable the function of changing the map display depending on the predetermined condition. According to the settings in the setting data, the mobile device 1 can determine whether or not to change the map display function depending on the predetermined condition.

Figure 17:
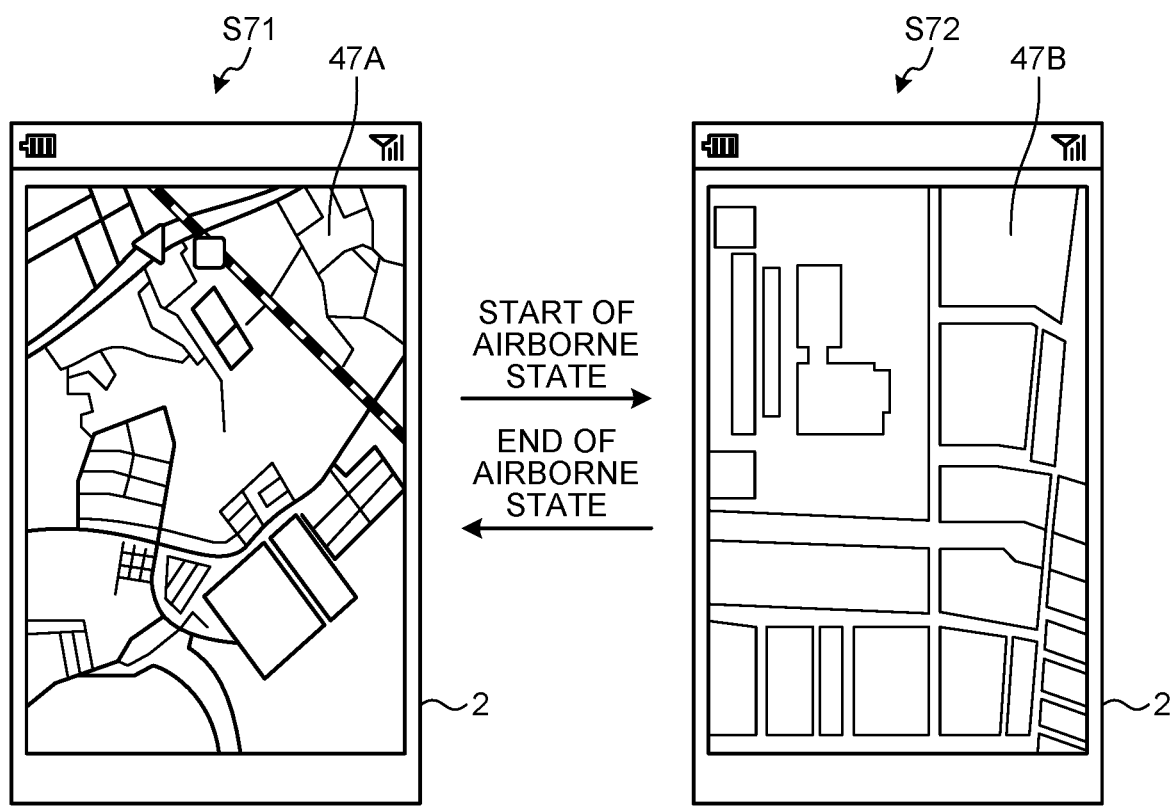
FIG. 17 is a diagram illustrating an example of changing a map display function using the mobile device.

FIG. 17 is a diagram illustrating an example of changing the map display function using the mobile device 1. As illustrated in FIG. 17, at Step S71, when the mobile device 1 is connected to the flight device 100, if the flight device 100 is not airborne, the mobile device 1 displays a map screen 47A on the touchscreen display 2. In the map screen 47A, a map image is displayed in a predetermined display size. As illustrated in FIG. 17, at Step S72, when the mobile device 1 is connected to the flight device 100, if the flight device 100 is airborne, the mobile device 1 displays a map screen 47B on the touchscreen display 2. In the map screen 47B, a map is displayed that is obtained by enlarging the same map image as the map screen 47A.

For example, when the flight device 100 is airborne, there is a possibility that the distance between the mobile device 1, which is connected to the flight device 100, and the user goes on increasing; or there is a possibility that the flight device 100 is shaky and unstable. When the flight device 100 having the mobile device 1 connected thereto is airborne, by enlarging the map displayed on the touchscreen display 2, the mobile device 1 becomes able to prevent a decline in the visibility when the flight device 100 is airborne. Since the user need not be asked to switch between the map display functions, even when the flight device 100 is airborne, the mobile device 1 becomes able to prevent a decline in the user-friendliness.

Figure 18:
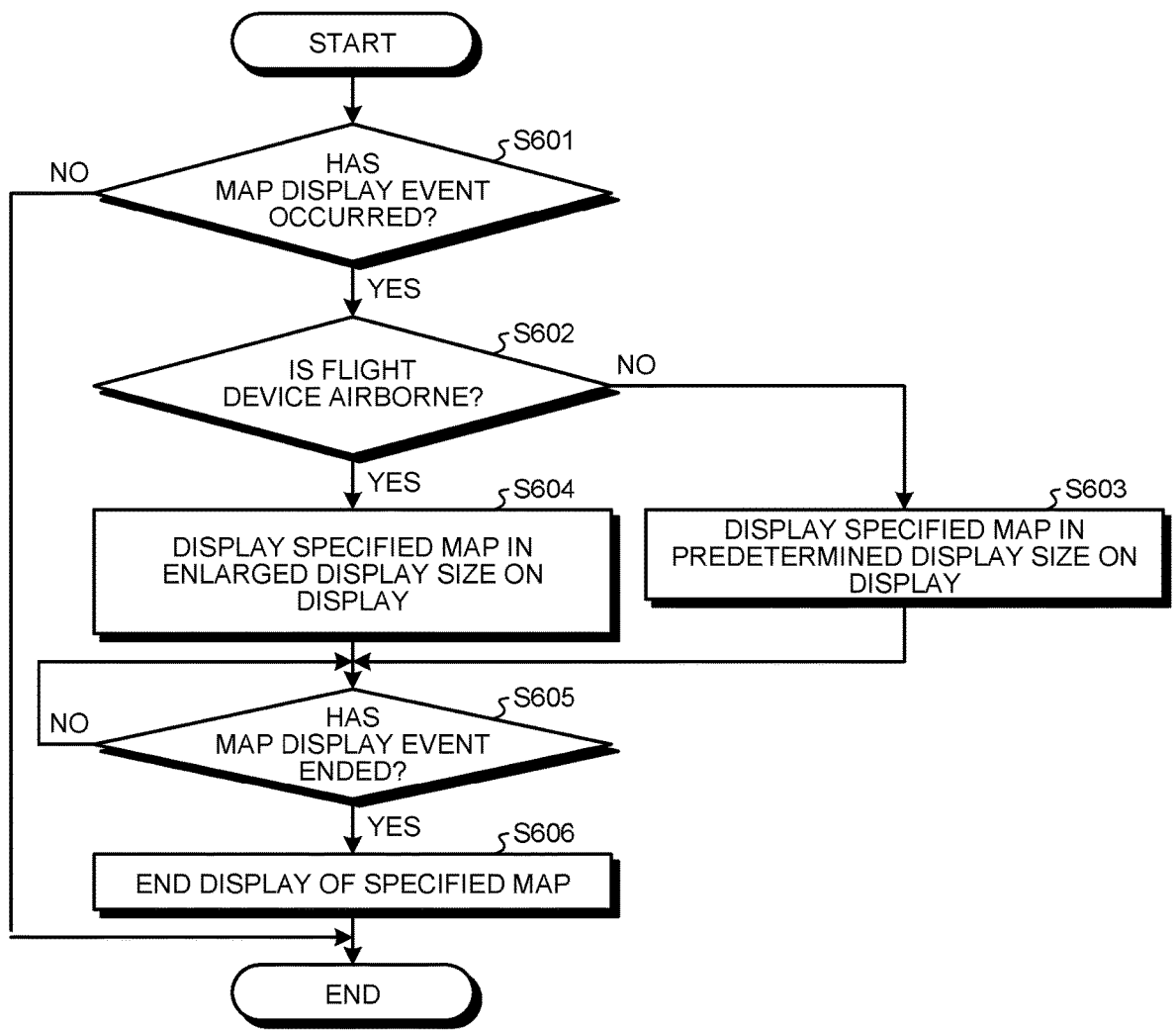
FIG. 18 is a flowchart for explaining an exemplary sequence of operations implemented by the mobile device in controlling the map display function.

FIG. 18 is a flowchart for explaining an exemplary sequence of operations implemented by the mobile device 1 in controlling the map display function. The sequence of operations illustrated in FIG. 18 is implemented when the controller 10 executes the control program 9A. Moreover, the sequence of operations illustrated in FIG. 18 is implemented in a repeated manner by the controller 10.

As illustrated in FIG. 18, the controller 10 of the mobile device 1 determines whether or not a map display event has occurred (Step S601). For example, a map display event occurs at the time of changing or switching the navigation screen. If it is determined that a map display event has not occurred (No at Step S601), then it marks the end of the sequence of operations illustrated in FIG. 18. On the other hand, if it is determined that a map display event has occurred (Yes at Step S601), then the system control proceeds to Step S602.

The controller 10 determines whether or not the flight device 100 is airborne (Step S602). For example, when an instruction to go airborne is issued to the flight device 100, the controller 10 determines that the flight device 100 is airborne. For example, based on the detection results obtained by the pneumatic sensor 18 and the acceleration sensor 15, the controller 10 can determine whether or not the flight device 100 is airborne.

If it is determined that the flight device is not airborne (No at Step S602), then the system control proceeds to Step S603. The controller 10 displays the specified map in a predetermined display size on the display 2A (Step S603). When the map is displayed in the predetermined display size, the system control proceeds to Step S605.

On the other hand, if it is determined that the flight device 100 is airborne (Yes at Step S602), then the system control proceeds to Step S604. The controller 10 enlarges the specified map of the predetermined display size, and displays the enlarged map on the display 2A (Step S604). When the map is displayed in an enlarged size than the predetermined display size, the system control proceeds to Step S605.

The controller 10 determines whether or not to end the display event (Step S605). If it is determined not to end the display event (No at Step S605), then the system control returns to Step S605. On the other hand, if it is determined to end the display event (Yes at Step S605), then the system control proceeds to Step S606. The controller 10 ends the display of the specified map (Step S606). When the controller 10 removes the map from the display 2A, it marks the end of the sequence of operations illustrated in FIG. 18.

Figure 19:
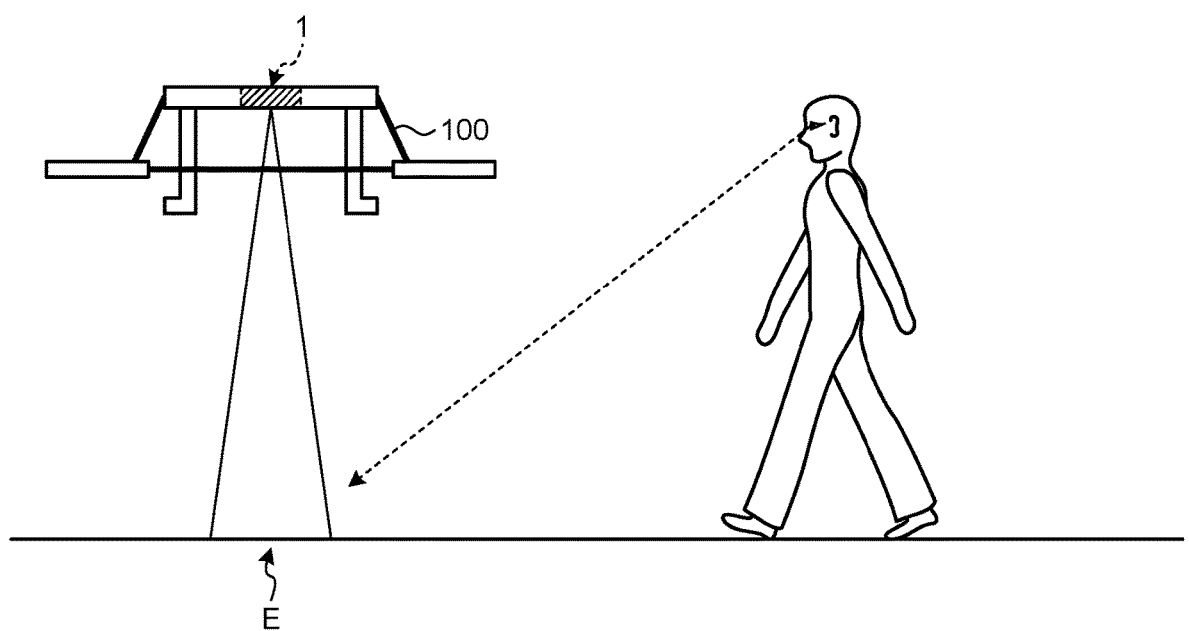
FIG. 19 is a diagram illustrating another example of changing the map display function using the mobile device.

FIG. 19 is a diagram illustrating another example of changing the map display function using the mobile device 1. As illustrated in FIG. 19, when the mobile device 1 is connected to the flight device 100, if the flight device 100 is airborne, the mobile device 1 projects an image of the map on a projection area E of the projector 23 thereof. The projection area E implies the area in which the projector 23 can perform projection. Moreover, the projection area E is an area present on the ground near the user. Furthermore, when the mobile device 1 is in the walking state, the projection area E can be considered as an area on the ground in the direction of travel of the user.

For example, when the flight device 100 is airborne, there is a possibility that the distance between the mobile device 1, which is connected to the flight device 100, and the user goes on increasing; or there is a possibility that the flight device 100 is shaky and unstable. When the flight device 100 having the mobile device 1 connected thereto is airborne, by displaying a map of the image on the ground using the projector 23, the mobile device 1 becomes able to prevent a decline in the visibility when the flight device 100 is airborne. Thus, by making the walking user refer to the map that is projected on the ground, the mobile device 1 becomes able to achieve enhancement in the visibility during the movement attributed to the flight device 100.

Figure 20:
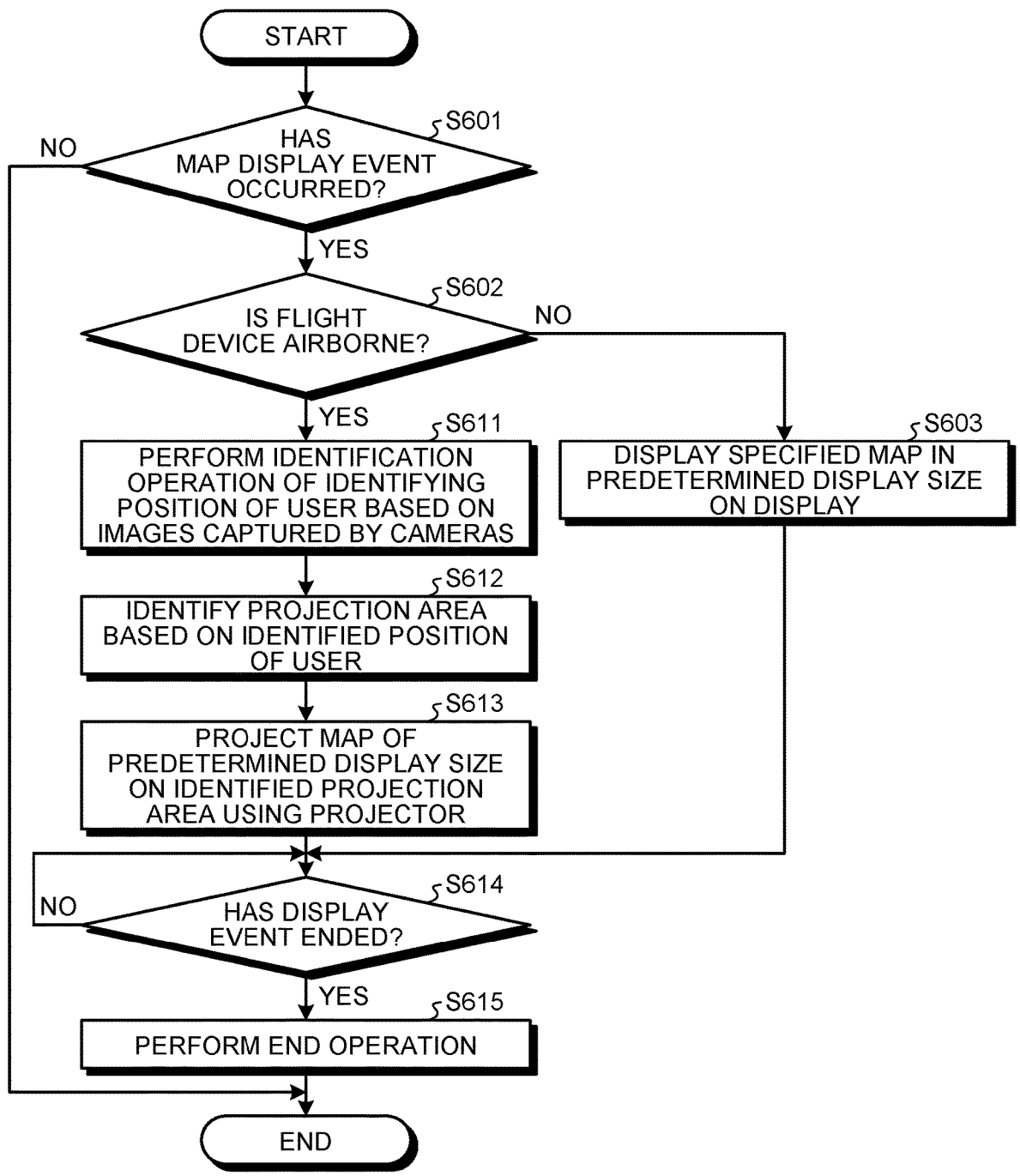
FIG. 20 is a flowchart for explaining another example of the sequence of operations implemented by the mobile device in controlling the map display function.

FIG. 20 is a flowchart for explaining another example of the sequence of operations implemented by the mobile device 1 in controlling the map display function. The sequence of operations illustrated in FIG. 20 is implemented when the controller 10 executes the control program 9A. Moreover, the sequence of operations illustrated in FIG. 20 is implemented in a repeated manner by the controller 10.

As illustrated in FIG. 20, the controller 10 of the mobile device 1 determines whether or not a map display event has occurred (Step S601). For example, a map display event occurs at the time of changing or switching the navigation screen. If it is determined that a map display event has not occurred (No at Step S601), then it marks the end of the sequence of operations illustrated in FIG. 20. On the other hand, if it is determined that a map display event has occurred (Yes at Step S601), then the system control proceeds to Step S602.

The controller 10 determines whether or not the flight device 100 is airborne (Step S602). For example, when an instruction to go airborne is issued to the flight device 100, the controller 10 determines that the flight device 100 is airborne. For example, based on the detection results obtained by the pneumatic sensor 18 and the acceleration sensor 15, the controller 10 can determine whether or not the flight device 100 is airborne.

If it is determined that the flight device is not airborne (No at Step S602), then the system control proceeds to Step S603. The controller 10 displays the specified map in a predetermined display size on the display 2A (Step S603). When the map is displayed in a predetermined display size, the system control proceeds to Step S614.

On the other hand, if it is determined that the flight device 100 is airborne (Yes at Step S602), then the system control proceeds to Step S611. The controller 10 performs an identification operation of identifying the position of the user based on the images captured by the cameras (Step S611). For example, after performing the identification operation, while rotating the flight device 100 at the levitated position, the controller 10 captures images of the surrounding of the mobile device 1 using the cameras of the mobile device 1 or using the camera of the flight device 100. Then, the controller 10 compares the captured images with the image of the user that is provided in advance, and determines whether or not the user is present. If the user is not present, then the controller 10 stores, as the result in the storage 9, the fact that the position of the user could not be found. On the other hand, if the user is present, then the controller 10 calculates the position of the user based on the information such as the current location of the mobile device 1 and the distance to the user as measured by the proximity sensor 5 and the distance sensor. When the identification operation is completed, the system control proceeds to Step S612.

Based on the identified position of the user, the controller 10 identifies the projection area E (Step S612). For example, based on the position of the user, based on the positions of the mobile device 1 and the user, and based on the angle of projection of the projector 23, the controller 10 identifies an area of the object surface near the user as the projection area E. Then, the controller 10 projects the map of a predetermined display size on the identified projection area E using the projector 23 (Step S613). As a result, the mobile device 1 can project the image of the map near the user using the projector 23.

The controller 10 determines whether or not to end the display event (Step S614). If it is determined not to end the display event (No at Step S614), then the system control returns to Step S614. On the other hand, if it is determined to end the display event (Yes at Step S614), then the system control proceeds to Step S615. The controller performs an end operation (Step S615). The end operation includes ending the projection performed by the projector 23. Moreover, the end operation includes removing the map from the display 2A. When the end operation is completed, it marks the end of the sequence of operations illustrated in FIG. 20.

Given below is the explanation of an exemplary navigation function of the mobile device 1. The mobile device 1 can change the navigation function, which is implemented as a result of execution of the navigation application 9G, depending on a predetermined condition. For example, when a request for display-based guidance is detected, the mobile device 1 provides the navigation function based on the display of navigation information. For example, when the mobile device 1 is connected to the flight device 100 and when a request for navigation based on the airborne state of the flight device 100 is detected, the mobile device 1 changes the function to the navigation function based on the airborne state of the flight device 100.

Figure 21:
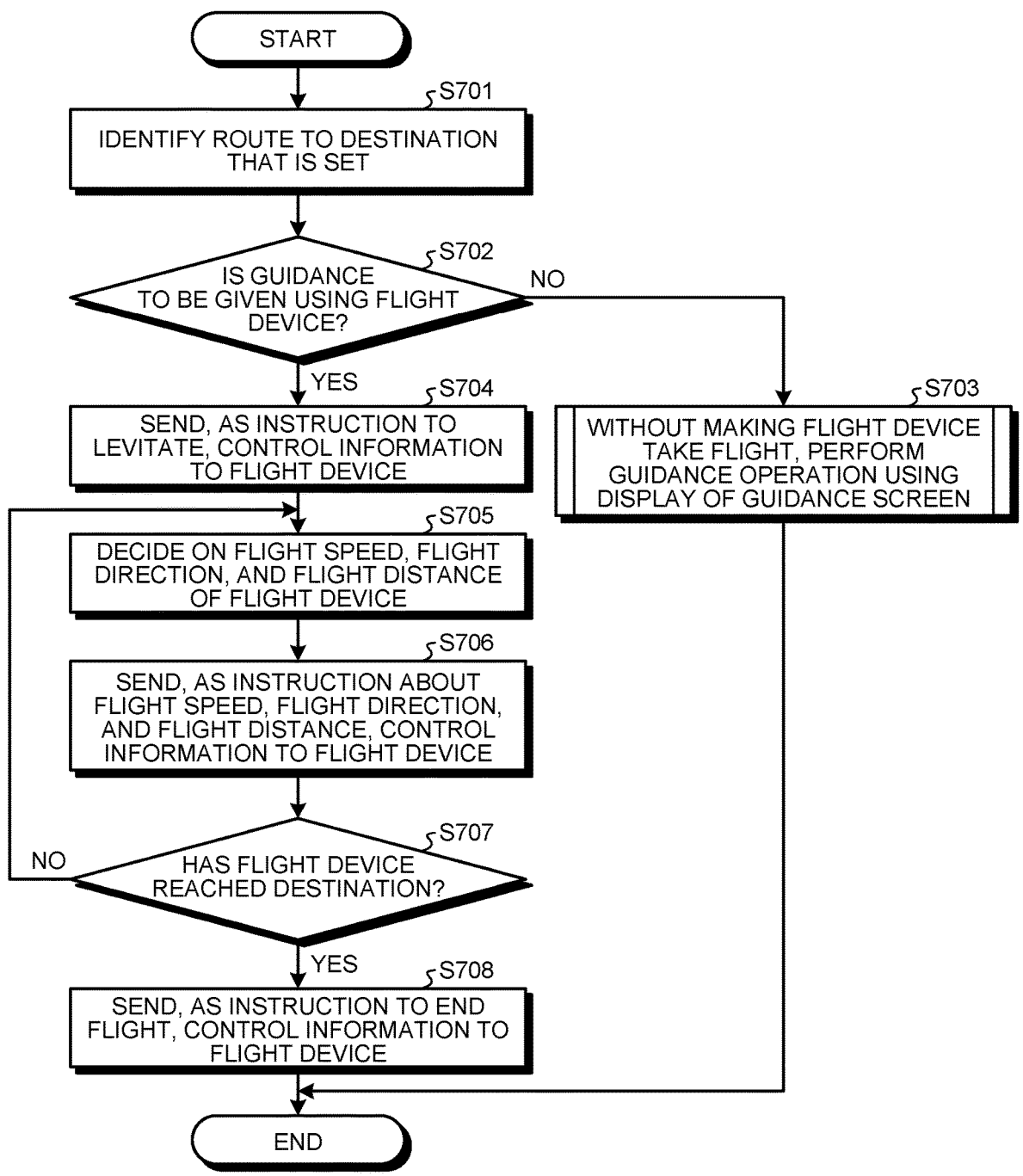
FIG. 21 is a flowchart for explaining an exemplary sequence of operations implemented by the mobile device in controlling a navigation function.

FIG. 21 is a flowchart for explaining an exemplary sequence of operations implemented by the mobile device 1 in controlling the navigation function. The sequence of operations illustrated in FIG. 21 is implemented when the controller 10 executes the control program 9A, the unmanned aerial vehicle coordination program 9B, and the navigation application 9G. In the sequence of operations illustrated in FIG. 21, the control related to avoiding collision with people and obstacles surrounding the flight device 100 is omitted.

As illustrated in FIG. 21, the controller 10 of the mobile device 1 identifies the route to the set destination (Step S701). For example, the mobile device 1 identifies the route based on the current location thereof, the location of the destination, and map information. The controller 10 determines whether or not the guidance is to be given using the flight device 100 (Step S702). For example, if the user requests for guidance using the flight device 100, the controller 10 determines that the guidance is to be given using the flight device 100.

If it is determined that the guidance is not to be given using the flight device 100 (No at Step S702), then the controller 10 determines that the guidance is not to be given using the display on the mobile device 1, and the system control proceeds to Step S703. The controller 10 does not make the flight device 100 take a flight, and performs a guidance operation using the display of a guidance screen (Step S703). The guidance operation includes displaying guidance information till the arrival to the destination on the display 2A. Moreover, the guidance operation includes notifying the information meant for guiding the user when the current location of the mobile device 1 satisfies guidance conditions. For example, the guidance conditions include the detection of approaching a left turn or a right turn, the detection of approaching a landmark, and the detection of approaching the destination. Upon reaching the destination, the guidance operation is ended. When the guidance operation is ended, it marks the end of the sequence of operations illustrated in FIG. 21.

Meanwhile, if it is determined that the guidance is to be given using the flight device 100 (Yes at Step S702), then the system control proceeds to Step S704. The controller 10 sends, as an instruction to levitate, control information to the flight device 100 (Step S704). For example, the controller 10 sends the control information, which contains the levitation height, to the flight device 100 via the communication unit 6. As a result, the flight device 100 levitates to a predetermined height with the mobile device 1 mounted thereon. Then, the system control proceeds to Step S705.

The controller 10 decides on the flight speed, the flight direction, and the flight distance of the flight device 100 (Step S705). For example, based on the route to the destination, based on the current location of the mobile device 1, based on the speed of movement of the user, and based on the distance to the user; the controller 10 decides on the flight speed, the flight direction, and the flight distance of the flight device 100 in such a way that the distance between the flight device 100 and the user is maintained at a constant level. For example, if the distance from the flight device 100 to the user increases, the controller 10 decides on the flight speed, the flight direction, and the flight distance of the flight device 100 in such a way that the flight device 100 can take a standstill flight of staying at the same place without moving around. Then, the system control proceeds to Step S706.

The controller 10 sends control information as an instruction about the flight speed, the flight direction, and the flight distance (Step S706). For example, the controller 10 sends the control information, which contains the flight speed, the flight direction, and the flight distance, to the flight device 100 via the communication unit 6. As a result, based on the control information, the flight device 100 takes a flight to the instructed position with the mobile device 1 mounted thereon, or hovers at the same place. Then, the system control proceeds to Step S707.

Based on the current location of the concerned device, the controller 10 determines whether or not the flight device 100 has reached the destination (Step S707). If it is determined that the flight device has not reached the destination (No at Step S707), then the system control returns to Step S705 explained earlier. On the other hand, if it is determined that the flight device has reached the destination (Yes at Step S707), then the system control proceeds to Step S708.

The controller 10 sends, as an instruction to end the flight, control information to the flight device 100 (Step S708). For example, the controller 10 sends the control information, which instructs landing, to the flight device 100 via the communication unit 6. As a result, the flight device 100 makes a landing with the mobile device 1 mounted thereon. It marks the end of the sequence of operations illustrated in FIG. 21.

As a result of guiding the user to the destination using the flight device 100 that is flown, the user no more needs to walk while looking at the display 2A. Thus, the mobile device 1 enables achieving enhancement in the safety of the user who needs guidance. For example, in the case of guiding the user to the destination using the flight device 100 that is flown, by projecting the image of the map and the guidance information from the projector 23 on the projection area E in front of the user, the mobile device 1 enables achieving enhancement in the user-friendliness.

Given below is the explanation of an exemplary health function of the mobile device 1. The control program 9A provides a function in which, based on the value of acceleration detected by the acceleration sensor 15, it is determined whether the user carrying the mobile device 1 is moving in a predetermined manner of movement.

The calculation application 9H is used in, for example, calculating the energy consumption of the user. For example, the calculation application 9H provides a function for calculating the energy consumption of the user by applying the movement speed of the user to the relational expression between the movement speed (the number of steps) of the user and the energy consumption. The energy consumption of the user can also be calculated by taking into account the manner of movement of the user. For example, when the user walks for the same number of steps, the calculation application 9H can change the relational expression of the energy consumption depending on whether the user is walking or running. Moreover, the energy consumption of the user can be calculated by taking into account the movement environment of the user. For example, when the user walks for the same number of steps, the calculation application 9H can change the relational expression of the energy consumption depending on whether the user walked on a flat road or an ascending slope. As the energy consumption, for example, based on the Measurement Act of Japan, thermodynamic calorie (cal) is adapted as "the measurement of the amount of heat of the substances ingested by a person or an animal or the measurement of the amount of heat consumed due to the metabolism or a person or an animal". However, the measurement of the energy consumption is not limited to that case, and alternatively joule (J) can be adapted based on the CGPM (Conference General des Poids et Measures).

Meanwhile, the target for calculation by the calculation application 9H is not limited to the energy consumption of the user. Alternatively, the number of steps taken by the user at the time of moving due to exercising or walking can be calculated. Herein, "exercising" represents the unit indicating the amount of physical activity. The exercising is the amount of motion calculated by multiplying the period of time of performing the physical activity to METs (metabolic equivalents) (described later). The MET represents the unit indicating the intensity of physical activity. The intensity of physical activity differs for each type of physical activity. The MET is set, for example, for each manner of movement of the user. The MET can be used in calculating the energy consumption that is an activity factor indicating the amount of activity. The MET is expressed as the ratio with respect to the physical activity during rest. For example, the state of sitting in rest is considered to be equal to 1 MET, and normal walking is considered to be equal to 3 METs. It implies that the intensity of the physical activity during normal walking is triple the intensity of the physical activity during rest.

When the mobile device 1 has the movement state as the walking state or the running state, it can provide the health function for calculating the number of steps and the energy consumption of the user by using the calculation application 9H. When the mobile device 1 that is connected to the flight device 100 satisfies a predetermined condition, it changes the health function thereof.

For example, when mounted on the flight device 100, if the mobile device 1 detects the movement speed based on the vibrations attributed to the movement of the user, then it cannot detect the vibrations. Hence, when the predetermined condition indicates that the mobile device 1 is mounted on the flight device 100 and that the flight device 100 is airborne, the mobile device 1 changes the health function meant for the case in which the user is carrying the mobile device 1. Based on the amount of movement of the flight device 100, the mobile device 1 can estimate the movement speed (the number of steps) and the energy consumption of the user. Even when the mobile device 1 is moving on account of being connected to the in-flight flight device 100, it can estimate the movement speed (the number of steps) and the energy consumption of the user, thereby enabling prevention of a decline in the user-friendliness. As a result, even if the mobile device 1 is not being carried by the user, it can keep an activity log about the number of steps and the energy consumption. Thus, by expanding the opportunities for the user of the mobile device 1 by connecting the mobile device 1 to the flight device 100, it becomes possible to provide innovative services.

Figure 22:
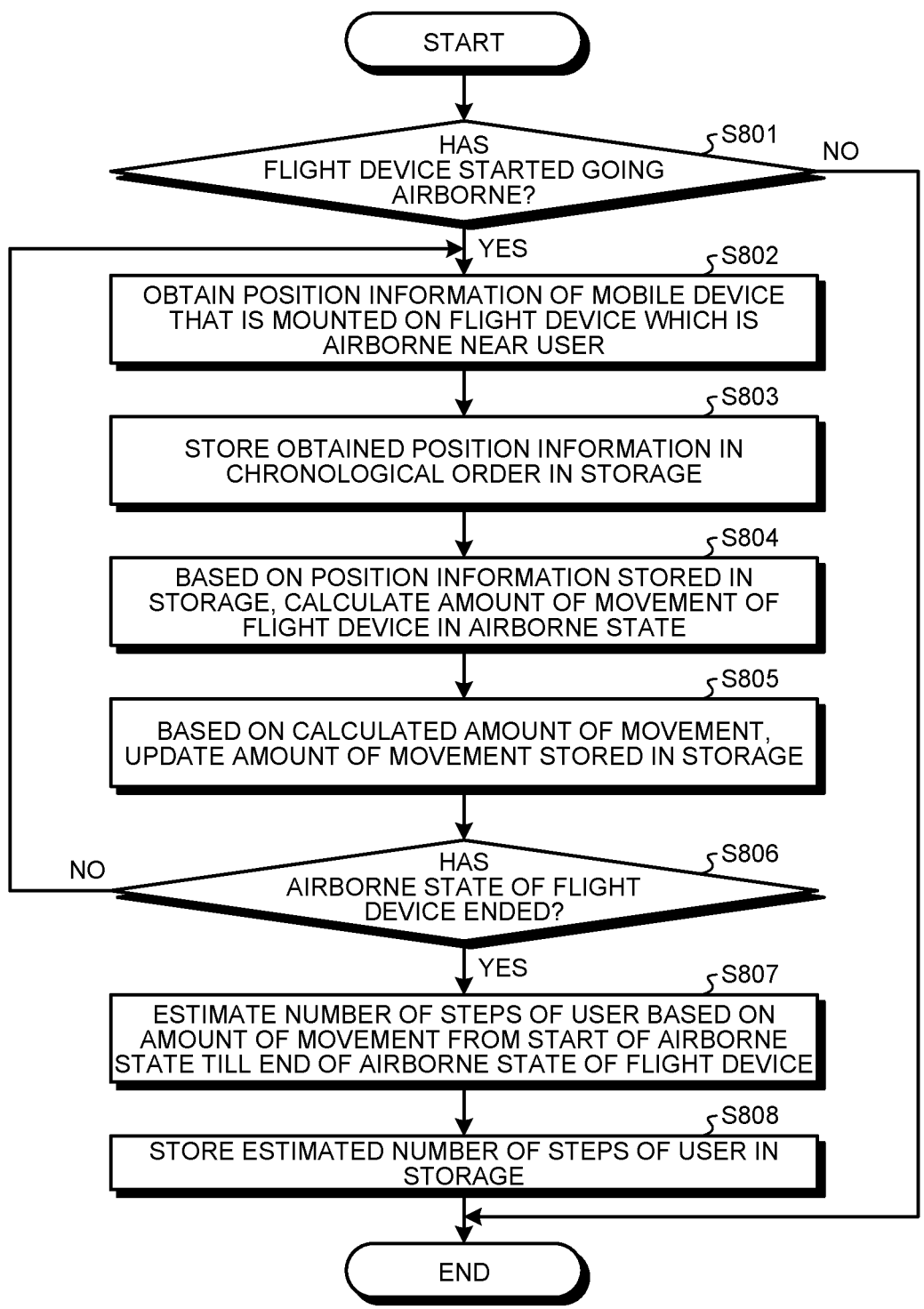
FIG. 22 is a flowchart for explaining an exemplary sequence of operations implemented by the in-flight mobile device in controlling a health function.

FIG. 22 is a flowchart for explaining an exemplary sequence of operations implemented by the in-flight mobile device 1 in controlling the health function. The sequence of operations illustrated in FIG. 22 is implemented when the controller 10 executes the control program 9A and the calculation application 9H. Moreover, the sequence of operations illustrated in FIG. 22 is implemented in a repeated manner by the controller 10 when the mobile device 1 is mounted on the flight device 100.

As illustrated in FIG. 22, the controller 10 of the mobile device 1 determines whether or not the flight device 100 has started going airborne (Step S801). Herein, the airborne state of the flight device 100 includes, for example, levitation and taking a flight. For example, when an instruction to start going airborne is issued to the flight device 100, the controller 10 determines that the flight device 100 has started going airborne. For example, based on the detection results obtained by the pneumatic sensor 18 and the acceleration sensor 15, the controller 10 can determine the start of going airborne by the flight device 100. If it is determined that the flight device 100 has not started going airborne (No at Step S801), then it marks the end of the sequence of operations illustrated in FIG. 22. On the other hand, if it is determined that the flight device 100 has started going airborne (Yes at Step S801), then the system control proceeds to Step S802.

The controller 10 obtains the position information of the mobile device 1 that is mounted on the airborne unmanned aerial vehicle (Step S802). For example, based on the detection result obtained by the proximity sensor 5, if the distance between the flight device 100 and the user is shorter than a predetermined distance, then the controller 10 obtains the position information received by the GPS receiver 20. As a result, the controller 10 becomes able to obtain the current location close to the position of the user. Then, the controller 10 stores the obtained position information in chronological order in the storage 9 (Step S803). Based on the position information stored in the storage 9, the controller 10 calculates the amount of movement when the flight device 100 is airborne (Step S804). For example, based on the position information stored in the storage 9 from the start of movement of the flight device 100 till the current timing, the controller 10 calculates the amount of movement. Then, based on the calculated amount of movement, the controller 10 updates the amount of movement stored in the storage 9 (Step S805). Subsequently, the system control proceeds to Step S806.

The controller 10 determines whether or not the flight device 100 has ended the airborne state (Step S806). For example, when an instruction to end the airborne state is issued to the flight device 100, the controller 10 determines that the flight device 100 has ended the airborne state. For example, based on the detection results obtained by the pneumatic sensor 18 and the acceleration sensor 15, the controller 10 can determine the end of the airborne state of the flight device 100. If it is determined that the flight device 100 has not ended the airborne state (No at Step S806), it implies that the flight device 100 is continuing with the airborne state, and the system control returns to Step S802 explained earlier. On the other hand, if it is determined that the flight device 100 has ended the airborne state (Yes at Step S806), then the system control proceeds to Step S807.

The controller 10 estimates the number of steps of the user based on the amount of movement from the start of the airborne state of the flight device 100 till the end of the airborne state and based on the step width of the user (Step S807). For example, the controller 10 can calculate the energy consumption of the user by applying the number of steps of the user to the relational expression between the estimated number of steps of the user and the energy consumption of the user. Then, the controller 10 stores the estimated number of steps of the user in the storage 9 (Step S808). For example, in the storage 9, the controller 10 can store the estimated number of steps as the number of steps of the user when the flight device 100 is airborne. For example, the controller 10 can add the estimated number of steps to the number of steps of the user in the case of carrying the mobile device 1. It marks the end of the sequence of operations illustrated in FIG. 22.

In embodiments described above, the explanation is given about the mobile device 1 representing an example of a mobile electronic device. However, the mobile electronic device according to the appended claims is not limited to the mobile device 1. That is, the mobile electronic device according to the appended claims can also be some other mobile electronic device other than the mobile device 1. Examples of the mobile electronic device include, but are not limited to a mobile phone, a smartphone, a smart watch, a mobile personal computer, a head mount display, a digital camera, a media player, an electronic book reader, a navigator, and a game console.

Figure 23:
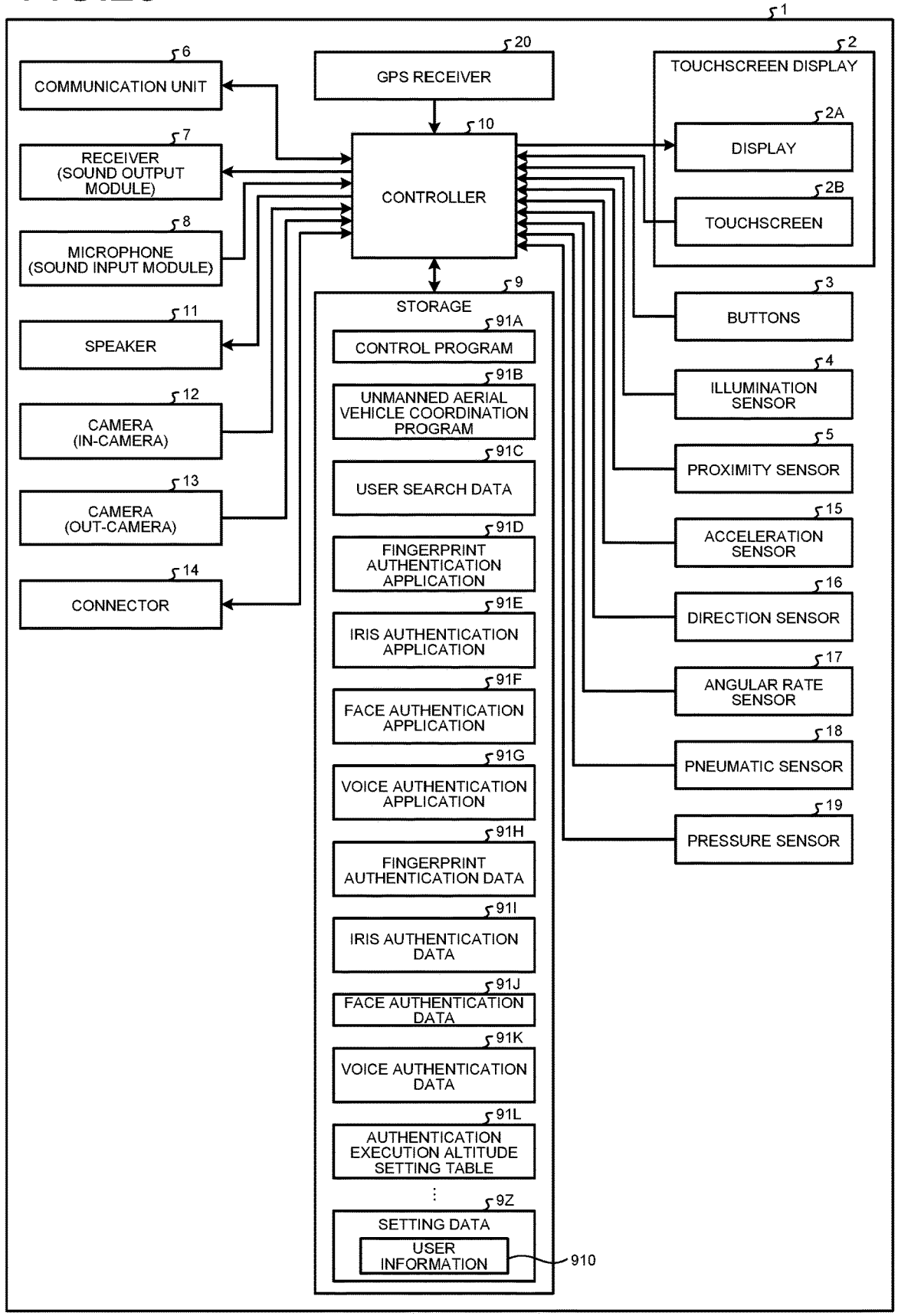
FIG. 23 is a diagram illustrating another example of the functional configuration of the mobile device according to embodiments.

FIG. 23 is a diagram illustrating another example of the functional configuration of the mobile device according to embodiments. As illustrated in FIG. 23, the mobile device 1 includes the touchscreen display 2, the buttons 3, the illumination sensor 4, the proximity sensor 5, the communication unit 6, the receiver 7, the microphone 8, the storage 9, the controller 10, the speaker 11, the camera (in-camera) 12, the camera (out-camera) 13, the connector 14, the acceleration sensor 15, the direction sensor 16, the angular rate sensor 17, the pneumatic sensor 18, the pressure sensor 19, and the GPS receiver 20.

The storage 9 can be used to store a control program 91A, an unmanned aerial vehicle coordination program 91B, user search data 91C, a fingerprint authentication application 91D, an iris authentication application 91E, a face authentication application 91F, a voice authentication application 91G, fingerprint authentication data H, iris authentication data 91I, face authentication data 91J, voice authentication data 91K, an authentication execution altitude setting table 91L, and the setting data 9Z.

The control program 91A can provide the functions for implementing the processing related to various operations of the mobile device 1. The functions provided by the control program 91A include a function for adjusting the brightness of the display 2A based on the detection result obtained by the illumination sensor 4. Moreover, the functions provided by the control program 91A include a function for disabling the operations with respect to the touchscreen 2B based on the detection result obtained by the proximity sensor 5. Furthermore, the functions provided by the control program 91A include a function for enabling communication by controlling the communication unit 6, the receiver 7, and the microphone 8. Moreover, the functions provided by the control program 91A include a function for controlling the imaging operation of the cameras 12 and 13. Furthermore, the functions provided by the control program 91A include a function for controlling the communication with external devices connected via the connector 14. Moreover, the functions provided by the control program 91A include a function for performing a variety of control such as changing the information being displayed on the display 2A according to the gesture determined based on the detection result obtained by the touchscreen 2B. Furthermore, the functions provided by the control program 91A include a function for detecting the movement and the stopping of the user, who is carrying the mobile device 1, based on the detection result obtained by the acceleration sensor 15. Moreover, the functions provided by the control program 91A include a function for performing current-location-based processing based on the signals obtained by the GPS receiver 20.

Furthermore, the control program 91A can provide a function for determining whether or not the mobile device 1 is mounted on the flight device 100. For example, based on the detection result obtained by the pressure sensor 19, the control program 91A can determine whether or not the mobile device 1 is mounted on the flight device 100. For example, if the range of the pressure acting on the side face 1C is substantially identical to the contact area between the protruding portion 111a of the device mounting unit 111 and the side face 1C3 and is substantially identical to the contact area between the protruding portion 111b and the side face 1C4; then the control program 91A can derive the determination result indicating that the mobile device 1 is mounted on the flight device 100.

Moreover, the control program 91A can provide a function for pairing with the flight device 100 in a communicable state. When the mounting of the mobile device 1 on the flight device 100 can be confirmed, the control program 91A issues a pairing instruction to the unmanned aerial vehicle coordination program 91B for pairing the mobile device 1 with the flight device 100. The transmission of instructions and data from the control program 91A to the flight device 100 is performed via the unmanned aerial vehicle coordination program 91B explained later.

Furthermore, the control program 91A can provide a function for determining, based on the detection result obtained by the pneumatic sensor 18, whether or not the flight device 100 to which the mobile device 1 is mounted is in flight. Moreover, the control program 91A can provide a function for performing zero point adjustment of the pneumatic sensor 18 when the mobile device 1 is mounted on the flight device 100. Furthermore, the control program 91A can provide a function for determining whether or not the flight device 100 having the mobile device 1 mounted thereon is in flight, by referring to the control status of the power controller 124 as a substitute for or in support to the detection result obtained by the pneumatic sensor 18.

Moreover, the control program 91A can provide a function by which, during a flight of the flight device 100 having the mobile device 1 mounted thereon, when a predetermined event occurs, based on the distance between the mobile device 1 and its user, an authentication method for unlocking the security lock is made selectable from among a plurality of authentication methods.

For example, when a predetermined event occurs during a flight of the flight device 100, the control program 91A can send a distance measurement instruction to the flight device 100 for measuring the distance between the mobile device 1 and its user. For example, when the distance between the mobile device 1 and its user as measured in the flight device 100 is smaller than a threshold value, the control program 91A can select a first authentication method as the authentication method for unlocking the security lock. The first authentication method implies an authentication method implemented when the user directly operates or touches the mobile device 1; and includes fingerprint authentication, for example. On the other hand, for example, when the distance between the mobile device 1 and its user as measured in the flight device 100 is equal to or greater than the threshold value, the control program 91A can select a second authentication method as the authentication method for unlocking the security lock. The second authentication method implies an authentication method implemented without the user having to touch the mobile device 1; and, for example, includes at least either iris authentication, or face authentication, or voice authentication. Thus, as the second authentication method, the control program 91A can select, for example, at least either iris authentication, or face authentication, or voice authentication. Herein, the predetermined event includes reception of an incoming call, reception of an email, and notification by a scheduler.

The control program 91A can provide a function for performing an authentication operation in order to unlock the security lock, by coordinating with the fingerprint authentication application 91D, the iris authentication application 91E, the face authentication application 91F, and the voice authentication application 91G.

Moreover, the control program 91A can provide a function for identifying the posture of the user in the case in which the second authentication method. For example, the control program 91A can identify the posture of the user from the images of the user captured by the camera 12 or the camera 13 or from the images captured by the flight device 100. Alternatively, an image analysis technique for identifying the user posture can also be implemented.

Furthermore, the control program 91A can provide a function for calculating, depending on the posture of the user, the altitude to be attained at the time of performing the authentication operation according to the second authentication method (hereinafter, referred to as "authentication execution altitude"). For example, the control program 91A can refer to the authentication execution altitude setting table 91L and calculate the authentication execution altitude according to the posture of the user.

Moreover, the control program 91A can provide a function of instructing adjustment of the flight altitude until the current flight altitude of the flight device 100 (the mobile device 1) becomes identical to the authentication execution altitude. For example, the control program 91A can send an altitude adjustment instruction to the flight device 100 for adjusting the flight altitude. On the other hand, on condition that the current flight altitude of the flight device 100 (the mobile device 1) is identical to the authentication execution altitude, the control program 91A can provide a function for performing the authentication operation according to the second authentication method. When iris authentication or face authentication is selected as the second authentication method, the control program 91A can use the images captured by the flight device 100 or can use the images captured by the camera 12 or the camera 13. Moreover, as auxiliary functions for controlling the imaging operation of the camera 12 or the camera 13 at the time of obtaining, from the camera 12 or the camera 13, the data of the iris or the face having the required resolution for authentication; the control program 91A can also have a face tracking function and an autofocusing function.

The unmanned aerial vehicle coordination program 91B can coordinate with the control program 91A and accordingly provide functions for implementing various operations in tandem with the flight device 100. For example, the unmanned aerial vehicle coordination program 91B can convert various instructions, which are sent by the control program 91A and are meant for the flight device 100, into control signals interpretable and executable by the flight device 100, and then can send the control signals to the flight device 100.

For example, upon receiving an instruction from the control program 91A, the unmanned aerial vehicle coordination program 91B can establish near-field wireless connection with the flight device 100 using, for example, Bluetooth (registered trademark), and can pair the mobile device 1 with the flight device 100.

For example, using the near-field wireless communication established with the flight device 100, the unmanned aerial vehicle coordination program 91B can communicate, with the flight device 100, the instructions issued by the control program 91A to the flight device 100 and the data to be used in various operations performed in the flight device 100. The instructions sent from the unmanned aerial vehicle coordination program 91B to the flight device 100 include, for example, a distance measurement instruction and an altitude adjustment instruction. The data sent from the unmanned aerial vehicle coordination program 91B to the flight device 100 contains the data of the identifier included in the user search data 91C. Moreover, the data transferred from the unmanned aerial vehicle coordination program 91B to the control program 91A contains the data related to the distances between the mobile device 1 and its user as calculated in the flight device 100.

The user search data 91C is referred to at the time of authenticating the user of the mobile device 1. For example, the user search data 91C contains an identifier that is uniquely assigned to the wearable device that the user of the mobile device 1 is wearing. For example, the user search data 91C is registered in advance by the user.

The fingerprint authentication application 91D can provide a function for performing authentication using the fingerprints of the user.

The iris authentication application 91E can provide a function for performing authentication using the iris of the user.

The face authentication application 91F can provide a function for performing authentication using the face of the user.

The voice authentication application 91G can provide a function for performing authentication using the voice of the user.

A fingerprint authentication data 91H represents reference data that is referred to during the authentication performed by the fingerprint authentication application 91D.

The iris authentication data 91I represents reference data that is referred to during the authentication performed by the iris authentication application 91E.

The face authentication data 91J represents reference data that is referred to during the authentication performed by the face authentication application 91F.

The voice authentication data 91K represents reference data that is referred to during the authentication performed by the voice authentication application 91G.

Figures 24, 25:
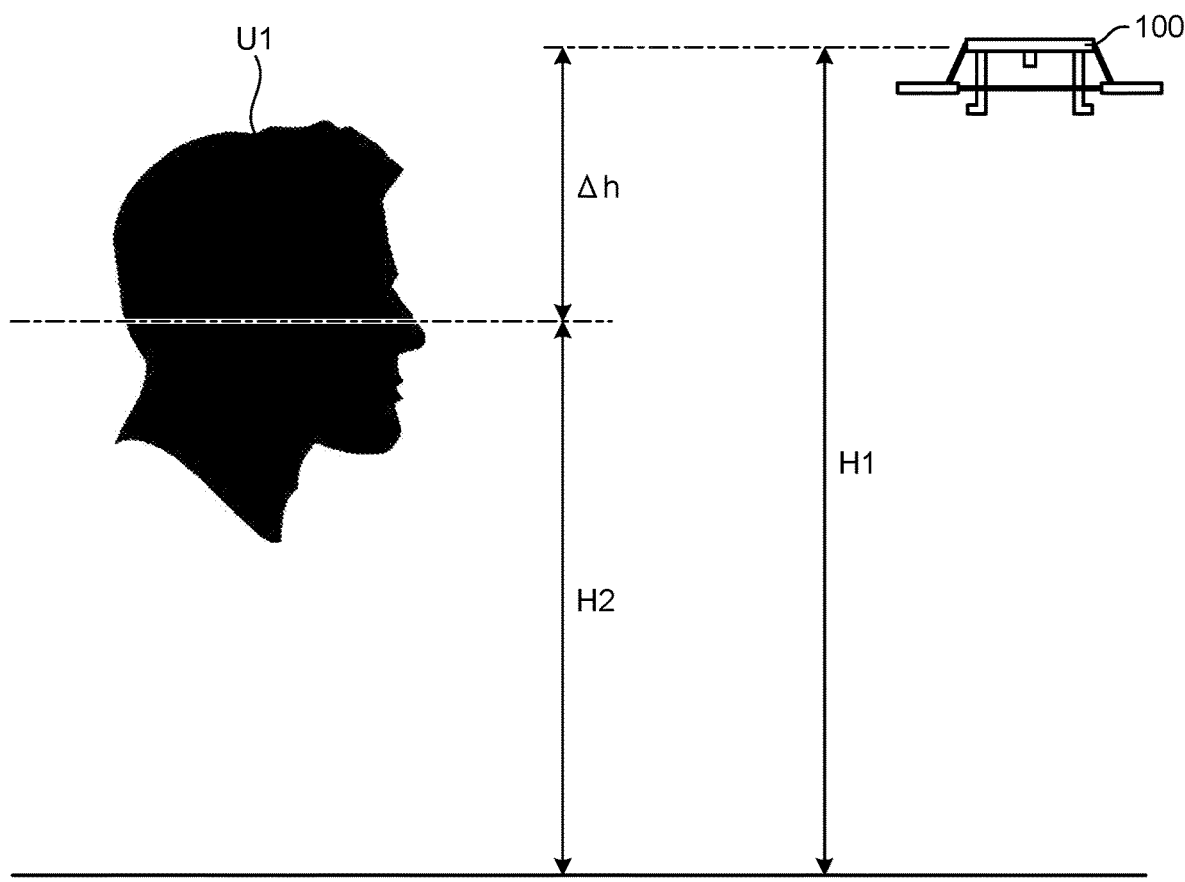
FIG. 24 is a diagram illustrating an exemplary configuration of an authentication execution altitude setting table according to embodiments.
FIG. 25 is a diagram illustrating a brief overview of an altitude adjustment method based on the authentication execution altitude setting table according to embodiments.

The authentication execution altitude setting table 91L is referred to at the time of adjusting the flight altitude of the flight device 100 (the mobile device 1) in the case of performing authentication according to the second authentication method. FIG. 24 is a diagram illustrating an exemplary configuration of the authentication execution altitude setting table according to embodiments. FIG. 25 is a diagram illustrating a brief overview of the altitude adjustment method based on the authentication execution altitude setting table according to embodiments. As illustrated in FIG. 24, the authentication execution altitude setting table 91L is used to define, according to the posture of the user, the authentication execution altitude to be attained at the time of performing authentication according to the second authentication method. With reference to FIG. 24, a variable "T" represents the height of the user, a variable "S" represents the sitting height of the user, and a variable "F" represents the length of the face of the user (see FIG. 26 explained later). The second authentication method is performed based on biological information of the region near the head of the user or based on sound information generated from the region near the head of the user. In that regards, for example, if the posture of the user is "upright position" or "seated position"; then the authentication execution altitude is decided in such a manner that, as illustrated in FIG. 25, a current flight altitude H1 of the flight device 100 having the mobile device 1 mounted thereon becomes equal to a height H2 near the center of the head of a user U1. For example, when the current flight altitude H1 of the flight device 100 is lower than the height H2 near the center of the user (i.e., when $\Delta h > 0$ holds true), the control program 91A can send an instruction to the flight device 100 for lowering the flight altitude. On the other hand, when the current flight altitude H1 of the flight device 100 is higher than the height H2 near the center of the user (i.e., when $\Delta h < 0$ holds true), the control program 91A can send an instruction to the flight device 100 for raising the flight altitude.

The setting data 9Z contains information about various settings related to the operations of the mobile device 1. For example, the setting data 9Z contains user information 910. FIG. 26 is a diagram illustrating an example of the user information according to embodiments. As illustrated in FIG. 26, for example, the user information 910 represents data related to the physical features of the user such as the height (T), the sitting height (S), and the face length (F).

The controller 10 can execute the control program 91A and accordingly implement a variety of control related to the operations of the mobile device 1. For example, based on the detection result obtained by the illumination sensor 4, the controller 10 can implement an operation of adjusting the brightness of the display 2A. Moreover, for example, based on the detection result obtained by the proximity sensor 5, the controller 10 can implement an operation of disabling the operations with respect to the touchscreen 2B. Furthermore, for example, the controller 10 can implement an operation of enabling conversation by controlling the communication unit 6, the receiver 7, and the microphone 8. Moreover, for example, the controller 10 can implement an operation of controlling the imaging operation of the cameras 12 and 13. Furthermore, for example, the controller 10 can implement an operation of controlling the communication with external devices connected via the connector 14. Moreover, for example, according to the gesture determined based on the detection result obtained by the touchscreen 2B, the controller 10 can implement an operation of performing a variety of control such as changing the information being displayed on the display 2A. Furthermore, for example, based on the detection result obtained by the acceleration sensor 15, the controller 10 can implement an operation of detecting the movement and the stopping of the user who is carrying the concerned device. Moreover, for example, based on the signals obtained by the GPS receiver 20, the controller 10 can implement current-location-based operations.

As a result of executing the control program 91A, based on the detection result obtained by the pressure sensor 19, the controller 10 can implement an operation of determining whether or not the mobile device 1 is mounted on the flight device 100.

Moreover, as a result of executing the control program 91A and the unmanned aerial vehicle coordination program 91B, the controller 10 can implement an operation of pairing with the flight device 100 in a communicable state.

Furthermore, as a result of executing the control program 91A, based on the detection result obtained by the pneumatic sensor 18, the controller 10 can implement an operation of determining whether or not the flight device 100 having the mobile device 1 mounted thereon is in flight.

Moreover, as a result of executing the control program 91A, when a predetermined event occurs during a flight of the flight device 100 having the mobile device 1 mounted thereon, based on the distance between the mobile device 1 and its user, the controller 10 can implement an operation of selecting an authentication method for unlocking the security lock from among a plurality of authentication methods. For example, if the distance between the mobile device 1 and its user is smaller than a threshold value, then the controller 10 can select the first authentication method as the authentication method for unlocking the security lock. On the other hand, for example, when the distance between the mobile device 1 and the user of the concerned device is equal to or greater than the threshold value, then the controller 10 can select the second authentication method as the authentication method for unlocking the security lock.

Based on the functions provided by the fingerprint authentication application 91D, the iris authentication application 91E, the face authentication application 91F, and the voice authentication application 91G; the controller 10 can implement the authentication operation for unlocking the security lock.

Meanwhile, the mobile device 1 can also include a vibrator. The vibrator makes the mobile device 1 vibrate partially or entirely. In order to cause vibrations, the vibrator includes, for example, a piezoelectric element or an eccentric motor. Moreover, the mobile device 1 can also include other sensors such as a temperature sensor, a humidity sensor, and a pressure sensor. Furthermore, the mobile device 1 is equipped with functional components, such as the battery 21, that are obviously used to maintain the functions of the mobile device 1, and a detecting module that is obviously used in implementing the control of the mobile device 1.

As illustrated in FIG. 7, the main body 110 of the flight device 100 includes the communication module 121, the connection module 122, the imaging controller 123, the power controller 124, the sensor unit 125, the memory module 126, and the control unit 127.

The sensor unit 125 includes a plurality of sensors for detecting the data to be used in a flight of the flight device 100 and in controlling the devices included in the flight device 100. The sensor unit 125 includes, for example, the touch sensor 125a and the distance image sensor 125b.

The touch sensor 125a can be placed either on the coupling frames 130 or, for example, at a position that is likely to be held by the user of the mobile device 1, such as on the periphery of the main body 110 of the flight device 100. Alternatively, a knob for enabling the user of the mobile device 1 to hold the flight device 100 can be disposed on the flight device 100, and the touch sensor 125a can be disposed on the knob. Moreover, the touch sensor 125a can be positioned to sandwich the installation portion for the touch sensor 125a. For example, a sheet-like touch sensor 125a can be looped around the installation portion, or at least two touch sensors 125a can be individually fixed at positions sandwiching the installation portion. Based on the detection result obtained by the touch sensor 125a, when a touch by the user is detected at the position sandwiching the installation portion, the flight device 100 can detect that it is being held by the user.

The functions provided by the control program 126a include a function for controlling the drive force of the motors 140a to 140d based on the detection result obtained by the sensor unit 125. For example, based on the detection result obtained by the touch sensor 125a, when a predetermined operation with respect to the flight device 100 is detected, the function for controlling the drive force of the motors 140a to 140d includes stopping the motors. The predetermined operation includes, for example, holding the coupling frames 130 at a minimum of one place.

Moreover, the functions provided by the control program 126a include a function for adjusting the flight attitude of the flight device 100 based on the detection result obtained by the sensor unit 125.

Furthermore, the functions provided by the control program 126a include, in response to an instruction from the mobile device 1, searching for the user of the mobile device 1 based on the identifier data 126c; calculating the distance to the user of the mobile device 1, which is mounted on the flight device 100, based on the measurement result obtained by the distance image sensor 125b; and sending the calculated distance to the mobile device 1.

Moreover, the functions provided by the control program 126a include, in response to an instruction from the mobile device 1, searching for the user of the mobile device 1 based on the identifier data 126c; calculating the distance to the user of the mobile device 1, which is mounted on the flight device 100, based on the radio field intensity transmitted from the wearable device that the user is wearing; and sending the calculated distance to the mobile device 1.

Furthermore, the functions provided by the control program 126a include a function for adjusting the flight altitude in response to an instruction from the mobile device 1.

Moreover, the functions provided by the control program 126a include a function for performing minute adjustment of the positional relationship between the camera 190 and the photographic subject (the portion to be authenticated) using the face tracking function and the autofocusing function that are included as the functions for controlling the imaging of the camera 190. For example, as a result of this function provided by the control program 126a, image data of the iris and the face can be obtained in the required resolution for performing authentication.

Furthermore, the functions provided by the control program 126a include the following functions: a function in which, based on the measurement result obtained by the distance image sensor 125b, information is obtained that indicates the positional relationship with the objects surrounding the flight device 100; and a function in which direction information related to the angle (direction) made by the nose of the flight device 100 is detected based on the detection result obtained by the sensor unit 125, and in which rotation angle information is detected that is related to the angle of rotation centered around vertical lines passing through the center positions of the rotary wings 150*a* to 150*d*. Based on these functions, the control program 126*a* becomes able to control the flight of the flight device 100.

Figure 27:
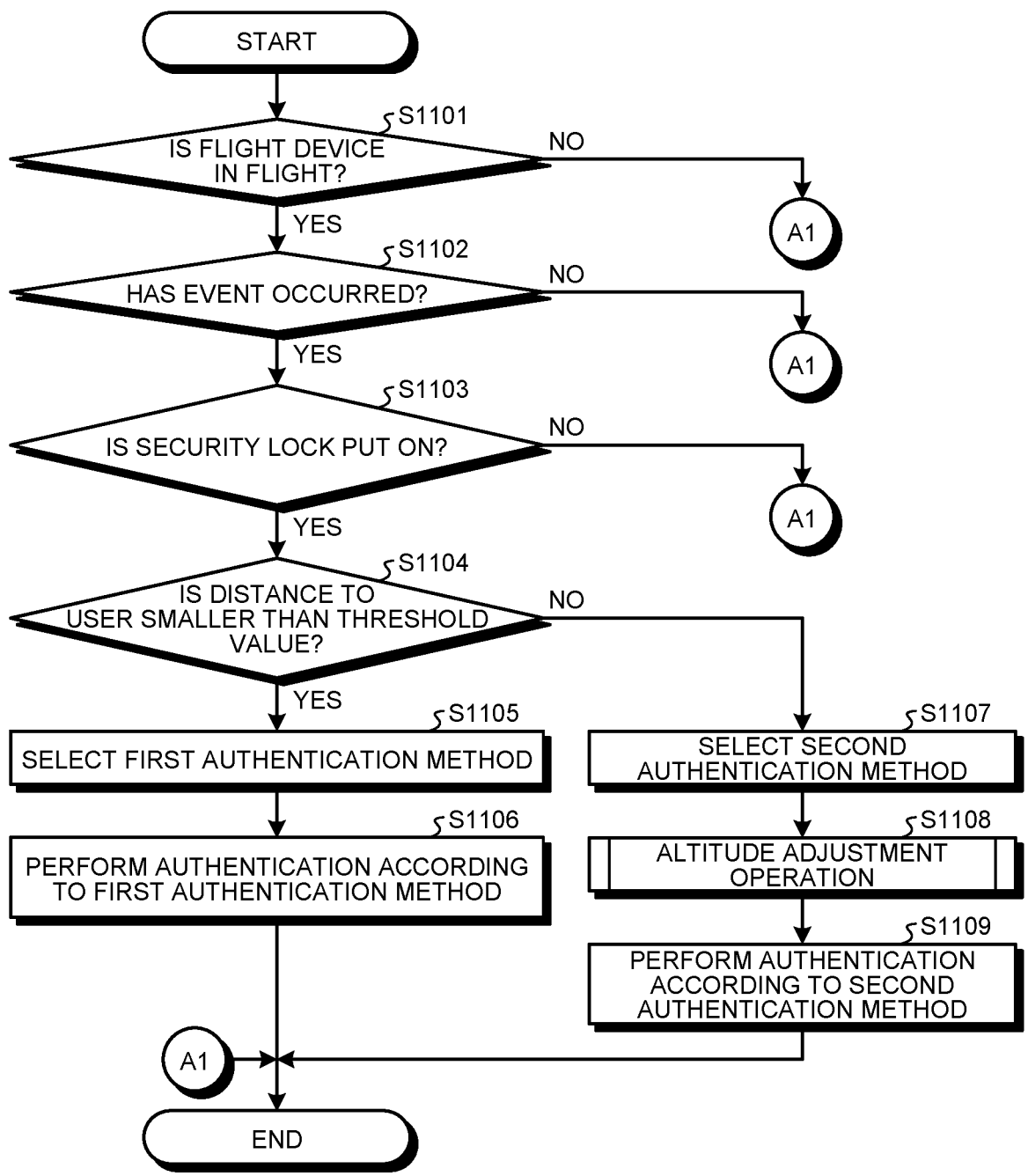
FIG. 27 is a flowchart for explaining an example of the operations performed by the mobile device according to embodiments.

FIG. 27 is a flowchart for explaining an example of the operations performed by the mobile device according to embodiments. The operations illustrated in FIG. 27 are implemented when the controller 10 executes the control program 91A and the unmanned aerial vehicle coordination program 91B.

As illustrated in FIG. 27, the controller 10 determines whether the flight device 100 is in flight (Step S1101).

If it is determined that the flight device 100 is in flight (Yes at Step S1101), then the controller 10 determines whether a predetermined event has occurred (Step S1102).

If it is determined that the predetermined event has occurred (Yes at Step S1102), the controller 10 determines whether the security lock is put on (Step S1103).

If it is determined that the security lock is put on (Yes at Step S1103), then the controller 10 determines whether the distance to the user as measured by the flight device 100 is smaller than a threshold value (Step S1104). Herein, the user implies the user of the mobile device 1 that is mounted on the flight device 100.

If it is determined that the distance to the user is smaller than the threshold value (Yes at Step S1104), then the controller 10 selects the first authentication method (Step S1105).

In order to unlock the security lock, the controller 10 performs authentication according to the first authentication method selected at Step S1105 (Step S1106). It marks the end of the operations illustrated in FIG. 27.

Meanwhile, at Step S1104, if it is determined that the distance to the user is not smaller than the threshold value (No at Step S1104), then the controller 10 selects the second authentication method (Step S1107).

After selecting the second authentication method, the controller 10 performs the altitude adjustment operation based on an instruction from the mobile device 1 (Step S1108).

After the altitude adjustment operation is completed, in order to unlock the security lock, the controller 10 performs authentication according to the second authentication method selected at Step S1107 (Step S1109). It marks the end of the operations illustrated in FIG. 27.

Meanwhile, at Step S1103, if it is determined that the security lock is not put on (No at Step S1103), then it marks the end of the operations illustrated in FIG. 27.

Moreover, at Step S1102, if it is determined that the predetermined event has not occurred (No at Step S1102), then it marks the end of the operations illustrated in FIG. 27.

Furthermore, at Step S1101, if it is determined that the flight device 100 is not in flight (No at Step S1101), then it marks the end of the operations illustrated in FIG. 27.

Figure 28:
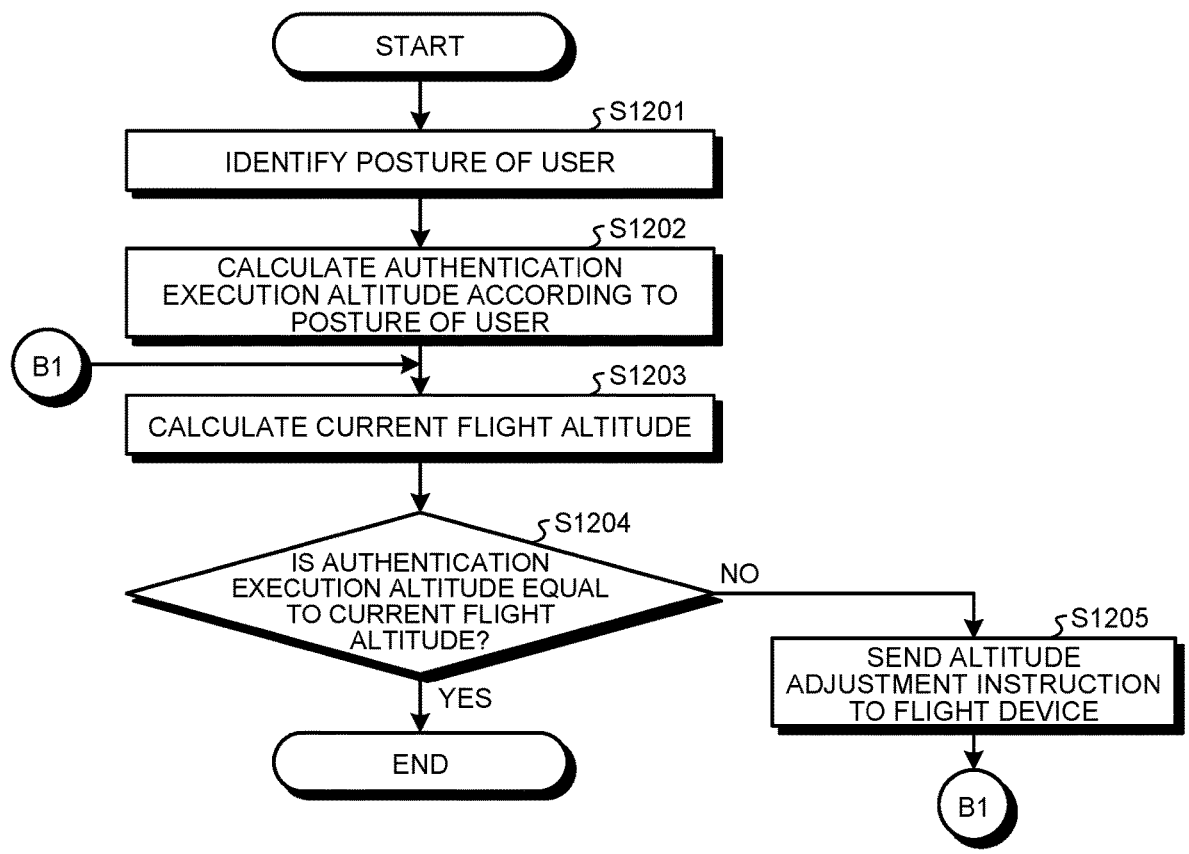
FIG. 28 is a flowchart for explaining an example of the altitude adjustment operation according to embodiments.

FIG. 28 is a flowchart for explaining an example of the altitude adjustment operation according to embodiments. The operations illustrated in FIG. 28 are implemented when the controller 10 executes the control program 91A and the unmanned aerial vehicle coordination program 91B.

As illustrated in FIG. 28, the controller 10 identifies the posture of the user (Step S1201).

Then, based on the authentication execution altitude setting table 91L, the controller 10 calculates the authentication execution altitude corresponding to the posture of the user as identified at Step S1201 (Step S1202).

Based on the detection result obtained by the pneumatic sensor 18, the controller 10 calculates the current flight altitude of the unmanned aerial vehicle 100F (the mobile device 1) (Step S1203). The controller 10 can calculate the flight altitude by referring to the control status of the power controller 124 and estimating the approximate height attained since the start of flight of the unmanned aerial vehicle 100F having the mobile device 1 mounted thereon.

Then, the controller 10 determines whether the authentication execution altitude calculated at Step S1202 is identical to the current flight altitude calculated at Step S1203 (Step S1204).

If it is determined that the authentication execution altitude is identical to the current flight altitude (Yes at Step S1204), then it marks the end of the operations illustrated in FIG. 28.

On the other hand, if it is determined that the authentication execution altitude is not identical to the current flight altitude (No at Step S1204), then the controller 10 sends an altitude adjustment instruction to the flight device 100 (Step S1205), and the system control returns to Step S1203 explained earlier.

In embodiments described above, with the occurrence of a predetermined event in the mobile device 1 serving as the trigger, depending on the distance between the mobile device 1 and its user, the flight device 100 having the mobile device 1 mounted thereon can select an authentication method for unlocking the security lock. For example, if it can be determined that the mobile device 1 is with the user, then the mobile device 1 can select fingerprint authentication; and if it can be determined that the mobile device 1 is not with the user, then the mobile device 1 can select iris authentication, or face authentication, or voice authentication. Hence, even when the flight device 100 having the mobile device 1 mounted thereon is away from the user, the security lock can be unlocked by performing non-contact authentication such as iris authentication.

In embodiments described above, when the second authentication method is selected, depending on the posture of the user, the mobile device 1 can set the altitude for performing authentication according to the second authentication method. That makes it easier to obtain the image data required in the authentication.

As described above, embodiments can propose an example of the improvement technique for improving the technology in which the flight performance of the flight device 100 is applied. That is, according to embodiments, as a result of mounting the mobile device 1 on the flight device 100, as far as unlocking the security lock is concerned, it becomes possible to provide the user with some additional value that contributes in enhancing the user-friendliness.

In embodiments described above, although fingerprint authentication is used as an example of the first authentication method selected by the mobile device 1, it is also possible to implement an arbitrary authentication method such as password authentication requiring a contact by the user.

In embodiments described above, iris authentication, face authentication, and voice authentication are used as the examples of the second authentication method selected by the mobile device 1. In embodiments described above, when the authentication according to at least either iris authentication or face authentication ends up in failure, the mobile device 1 can perform voice authentication.

In embodiments described above, when performing voice authentication as the second authentication method, based on the detection result obtained by the direction sensor 16, the mobile device 1 can control the direction of the microphone 8 to point toward the face of the user.

In embodiments described above, as a result of performing the authentication, the security can be guaranteed even when the mobile device 1 is flown by mounting it on the flight device 100. Meanwhile, in embodiments described above, an area for performing authentication can be set in advance, and the authentication can be performed only when the mobile device 1 is approved to be within the concerned area based on the position information obtained by the GPS receiver 20.

In embodiments described above, the mobile device 1 can be enabled to use the detection result obtained by the sensor unit 125 of the flight device 100. For example, a fingerprint sensor can be installed in the sensor unit 125 for obtaining the fingerprints during an operation performed with respect to the coupling frames 130, and the obtained fingerprint data can be sent to the mobile device 1. Alternatively, for example, based on the measurement result obtained by the distance image sensor 125b, the mobile device 1 can directly determine whether the distance is within a predetermined distance range from the user. Still alternatively, in embodiments described above, the mobile device 1 can be configured to include a sensor equivalent to the distance image sensor 125b of the flight device 100, and can measure the distance to the user based on the detection result obtained by the sensor installed therein. Meanwhile, in embodiments described above, the controller 10 of the mobile device 1 can be enabled to control the flight power of the flight device 100. Moreover, in embodiments described above, the flight device 100 can be enabled to use the detection results obtained by the sensors installed in the mobile device 1. For example, based on the detection result obtained by the direction sensor 16 of the mobile device 1, the flight device 100 can measure the angle made by the direction of orientation of the nose of the flight device 100.

In embodiments described above, the explanation is given about an example in which the mobile device 1 and the flight device 100 are paired by establishing near-field wireless communication therebetween, so that the mobile device 1 and the flight device 100 are connected in a communicable manner. Alternatively, the mobile device 1 and the flight device 100 can be electrically connected by a cable in a communicable manner.

When the security lock is unlocked during a flight, the security lock need not be put on again until it is detected that the mobile device 1 is no more in flight. Thus, the mobile device 1 can be so configured that, after the security lock is unlocked during a flight, the security lock can be put on again only when it is detected that the mobile device 1 is no more in flight. In this way, if the security lock is unlocked during a flight, since the security lock is not put on again until it is detected that the mobile device 1 is no more in flight, the user can operate the in-flight mobile device 1 without having to repeatedly unlock the security lock during the flight of the mobile device 1. Moreover, when it is detected that the mobile device 1 is no more in flight, the security lock is put on again, thereby guaranteeing a certain level of security.

The mobile device 1 can be so configured that, when the security lock is unlocked during a flight, even if the state of not receiving a predetermined operation instruction continues for a while, the security lock need not be put on again until it is detected that the mobile device 1 is no more in flight. Alternatively, the mobile device 1 can be so configured that, after the security lock is unlocked during a flight, it falls into the sleep state only when detected to be no more in flight. In this way, once the security lock is unlocked during a flight, the mobile device 1 does not fall into the sleep state until it is detected to be no more in flight. Hence, the user can operate the in-flight mobile device 1 without having to reactivate the mobile device 1 from the sleep state during the flight. Herein, the sleep state includes, for example, a power saving mode, such as turning off the backlight of the display 2A, in which there is restriction on some functions.

Figure 29:
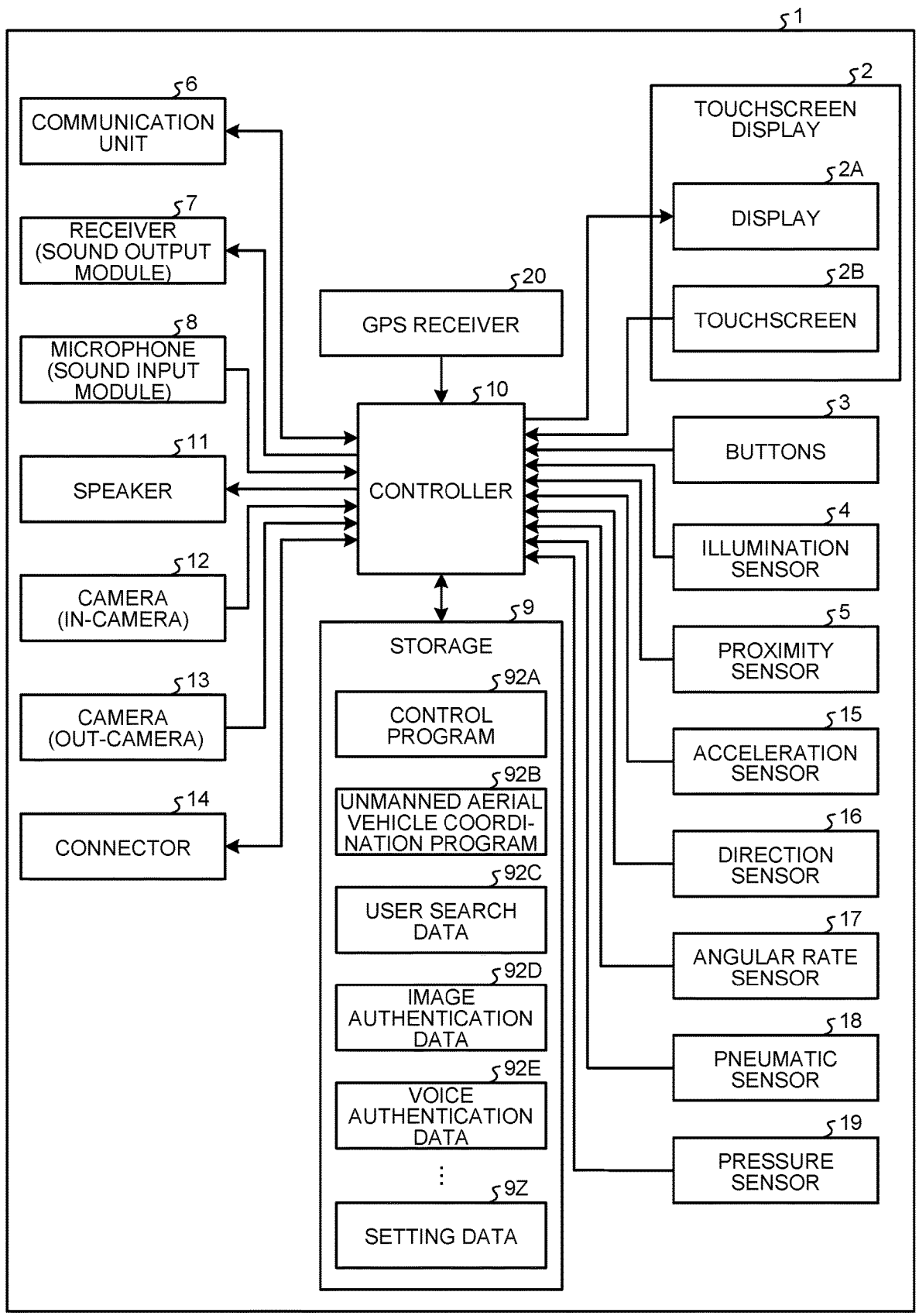
FIG. 29 is a diagram illustrating another example of the functional configuration of the mobile device according to embodiments.

FIG. 29 is a diagram illustrating another example of the functional configuration of the mobile device according to embodiments. As illustrated in FIG. 29, the mobile device 1 includes the touchscreen display 2, the buttons 3, the illumination sensor 4, the proximity sensor 5, the communication unit 6, the receiver 7, the microphone 8, the storage 9, the controller 10, the speaker 11, the camera (in-camera) 12, a camera (out-camera) 13, the connector 14, the acceleration sensor 15, the direction sensor 16, the angular rate sensor 17, the pneumatic sensor 18, the pressure sensor 19, and the GPS receiver 20.

The storage 9 can be used to store a control program 92A, an unmanned aerial vehicle coordination program 92B, user search data 92C, image authentication data 92D, voice authentication data 9E, and the setting data 9Z.

The control program 92A can provide the functions for implementing the processing related to various operations of the mobile device 1. The functions provided by the control program 92A include a function for adjusting the brightness of the display 2A based on the detection result obtained by the illumination sensor 4. Moreover, the functions provided by the control program 92A include a function for disabling the operations with respect to the touchscreen 2B based on the detection result obtained by the proximity sensor 5. Furthermore, the functions provided by the control program 92A include a function for enabling conversation by controlling the communication unit 6, the receiver 7, and the microphone 8. Moreover, the functions provided by the control program 92A include a function for controlling the imaging operation of the cameras 12 and 13. Furthermore, the functions provided by the control program 92A include a function for controlling the communication with external devices connected via the connector 14. Moreover, the functions provided by the control program 92A include a function for performing a variety of control such as changing the information being displayed on the display 2A according to the gesture determined based on the detection result obtained by the touchscreen 2B. Furthermore, the functions provided by the control program 92A include a function for detecting the movement and the stopping of the user, who is carrying the mobile device 1, based on the detection result obtained by the acceleration sensor 15. Moreover, the functions provided by the control program 92A include a function for performing current-location-based processing based on the signals obtained by the GPS receiver 20.

Furthermore, the control program 92A can provide a function for determining whether or not the mobile device 1 is mounted on the flight device 100. For example, based on the detection result obtained by the pressure sensor 19, the control program 92A can determine whether or not the mobile device 1 is mounted on the flight device 100. For example, if the range of the pressure (the distribution of the pressure) acting on the side face 1C is substantially identical to the contact area between the protruding portion 111a of the device mounting unit 111 and the side face 1C3 and is substantially identical to the contact area between the protruding portion 111b and the side face 1C4; then the control program 92A can derive the determination result indicating that the mobile device 1 is mounted on the flight device 100.

Moreover, the control program 92A can provide a function for pairing with the flight device 100 in a communicable state. When the mounting of the concerned device on the flight device 100 can be confirmed, the control program 92A issues a pairing instruction to the unmanned aerial vehicle coordination program 92B for pairing the mobile device 1 with the flight device 100. The transmission of instructions and data from the control program 92A to the flight device 100 is performed via the unmanned aerial vehicle coordination program 92B explained later.

Furthermore, the control program 92A can provide a function for determining, based on the detection result obtained by the pneumatic sensor 18, whether or not the flight device 100 having the mobile device 1 mounted thereon is in flight. Moreover, the control program 92A can provide a function for performing zero point adjustment of the pneumatic sensor 18 when the mobile device 1 is mounted on the flight device 100. Furthermore, the control program 92A can provide a function for determining whether or not the flight device 100 having the mobile device 1 is mounted is in flight, by referring to the control status of the power controller 124 as a substitute for or in support to the detection result obtained by the pneumatic sensor 18.

Moreover, the control program 92A can provide a function in which, when an incoming call is detected, an approach instruction for moving close to the user is sent. The approach instruction is meant for instructing to move close within a predetermined distance range from the user. At the time of sending the approach instruction, the control program 92A can also send the data of the identifier included in the user search data 92C. Furthermore, the control program 92A can provide a function in which, when the end of conversation is detected, a return instruction is sent to the flight device 100.

Furthermore, the control program 92A can provide a function in which, with respect to an incoming call, a normal conversation is started on condition that a notification about detection of a predetermined operation with respect to the flight device 100 is received from the flight device 100. The normal conversation implies the conversation in which the voice to be transmitted is input to the microphone 8 and the received voice is output from the receiver 7.

Moreover, the control program 92A can provide a function for performing image recognition by referring to the image authentication data 92D. For example, the control program 9A performs image recognition with respect to the image data received from the flight device 100 or the image data obtained by the mobile device 1; and, based on the result of image recognition, can recognize whether or not the gesture performed by the user of the mobile device 1 is a predetermined gesture. The predetermined gesture implies a hand signal that the user of the mobile device 1 performs toward the flight device 100 as a declaration of intent to respond to the incoming call. Thus, the predetermined gesture is different than any of the gestures performed with respect to the touchscreen display 2 as explained earlier.

Furthermore, the control program 92A can provide a function for performing voice recognition by referring to the voice authentication data 9E. For example, the control program 92A can perform voice recognition with respect to the voice data received from the flight device 100 or the voice data obtained by the mobile device 1; and, based on the result of voice recognition, can recognize whether the voice input by the user of the mobile device 1 is a predetermined voice. The predetermined voice implies a sentence uttered by the user of the mobile device 1 toward the flight device 100 as a declaration of intent to respond to the incoming call.

Moreover, the control program 92A can provide a function for starting a speaker conversion when the predetermined gesture or the predetermined voice is recognized with respect to the incoming call. The speaker conversation implies the conversation in which the voice to be transmitted is input to the microphone 8 and the received voice is output from the speaker 11.

The unmanned aerial vehicle coordination program 92B can coordinate with the control program 92A and accordingly provide functions for implementing various operations in tandem with the flight device 100. For example, the unmanned aerial vehicle coordination program 92B can convert various instructions, which are generated by the control program 91A and are meant for the flight device 100, into control signals interpretable and executable by the flight device 100, and then can send the control signals to the flight device 100.

For example, upon receiving an instruction from the control program 92A, the unmanned aerial vehicle coordination program 92B can establish near-field wireless connection with the flight device 100 using, for example, Bluetooth (registered trademark), and can pair the mobile device 1 with the flight device 100. For example, using the near-field wireless communication established with the flight device 100, the unmanned aerial vehicle coordination program 92B can send a variety of data to and receive a variety of data from the flight device 100.

The user search data 92C is referred to at the time of authenticating the user of the concerned device. For example, the user search data 92C contains an identifier that is uniquely assigned to the wearable device that the user of the concerned device is wearing.

The image authentication data 92D represents reference data for recognizing the predetermined gesture made by the user of the mobile device 1 as a declaration of intent to respond to the incoming call. For example, the image authentication data 92D contains templates for recognizing predetermined hand signals by performing pattern matching; or contains a database built in advance as a result of performing machine learning using a multilayer neural network with the aim of recognizing predetermined hand signals.

A voice authentication data 92E represents reference data meant for recognizing a predetermined voice input by the user of the mobile device 1 as a declaration of intent to respond to the incoming call. For example, the voice authentication data 92E represents voice information of the user of the mobile device 1. The voice information may indicate the utterance of any type of sentence, or may indicate the utterance of a specific sentence.

The setting data 9Z contains information about various settings related to the operations of the mobile device 1. For example, the setting data 9Z contains commands (for example, respond to a call using the speaker conversation) executed when a predetermined gesture is recognized or a predetermined voice is recognized.

As a result of executing the control program 92A, based on the detection result obtained by the pressure sensor 19, the controller 10 can implement an operation of determining whether or not the mobile device 1 is mounted on the flight device 100.

Moreover, as a result of executing the control program 92A and the unmanned aerial vehicle coordination program 92B, the controller 10 can implement an operation of pairing with the flight device 100 in a communicable state.

Furthermore, as a result of executing the control program 92A and the unmanned aerial vehicle coordination program 92B, the controller 10 can implement an operation in which, in response to an incoming call, an approach instruction for moving close to the user up to a certain distance is sent to the flight device 100 along with the identifier included in the user search data 92C.

Moreover, as a result of executing the control program 92A, the controller 10 can implement an image recognition operation of determining whether a predetermined gesture is performed by the user as a declaration of intent to respond to the incoming call.

Furthermore, as a result of executing the control program 92A, the controller 10 can implement a voice recognition operation of determining whether a voice input is performed by the user as a declaration of intent to respond to the incoming call.

Figure 30:
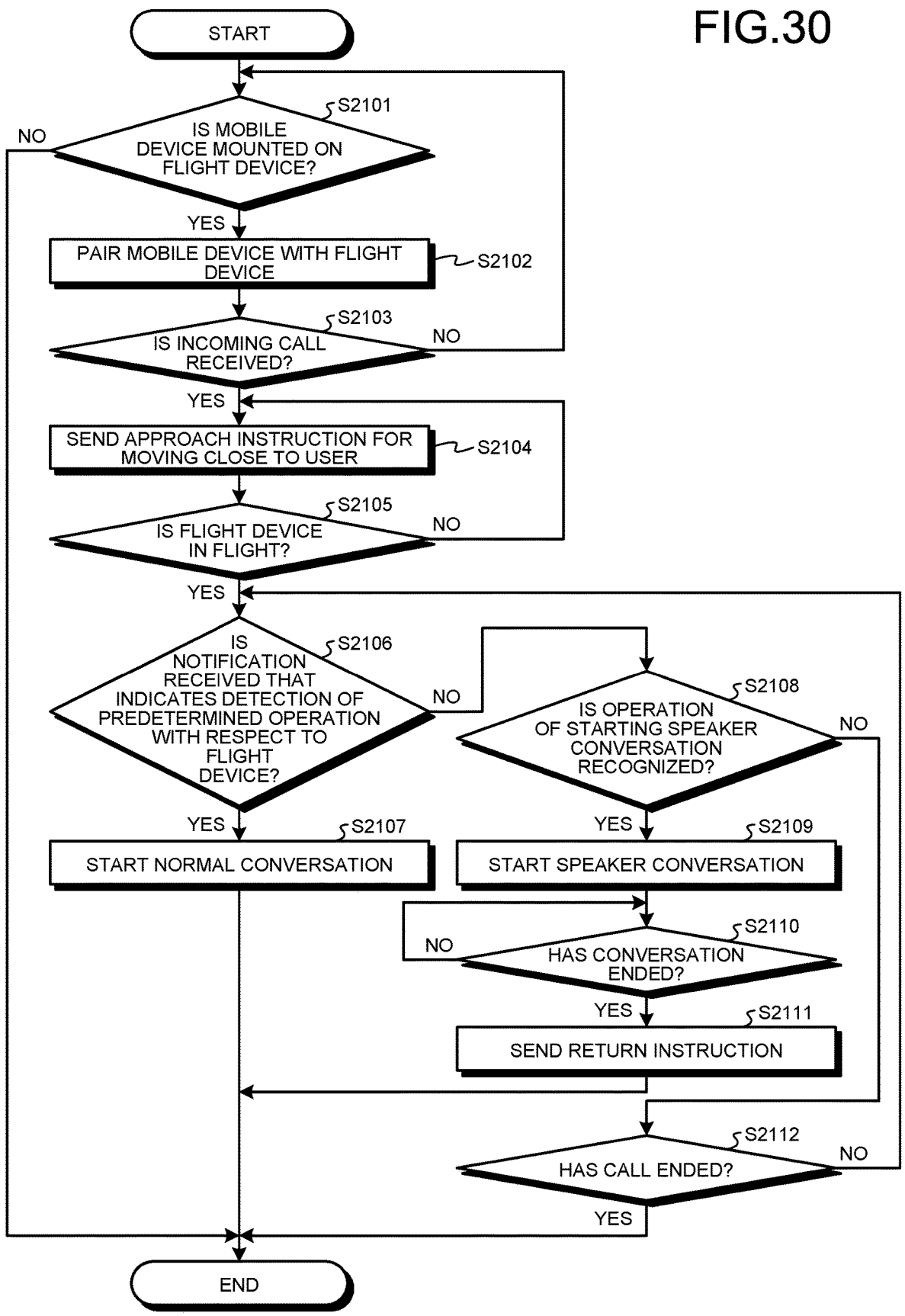
FIG. 30 is a flowchart for explaining an example of the operations performed by the mobile device according to embodiments.

FIG. 30 is a flowchart for explaining an example of the operations performed by the mobile device according to embodiments. The operations illustrated in FIG. 30 are implemented when the controller 10 executes the control program 92A and the unmanned aerial vehicle coordination program 92B.

As illustrated in FIG. 30, the controller 10 determines whether the mobile device 1 is mounted on the flight device 100 (Step S2101).

If it is determined that the mobile device 1 is mounted on the flight device (Yes at Step S2101), then the controller 10 pairs the flight device 100 and the mobile device 1 (Step S2102).

After the pairing is done, the controller 10 determines whether an incoming call is detected (Step S2103).

If it is determined that an incoming call is not detected (No at Step S2103), then the determination at Step S2101 is performed again. That is, a case is assumed in which the user removes the mobile device 1 from the flight device 100 before receiving any incoming call.

On the other hand, if it is determined that an incoming call is detected (Yes at Step S2103), then the controller sends an approach instruction to the flight device 100 for moving close to the user (Step S2104). The approach instruction includes an instruction for moving close within a predetermined distance range from the user and includes the data of the identifier included in the user search data 92C. Herein, the data of the identifier included in the user search data 92C corresponds to the identifier of the wearable device that the user of the mobile device 1 is wearing.

After the approach instruction for moving close to the user is sent to the flight device 100, based on the detection result obtained by the pneumatic sensor 18, the controller 10 determines whether or not flight device 100 having the mobile device 1 mounted thereon is in flight (Step S2105).

If it is determined that the flight device 100 is in flight (Yes at Step S2105), then the controller 10 determines whether a predetermined contact with the flight device 100 is detected (Step S2106).

If it is determined that a predetermined contact with the flight device 100 is detected (Yes at Step S2106), then the controller 10 starts a normal conversation (Step S2107). It marks the end of the operations illustrated in FIG. 30. The normal conversation implies the conversation in which the received voice is output from the receiver 7. That is, the conversation is started when the user of the mobile device 1 holds the flight device 100 in hands.

On the other hand, if it is determined that a predetermined contact with the flight device 100 is not detected (No at Step S2106), then the controller 10 determines whether the operation of starting a speaker conversation has been recognized (Step S2108). For example, the controller 10 can determine the operation of starting a speaker conversation by recognizing a predetermined gesture using image recognition or by recognizing a predetermined voice using voice recognition.

If it is determined that the operation of starting a speaker conversation is recognized (Yes at Step S2108), the controller 10 starts a speaker conversation (Step S2109). That is, the user of the mobile device 1 can perform a hands-free conversation without taking the mobile device 1, which is mounted on the flight device 100, in hands, while the flight device 100 remains airborne (i.e., hovering at the same place).

The controller 10 determines whether or not the conversation has ended (Step S2110). If the conversation has not ended (No at Step S2110), the controller 10 performs the determination at Step S2110 in a repeated manner.

On the other hand, if it is determined that the conversation has ended (Yes at Step S2110), then the controller 10 sends a return instruction to the flight device 100 (Step S2111). It marks the end of the operations illustrated in FIG. 30.

Meanwhile, at Step S2108 explained above, if it is determined that the operation of starting a speaker conversation is not recognized (No at Step S2108), the controller 10 determines whether the call has ended (Step S2112).

If it is determined that the call has ended (Yes at Step S2112), then it marks the end of the operations illustrated in FIG. 30. That is, it implies that the response to the incoming call ended up in failure.

On the other hand, if it is determined that the call has not ended (No at Step S2112), then the controller 10 again performs the determination at Step S2106 explained earlier.

Meanwhile, at Step S2105 explained earlier, if it is determined that the flight device 100 is not in flight (No at Step S2105), then the system control returns to Step S2104 explained earlier.

Moreover, at Step S2101 explained earlier, if it is determined that the concerned device is not mounted on the flight device 100 (No at Step S2101), then it marks the end of the operations illustrated in FIG. 30.

Figure 31:
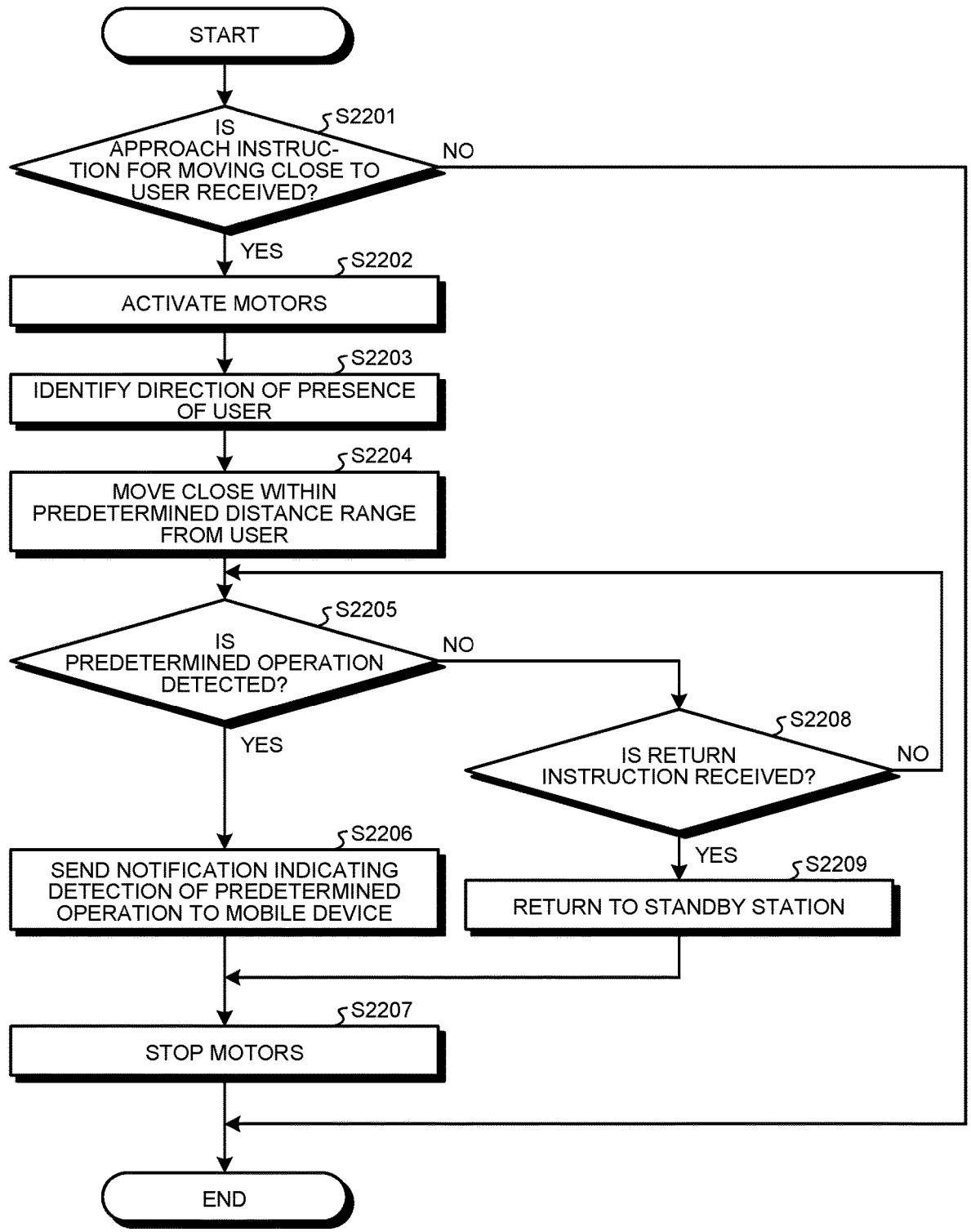
FIG. 31 is a flowchart for explaining an example of the operations performed by the flight device according to embodiments.
Figure 32:
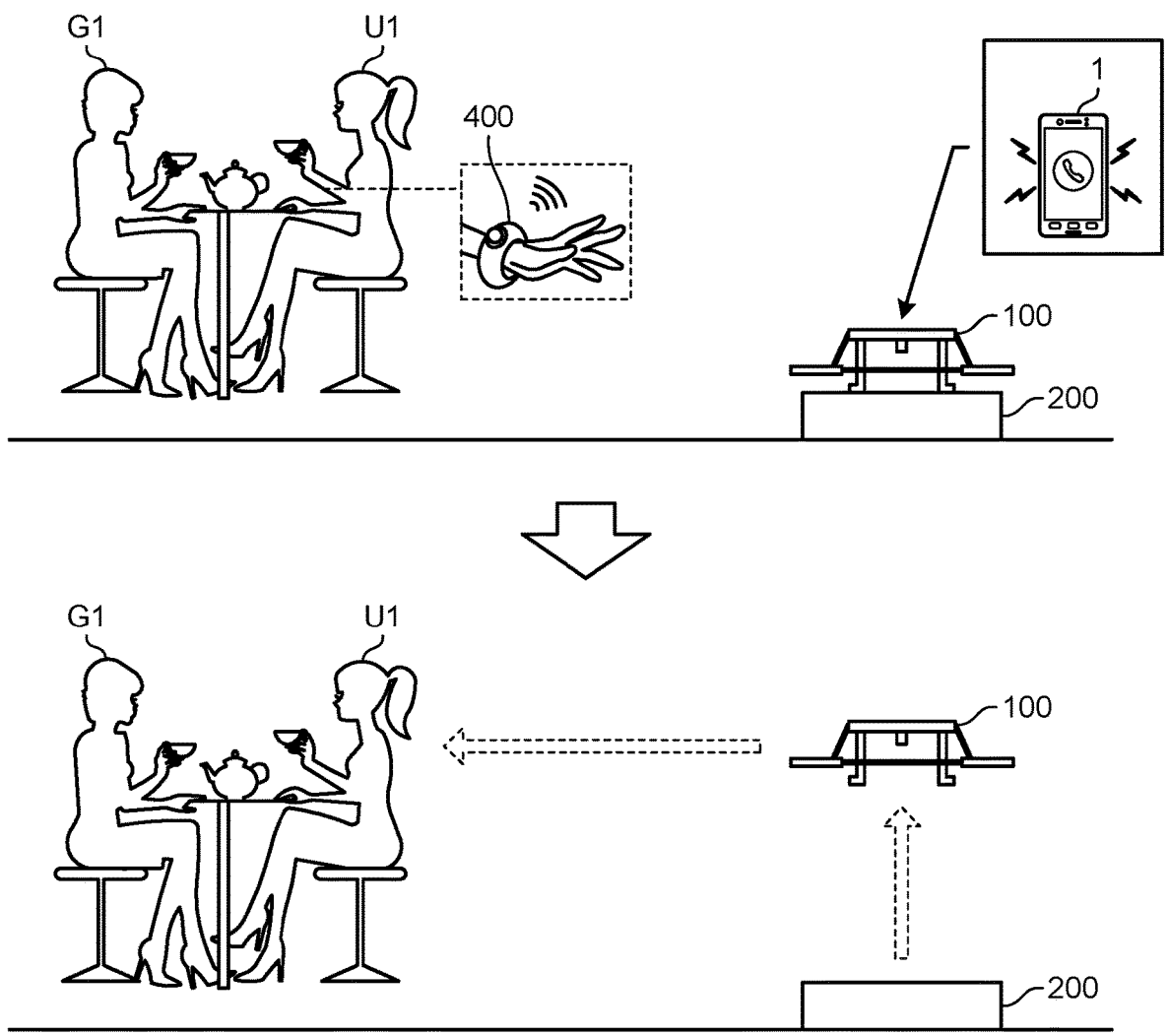
FIG. 32 is a diagram illustrating a brief overview of the operations performed by the flight device according to embodiments.

FIG. 31 is a flowchart for explaining an example of the operations performed by the flight device according to embodiments. FIG. 32 is a diagram illustrating a brief overview of the operations performed by the flight device according to embodiments. The operations illustrated in FIGS. 31 and 32 are implemented when the control unit 127 executes the control program 126a. For example, after the power for the flight device 100 is switched on, while the mobile device 1 is mounted on the flight device 100, the operations illustrated in FIG. 31 are performed in a repeated manner.

As illustrated in FIG. 31, the control unit 127 determines whether an approach instruction for moving close to the user is received (Step S2201). The data of the identifier included in the approach instruction is stored as the identifier data 126c in the memory module 126.

If it is determined that an approach instruction for moving close to the user is received (Yes at Step S2201), then the control unit 127 activates the motors 140a to 140d (Step S2202).

Subsequently, the control unit 127 identifies the direction in which the user of the mobile device 1 is present (Step S2203). Then, the control unit 127 moves close within a predetermined distance range from the user of the mobile device 1 (Step S2204).

In FIG. 32 is illustrated a brief overview of the operations performed from Step S2201 to Step S2204 illustrated in FIG. 31. As illustrated in FIG. 32, for example, the situation is such that the user U1 of the mobile device 1 has attached the mobile device 1 to the flight device 100 and is having a conversation with a guest at a position away from the flight device 100.

The flight device 100 having the mobile device 1 mounted thereon is in the standby state at a standby station 200. When the mobile device 1 receives an incoming call and accordingly sends an approach instruction to the flight device 100 for moving close to the user U1, the flight device 100 takes off from the standby station 200 and searches for the user U1 based on the radio waves transmitted from a wearable device 400 that the user U1 is wearing. More particularly, the flight device 100 detects, from among the devices transmitting radio waves, the wearable device 400 having the identifier corresponding to the identifier data 126c; and identifies the direction of presence of the user U1 from the intensity of the received radio waves. After the direction of presence of the user U1 is identified, as illustrated in FIG. 32, the flight device 100 moves close within a predetermined distance range from the user U1. More particularly, the flight device 100 continuously measures the distance to the user U1 using the distance image sensor 125b, and moves close within a predetermined distance range from the user U1.

Returning to the explanation with reference to FIG. 31, after moving close within a predetermined distance range from the user of the mobile device 1, the control unit 127 determines whether a predetermined operation is detected (Step S2205).

If it is determined that the predetermined operation is detected (Yes at Step S2205), then the control unit 127 sends a notification about the detection of the predetermined operation to the mobile device 1 (Step S2206). Herein, the predetermined operation includes, for example, holding the coupling frames 130.

Then, the control unit 127 stops the motors 140a to 140d (Step S2207). It marks the end of the operations illustrated in FIG. 31.

On the other hand, if it is determined that the predetermined operation is not detected (No at Step S2205), then the control unit 127 determines whether a return instruction is received (Step S2208). That is, when the predetermined operation is not detected, there is a high probability that a hands-free speaker conversation is underway, and thus the reception of a return instruction, which is sent from the mobile device 1 after the end of conversation, is awaited.

If it is determined that a return instruction is received (Yes at Step S2208), then the control unit 127 returns to the standby station 200 (Step S2209), and the system control returns to Step S2207 explained earlier. For example, the flight device 100 returns to the standby station 200 based on the radio waves of a specified frequency band transmitted by the standby station 200.

On the other hand, if it is determined that a return instruction is not received (No at Step S2208), then the system control returns to Step S2205 explained earlier.

At Step 201 explained earlier, if it is determined that an approach instruction for approaching the user is not received (No at Step S2201), then it marks the end of the operations illustrated in FIG. 31.

In embodiments described above, with the reception of an incoming call in the mobile device 1 serving as the trigger, the flight device 100 having the mobile device 1 mounted thereon automatically moves close to the vicinity of the user of the mobile device 1. Hence, even if the user of the mobile device 1 is at a distance from the mobile device 1, he or she becomes able to know about the incoming call.

Moreover, in embodiments described above, the conversation is started as a result of detecting the predetermined operation with respect to the flight device 100. Thus, the user of the mobile device 1 can smoothly switch to making a conversation.

Furthermore, in embodiments described above, the mobile device 1 starts a speaker conversation by recognizing the predetermined gesture or the predetermined voice. Hence, without having to hold the mobile device 1, which is mounted on the flight device 100, in hands, the user of the mobile device 1 can start a hands-free conversation even when he or she is tied up in something.

Moreover, in embodiments described above, the explanation is given for an example in which the mobile device 1 starts a normal conversation as a result of detecting a predetermined operation with respect to the flight device 100. However, that is not the only possible example. Alternatively, for example, the mobile device 1 can start a normal conversation as a result of detecting an operation such as touching, sliding, or flicking with respect to the touchscreen 2B.

Furthermore, in embodiments described above, the explanation is given for an example in which, when the flight device 100 is in flight, the mobile device 1 detects a predetermined operation with respect to the flight device 100 and starts a normal conversation. However, that is not the only possible case. Alternatively, for example, even if the flight device 100 is not in flight, the mobile device 1 can start a normal conversation by detecting a predetermined operation with respect to the flight device 100. For example, a case is assumed in which, when the user has the mobile device 1 at hand while keeping it mounted on the flight device 100; then, instead of directly operating the mobile device 1 in response to an incoming call, the user holds the coupling frames 130 of the flight device 100 and responds to the incoming call.

Moreover, in embodiments described above, the explanation is given about an example in which, when the flight device 100 is in flight, the mobile device 1 starts a speaker conversation by recognizing a predetermined gesture or a predetermined voice. However, that is not the only possible example. For example, even if the flight device 100 is not flight, the mobile device 1 can start a speaker conversation by recognizing a predetermined gesture or a predetermined voice. For example, a case is assumed in which, when the user has the mobile device 1 at hand while keeping it mounted on the flight device 100 but is tied up in something, he or she responds to the incoming call in a hands-free manner without directly operating the mobile device 1 or without holding the flight device 100.

Furthermore, as described above, embodiments described above can propose an example of the improvement technique for improving the technology in which the flight performance of the flight device 100 is applied. That is, according to embodiments, as a result of mounting the mobile device 1 on the flight device 100, as far as responding to an incoming call is concerned, it becomes possible to provide the user with some additional value that contributes in enhancing the user-friendliness.

Moreover, in embodiments described above, when the mobile device 1 is in a silent mode in which the notification setting for incoming calls is set to notification by vibrations, the silent mode can be released when the mobile device 1 is detected to have been mounted on the flight device 100. That is done as a measure against the fact that the notification by vibrations makes it difficult for the user to recognize an incoming call because the vibrations of the mobile device 1 get lost in the vibrations of the flight device 100.

Furthermore, in embodiments described above, the mobile device 1 can be so configured that the sound volume is turned up upon detection of mounting of the mobile device 1 on the flight device 100. That is done as a measure against the fact that, in the notification by sound, it is difficult for the user to recognize an incoming call because the sound of the mobile device 1 gets lost in the noise of the flight device 100.

Moreover, in embodiments described above, the mobile device 1 can be enabled to use the detection result obtained by the sensor unit 125 of the flight device 100. For example, based on the detection result obtained by the touch sensor 125a, the mobile device 1 can directly detect an operation performed with respect to the coupling frames 130 of the flight device 100. For example, based on the measurement result obtained by the distance image sensor 125b, the mobile device 1 can directly determine whether the flight device 100 has moved close within a predetermined distance range from the user. Furthermore, in embodiments described above, the controller 10 of the mobile device 1 can be enabled to control the flight power of the flight device 100. Moreover, in embodiments described above, the flight device 100 can be enabled to use the detection results obtained by the sensors of the mobile device 1. For example, based on the detection result of the direction sensor 16 of the mobile device 1, the flight device 100 can measure the angle made by the direction of orientation of the nose of the flight device 100.

Furthermore, in embodiments described above, the explanation is given for an example in which the mobile device 1 and the flight device 100 are paired by establishing near-field wireless communication therebetween, so that the mobile device 1 and the flight device 100 are connected in a communicable manner. Alternatively, the mobile device 1 and the flight device 100 can be electrically connected by a cable in a communicable manner.

Herein, the technology according to the appended claims is described with reference to the distinguishing embodiments for a complete and clear disclosure. However, the appended claims are not to be thus limited but are to be construed as embodying all modifications and alternative constructions that may occur to one skilled in the art that fairly fall within the basic teaching herein set forth.

What is claimed is:

1. An unmanned aerial vehicle comprising:
a mobile electronic device; and
a flight device to which the mobile electronic device is connected in a detachably-attachable manner, wherein
based on a destination received from a user, the mobile electronic device identifies a route to the destination and instructs the flight device to fly along the route to the destination at a flight speed based on a speed of movement of the user in a manner such that the user can follow the flight device to the destination.

2. The unmanned aerial vehicle according to claim 1, wherein flight power of the flight device is controlled according to the instruction of the mobile electronic device.

3. The unmanned aerial vehicle according to claim 1, wherein the mobile electronic device changes a display function when the mobile electronic device detects that the flight device is in flight.

4. The unmanned aerial vehicle according to claim 1, wherein the mobile electronic device changes a charging function when the mobile electronic device detects a low battery.

5. The unmanned aerial vehicle according to claim 1, wherein the mobile electronic device changes a notification function when either: the mobile electronic device detects that the flight device is in flight, an instruction is received from the user, or a notification is received.

6. The unmanned aerial vehicle according to claim 1, wherein the mobile electronic device changes an input function when the mobile electronic device detects that the flight device is in flight.

7. The unmanned aerial vehicle according to claim 1, wherein the mobile electronic device executes a health function when the mobile electronic device detects that the flight device is in flight.

8. The unmanned aerial vehicle according to claim 1, wherein the destination is fixed.

9. The unmanned aerial vehicle according to claim 1, wherein when the mobile electronic device detects that the flight device has reached the destination, the mobile electronic device instructs the flight device to make a landing.

10. A mobile electronic device that is connected to a flight device, comprising:
a communication unit that communicates with the flight device; and
a controller, wherein
when connected to the flight device, the controller, based on a destination received from a user, identifies a route to the destination and instructs the flight device to fly along the route to the destination at a flight speed based on a speed of movement of the user in a manner such that the user can follow the flight device to the destination.

11. The mobile electronic device according to claim 10, wherein the controller changes a display function when the mobile electronic device detects that the flight device is in flight.

12. The mobile electronic device according to claim 10, wherein the controller changes a charging function when the controller detects a low battery.

13. The mobile electronic device according to claim 10, wherein the controller changes a notification function when either: the controller detects that the flight device is in flight, an instruction is received from the user, or a notification is received.

14. The mobile electronic device according to claim 10, wherein the controller changes an input function when the controller detects that the flight device is in flight.

15. The mobile electronic device according to claim 10, wherein the controller executes a health function when the controller detects that the flight device is in flight.

16. The mobile electronic device according to claim 10, wherein the destination is fixed.

17. An unmanned aerial vehicle comprising:
a mobile electronic device including a display; and
a flight device to which the mobile electronic device is connected in a detachably-attachable manner, wherein
when the mobile electronic device detects that the flight device is in flight, an element of the display is enlarged.

18. A mobile electronic device that is connected to a flight device, comprising:
a display
a communication unit that communicates with the flight device; and a controller that executes a predetermined function, wherein
when the controller detects that the flight device is in flight, an element of the display is enlarged.

* * * * *